(12) United States Patent
Friman

(10) Patent No.: US 12,378,818 B2
(45) Date of Patent: Aug. 5, 2025

(54) PRE-WINDING A MOTORIZED ROLLER SHADE

(71) Applicant: Lutron Technology Company LLC, Coopersburg, PA (US)

(72) Inventor: Olli T. Friman, Bethlehem, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 18/601,282

(22) Filed: Mar. 11, 2024

(65) Prior Publication Data
US 2024/0218737 A1 Jul. 4, 2024

Related U.S. Application Data

(63) Continuation of application No. 17/327,682, filed on May 22, 2021, now Pat. No. 11,970,903.

(60) Provisional application No. 63/170,126, filed on Apr. 2, 2021, provisional application No. 63/065,813, filed
(Continued)

(51) Int. Cl.
| | |
|---|---|
| *E06B 9/62* | (2006.01) |
| *E06B 9/42* | (2006.01) |
| *E06B 9/44* | (2006.01) |
| *E06B 9/68* | (2006.01) |
| *E06B 9/72* | (2006.01) |
| *H02J 7/00* | (2006.01) |

(Continued)

(52) U.S. Cl.
CPC .................. *E06B 9/62* (2013.01); *E06B 9/42* (2013.01); *E06B 9/44* (2013.01); *H02K 11/0094* (2013.01); *H02K 11/33* (2016.01); *E06B 2009/6809* (2013.01); *E06B 9/72* (2013.01); *H02J 7/0063* (2013.01); *H02J 2207/20* (2020.01)

(58) Field of Classification Search
CPC ..... E06B 9/62; E06B 9/42; E06B 9/44; E06B 9/72; E06B 9/56; E06B 9/60; E06B 9/68; E06B 9/40; E06B 2009/6809
See application file for complete search history.

(56) References Cited

U.S. PATENT DOCUMENTS

| | | |
|---|---|---|
| 2,301,863 A | 11/1942 | Forse |
| 4,482,137 A | 11/1984 | Gavagan et al. |
| 6,497,267 B1 | 12/2002 | Killo et al. |

(Continued)

OTHER PUBLICATIONS

"How to Safely Pack a Returned Senses Roller Blind", Decorquip, 2017, 1 page.

*Primary Examiner* — Daniel P Cahn
*Assistant Examiner* — John W Hanes, Jr.
(74) *Attorney, Agent, or Firm* — Flaster Greenberg P.C.

(57) ABSTRACT

Systems, methods, and apparatus are described herein for pre-winding a motorized roller shade. The motorized roller shade may include a roller tube, a flexible material attached to the roller tube, a motor drive unit, and mounting brackets configured to support respective ends of the roller tube. The roller tube of the roller shade may be slid to an extended position. A configuration procedure may be determined to have been initiated. The flexible material may be secured, for example, to prevent the flexible material from unrolling. The roller tube may be wound a predetermined number of rotations with the flexible material and a hembar of the roller shade secured, for example, to prevent the flexible material from being raised or lowered. Winding the roller tube may include pre-winding a spring that is coupled to the roller tube. The flexible material may be unsecured when the roller tube has been pre-wound.

12 Claims, 48 Drawing Sheets

Related U.S. Application Data on Aug. 14, 2020, provisional application No. 63/028,808, filed on May 22, 2020.

(51) Int. Cl.
*H02K 11/00* (2016.01)
*H02K 11/33* (2016.01)

(56) References Cited

U.S. PATENT DOCUMENTS

| | | |
|---|---|---|
| 7,389,806 B2 | 6/2008 | Kates |
| 8,299,734 B2 | 10/2012 | Mullet et al. |
| 8,368,328 B2 | 2/2013 | Mullet et al. |
| 8,371,358 B1 | 2/2013 | Mullet et al. |
| 8,540,005 B2 | 9/2013 | Baugh et al. |
| 8,659,246 B2 | 2/2014 | Mullet et al. |
| 8,723,455 B2 | 5/2014 | Mullet et al. |
| 8,791,658 B2 | 7/2014 | Mullet et al. |
| 8,851,141 B2 | 10/2014 | Blair et al. |
| 8,950,461 B2 | 2/2015 | Adams et al. |
| 8,968,900 B2 | 3/2015 | Mullet et al. |
| 9,045,939 B2 | 6/2015 | Blair et al. |
| 9,080,381 B2 | 7/2015 | Haarer et al. |
| 9,095,907 B2 | 8/2015 | Mullet et al. |
| 9,115,537 B2 | 8/2015 | Blair |
| 9,152,032 B2 | 10/2015 | Mullet et al. |
| 9,353,570 B2 | 5/2016 | Smith et al. |
| 9,488,000 B2 | 11/2016 | Kirby et al. |
| 9,598,901 B2 | 3/2017 | Kirby et al. |
| 9,631,425 B2 | 4/2017 | Campagna |
| 9,670,724 B2 | 6/2017 | Oakley |
| 9,810,020 B2 | 11/2017 | Adams et al. |
| 10,094,169 B2 | 10/2018 | Kirby |
| 10,138,676 B2 | 11/2018 | Bohlen et al. |
| 10,364,602 B2 | 7/2019 | Kwak |
| 10,501,988 B2 | 12/2019 | Fisher |
| 10,612,301 B2 | 4/2020 | Derk et al. |
| 10,718,157 B2 | 7/2020 | Wulff et al. |
| 10,738,530 B2 | 8/2020 | Campagna |
| 10,858,885 B2 | 12/2020 | Walter-Seifart |
| 10,934,775 B2 | 3/2021 | Zhang |
| 11,028,642 B2 | 6/2021 | Lei et al. |
| 11,306,535 B2 | 4/2022 | Lu |
| 11,339,608 B2 | 5/2022 | Norton |
| 11,451,117 B2 | 9/2022 | De Filippis |
| 2007/0284053 A1 | 12/2007 | Mullet et al. |
| 2008/0053628 A1 | 3/2008 | Anderson et al. |
| 2008/0236763 A1 | 10/2008 | Kates |
| 2010/0269988 A1 | 10/2010 | Mullet et al. |
| 2010/0294438 A1 | 11/2010 | Kirby et al. |
| 2011/0203748 A1 | 8/2011 | Mullet et al. |
| 2011/0203754 A1 | 8/2011 | Mullet et al. |
| 2012/0090797 A1 | 4/2012 | Mullet et al. |
| 2012/0225340 A1 | 9/2012 | Mullet et al. |
| 2013/0020038 A1 | 1/2013 | Barnes et al. |
| 2013/0098561 A1 | 4/2013 | Mullet et al. |
| 2013/0233496 A1 | 9/2013 | Ogden et al. |
| 2014/0305601 A1 | 10/2014 | Mullet et al. |
| 2015/0247362 A1 | 9/2015 | Kirby |
| 2016/0130870 A1 | 5/2016 | Cheng |
| 2016/0326801 A1 | 11/2016 | Ogden et al. |
| 2017/0159359 A1 | 6/2017 | Vries et al. |
| 2018/0087319 A1 | 3/2018 | McPherson et al. |
| 2018/0202225 A1 | 7/2018 | Lagarde |
| 2018/0266176 A1 | 9/2018 | Hall et al. |
| 2018/0310745 A1 | 11/2018 | Giri et al. |
| 2019/0178030 A1 | 6/2019 | Brown et al. |
| 2019/0257147 A1 | 8/2019 | Lei et al. |
| 2020/0284093 A1 | 9/2020 | Dahlgren et al. |
| 2021/0087880 A1 | 3/2021 | Taubenrauch et al. |
| 2021/0262286 A1 | 8/2021 | Campagna et al. |
| 2021/0363820 A1 | 11/2021 | Friman |
| 2021/0367542 A1 | 11/2021 | Adams et al. |

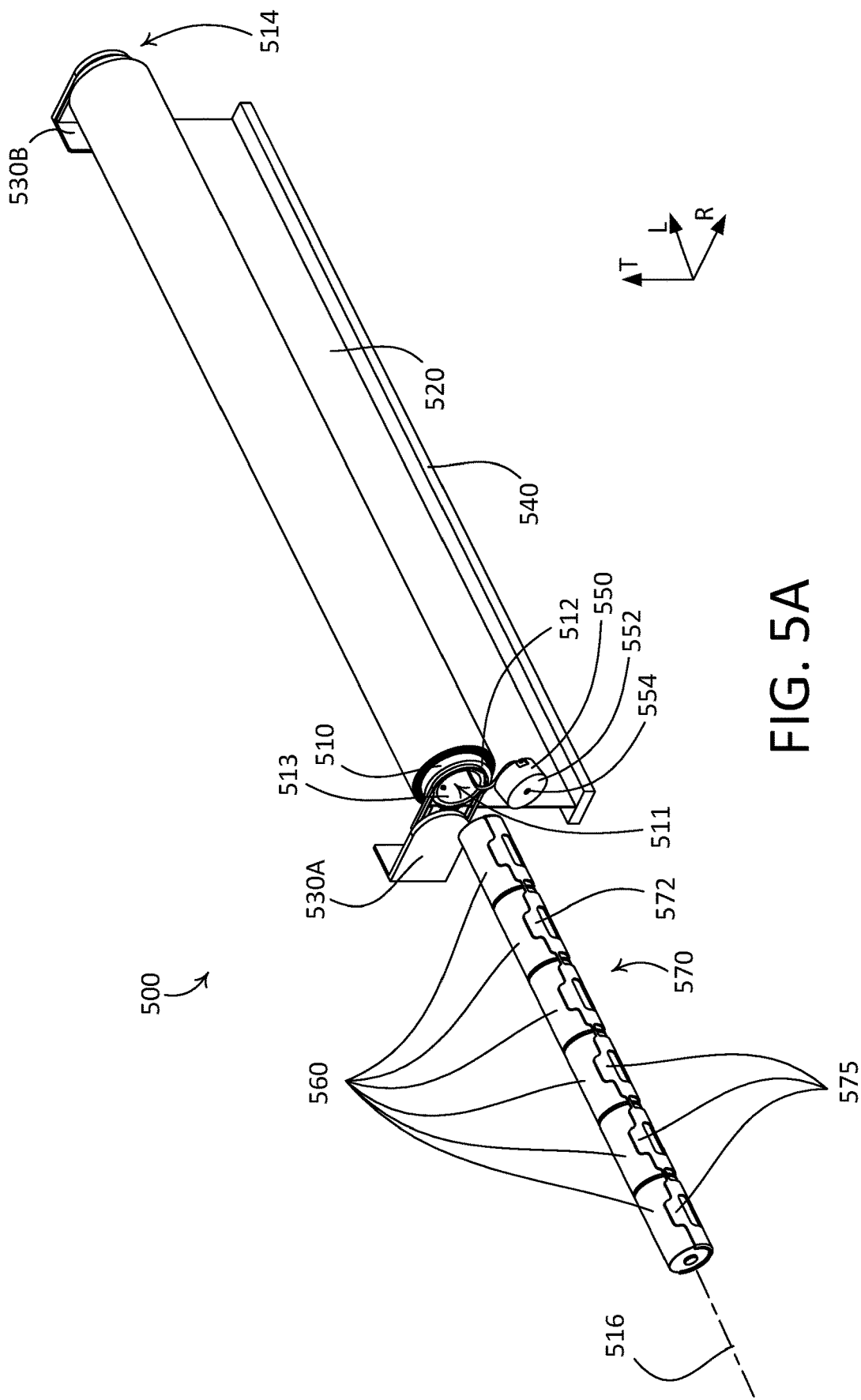

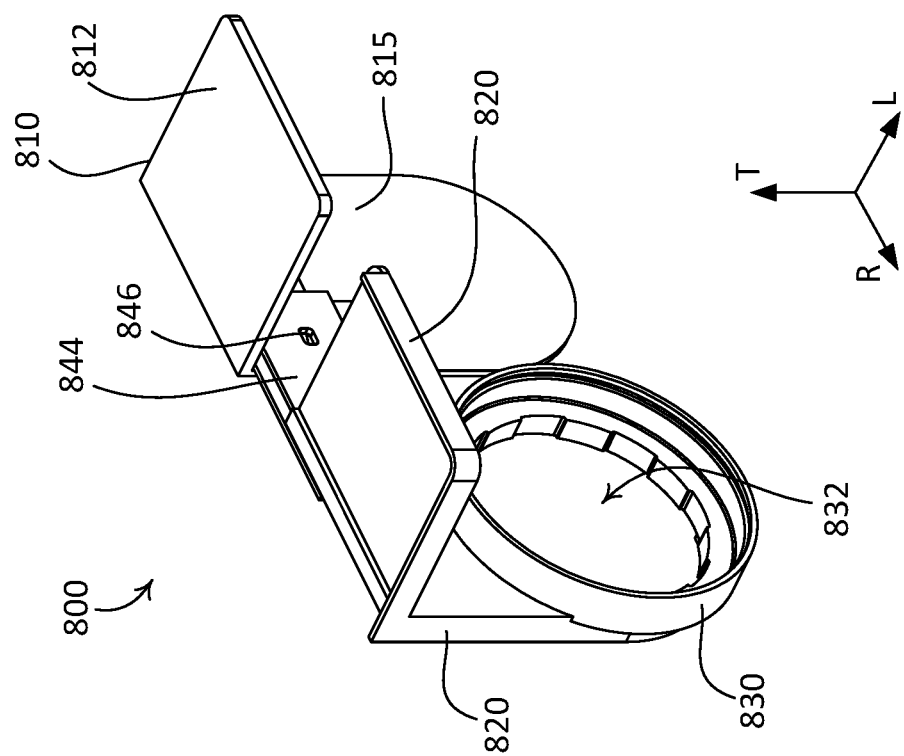
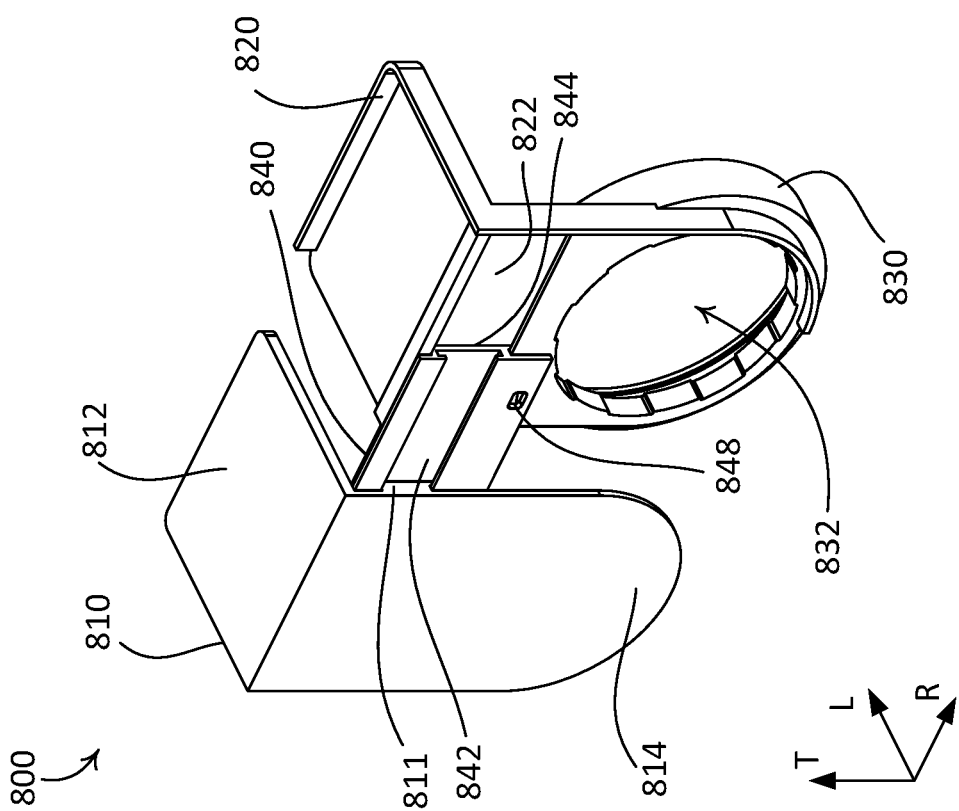
FIG. 15B
FIG. 15A

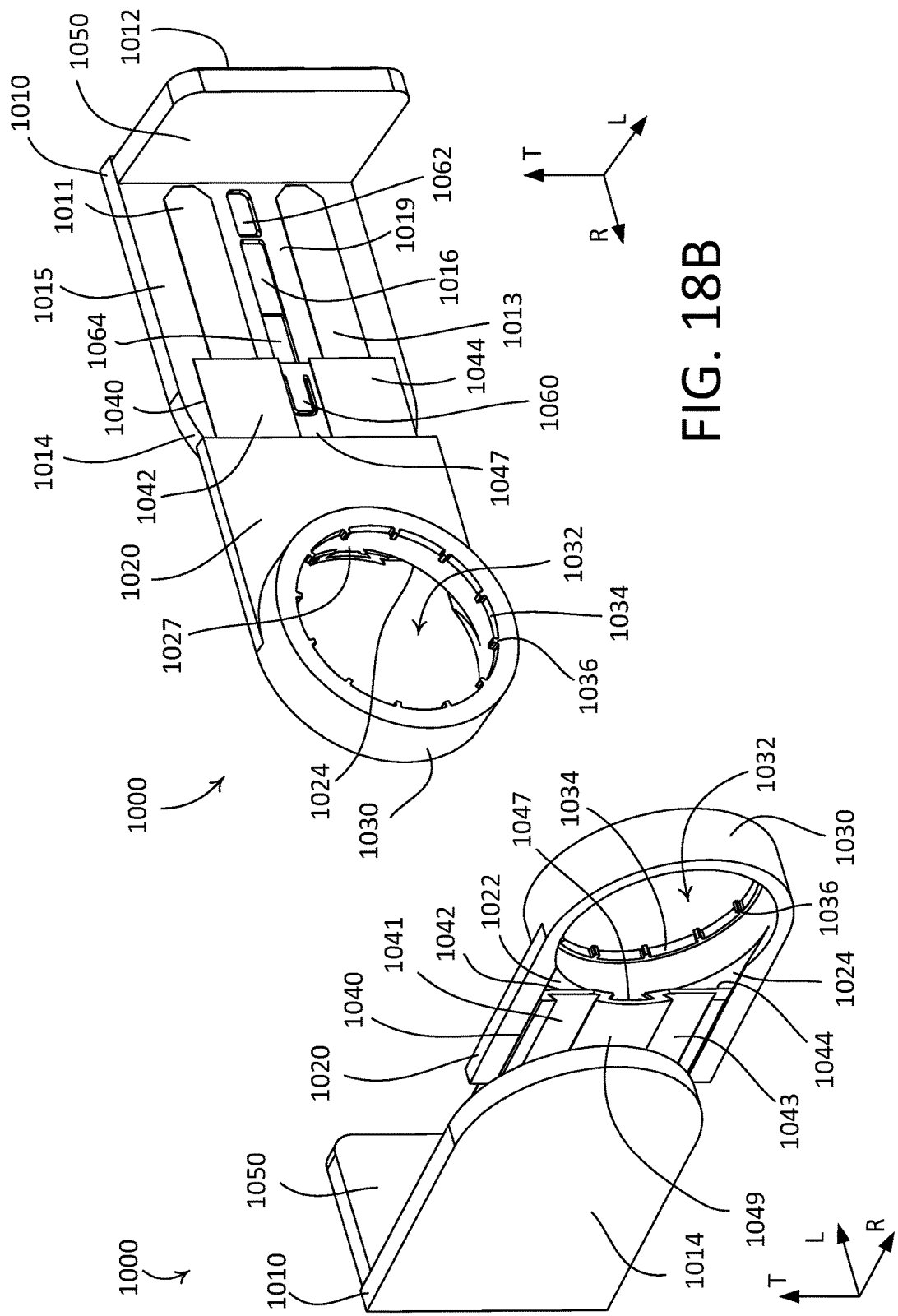

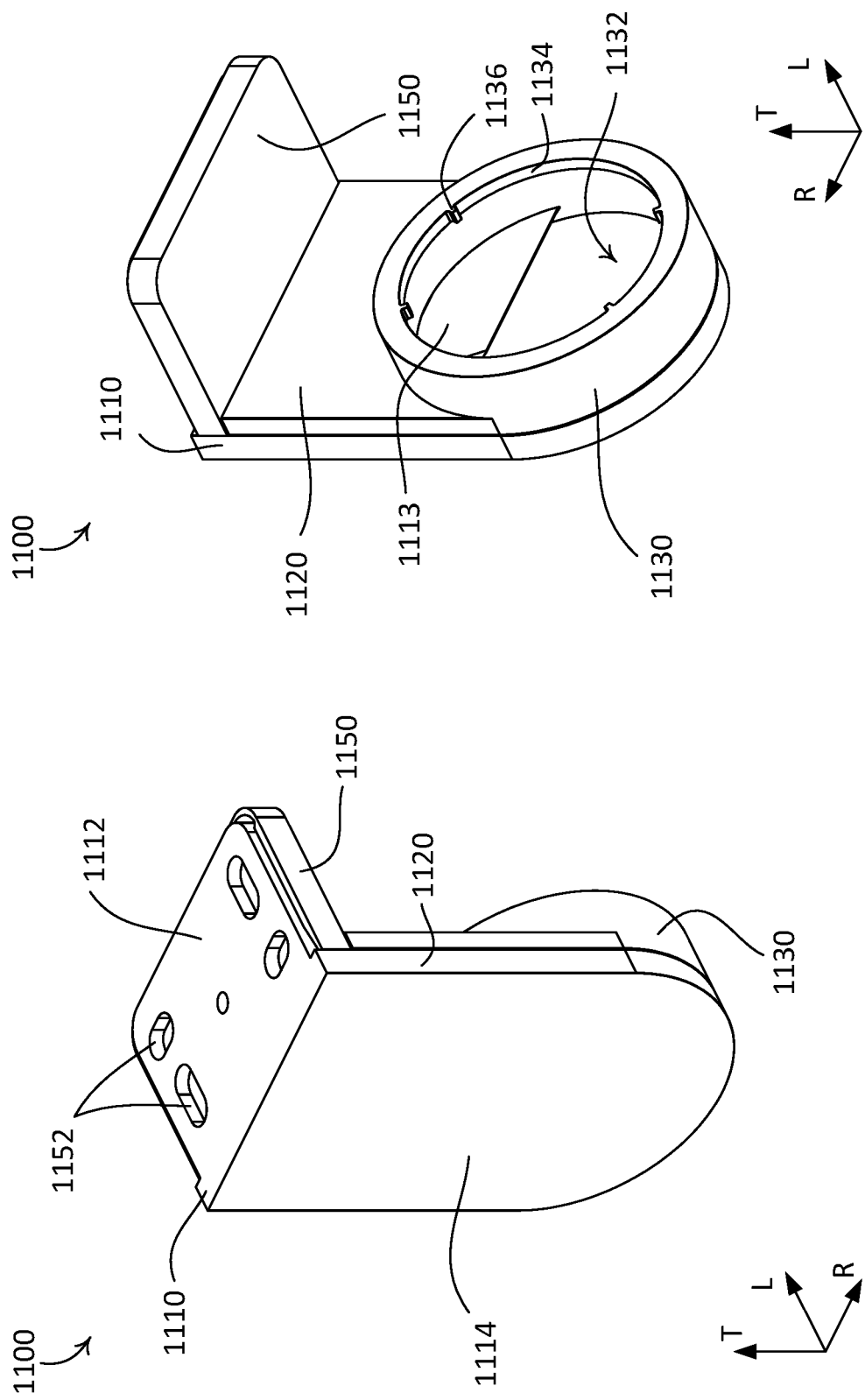

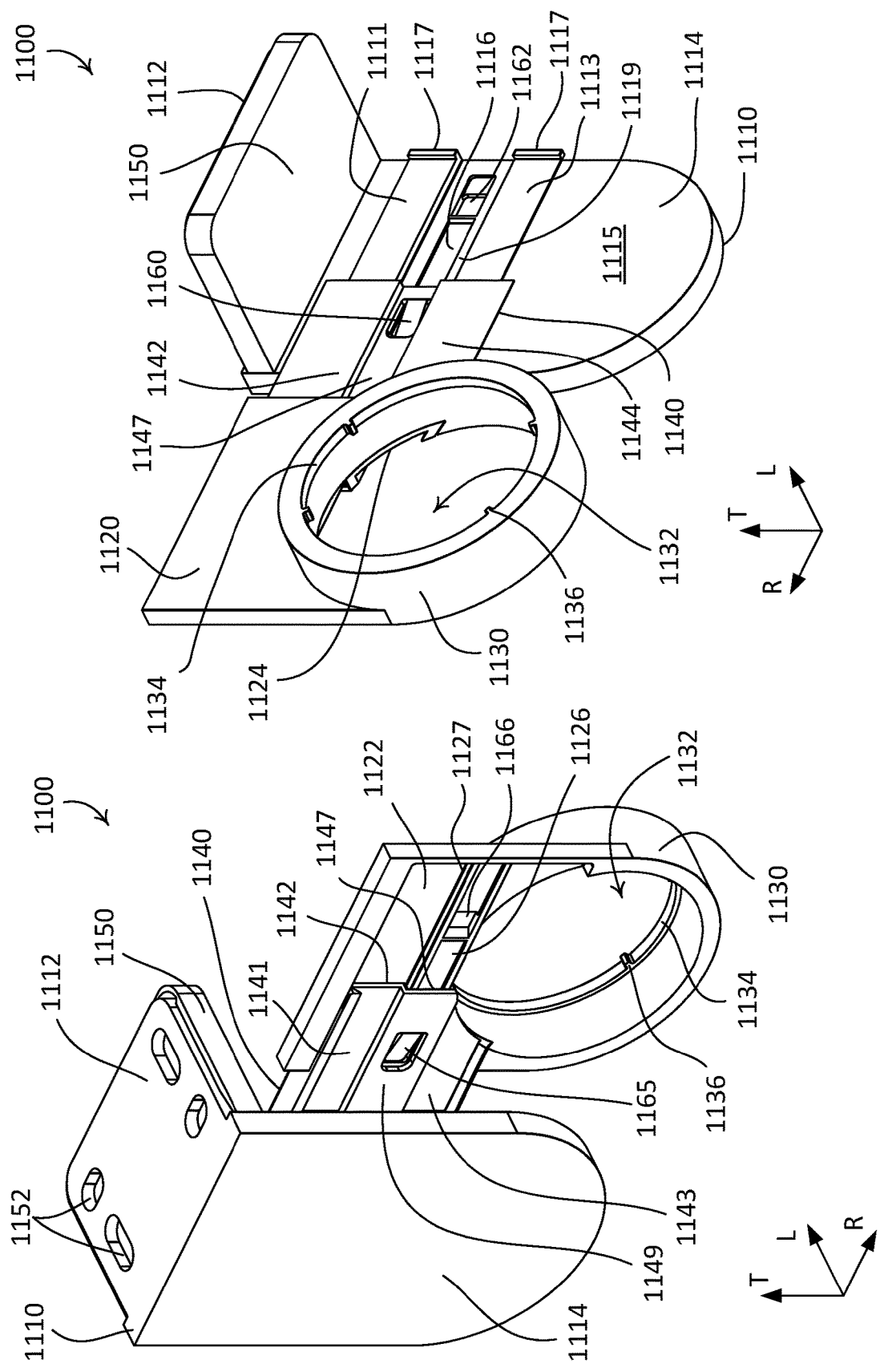

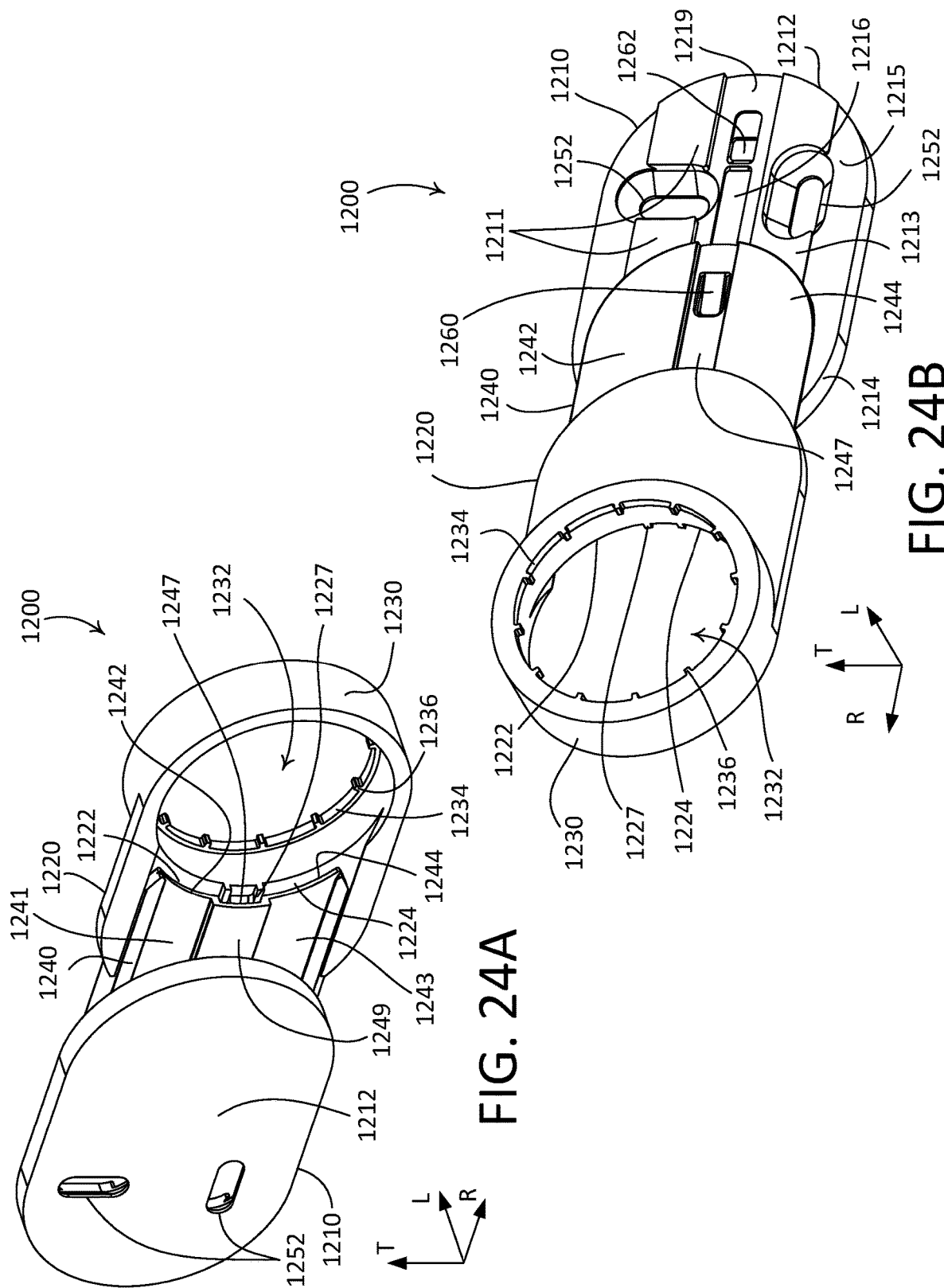

PRE-WINDING A MOTORIZED ROLLER SHADE

CROSS-REFERENCE TO RELATED APPLICATIONS

This application is a continuation of U.S. non-provisional patent application Ser. No. 17/327,682, filed May 22, 2021, which claims priority to U.S. provisional patent application No. 63/028,808, filed May 22, 2020, U.S. provisional patent application No. 63/065,813, filed Aug. 14, 2020, and U.S. provisional patent application No. 63/170,126, filed Apr. 2, 2021, which are incorporated herein by reference in their entirety.

BACKGROUND

A window treatment may be mounted in front of one or more windows, for example to prevent sunlight from entering a space and/or to provide privacy. Window treatments may include, for example, roller shades, roman shades, venetian blinds, or draperies. A roller shade typically includes a flexible shade fabric wound onto an elongated roller tube. Such a roller shade may include a weighted hembar located at a lower end of the shade fabric. The hembar may cause the shade fabric to hang in front of one or more windows over which the roller shade is mounted.

A typical window treatment can be mounted to structure surrounding a window, such as a window frame. Such a window treatment may include brackets at opposed ends thereof. The brackets may be configured to operably support the roller tube, such that the flexible material may be raised and lowered. For example, the brackets may be configured to support respective ends of the roller tube. The brackets may be attached to structure, such as a wall, ceiling, window frame, or other structure.

Such a window treatment may be motorized. A motorized window treatment may include a roller tube, a motor, brackets, and electrical wiring. The components of the motorized window treatment, such as the brackets, the roller tube, electrical wiring, etc. may be concealed by a fascia or installed in a pocket out of view.

SUMMARY

Systems, methods, and apparatus are described herein for pre-winding a motorized roller shade. As described herein, a motorized window treatment (e.g., motorized roller shade) may include a roller tube, a flexible material (e.g., a covering material) attached to the roller tube, a motor drive unit, and mounting brackets configured to support respective ends of the roller tube. The roller tube of the roller shade may be slid to an extended position. A configuration procedure may be determined to have been initiated. The flexible material may be secured, for example, to prevent the flexible material from unrolling. The roller tube may be wound a predetermined number of rotations with the flexible material and a hembar of the roller shade secured, for example, to prevent the flexible material from being raised or lowered. Winding the roller tube may include pre-winding a spring that is coupled to the roller tube. The flexible material may be unsecured when the roller tube has been pre-wound.

The flexible material of the roller shade may be secured by wrapping a hembar of the roller shade to the flexible material. Initiation of the configuration procedure may be determined by receipt of a command from a user interface of the roller shade or a control device external to the roller shade. The configuration procedure may be initiated by pressing an actuator on a user interface of the roller shade. The roller tube may be wound in the direction of raising the covering material such that the spring is pre-wound to assist in raising the covering material. The roller tube may be wound in the direction of lowering the covering material such that the spring is pre-wound to assist in lowering the covering material. The predetermined number of rotations may be configured to minimize a torque required to raise the covering material. The predetermined number of rotations may be determined based on one or more of a longitudinal length of the roller tube, a height of a window, or a type of covering material.

The battery-powered motorized window treatment may include a spring assist assembly. The spring assist assembly may include a spring (e.g., a constant-force spring), a bracket coupling portion, and a roller tube coupling portion. The bracket coupling portion may be attached to the idler shaft such that the bracket coupling portion remains stationary as the roller tube rotates. The roller tube coupling portion may be operatively coupled to the roller tube such that the roller tube coupling portion rotates with the roller tube. The spring may be attached to the bracket coupling portion at one end and to the roller tube coupling portion at the other end. The spring may be configured to coil and uncoil as the roller tube rotates (e.g., depending on the direction of rotation). The spring assist assembly may be configured to assist the motor drive unit operate the battery-powered motorized window treatment. For example, the spring assist assembly may reduce the torque required from the motor drive unit to raise and/or lower the covering material of the battery-powered motorized window treatment. The spring assist assembly may be configured to be adjusted (e.g., pre-wound) at the installation site (e.g., when the roller tube is mounted to the mounting brackets). Pre-winding the spring assist assembly may enable the spring assembly to provide a constant torque on the roller tube during operation of the motor drive unit. Pre-winding the spring assist assembly at the installation site may eliminate the need to pre-wind the spring assist assembly during manufacturing (e.g., at the factory).

BRIEF DESCRIPTION OF THE DRAWINGS

FIG. 5A is a perspective view of another example battery-powered motorized window treatment with a tube configured to retain the batteries.

FIG. 15A is a front perspective view of the example mounting bracket shown in FIG. 14A in an extended position.

FIG. 15B is a rear perspective view of the example mounting bracket shown in FIG. 15A in the extended position.

FIG. 18A is a front perspective view of the example mounting bracket shown in FIG. 17A in an extended position.

FIG. 18B is a rear perspective view of the example mounting bracket shown in FIG. 17A in the extended position.

FIG. 20A is a front perspective view of another example mounting bracket for mounting a battery-powered motorized window treatment (e.g., to a horizontal surface, such as a ceiling).

FIG. 20B is a rear perspective view of the example mounting bracket shown in FIG. 20A.

FIG. 21A is a front perspective view of the example mounting bracket shown in FIG. 20A in an extended position.

FIG. 21B is a rear perspective view of the example mounting bracket shown in FIG. 20A in the extended position.

FIG. 24A is a front perspective view of the example mounting bracket shown in FIG. 23A in an extended position.

FIG. 24B is a rear perspective view of the example mounting bracket shown in FIG. 23A in the extended position.

DETAILED DESCRIPTION

Figure 1A:
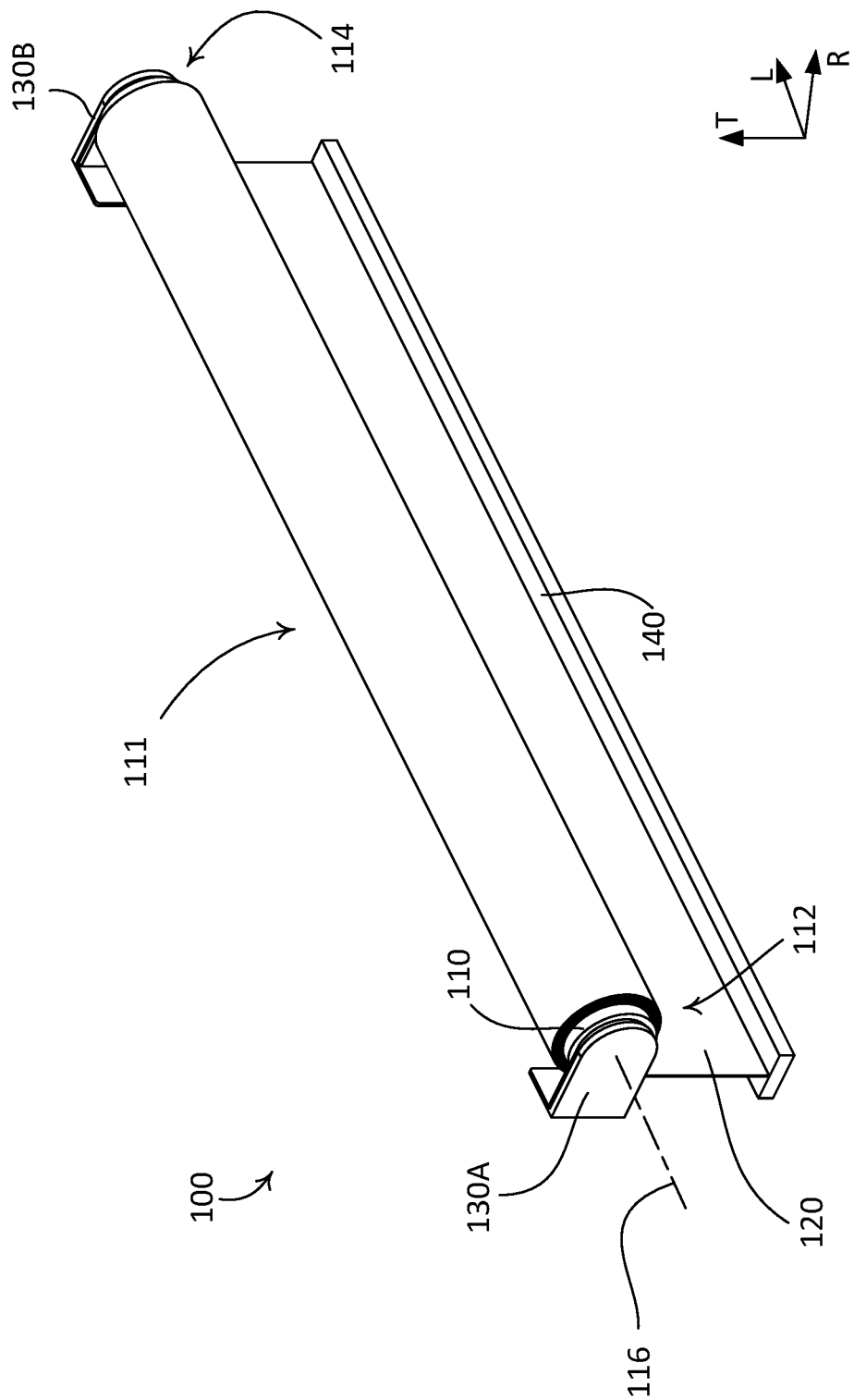
FIG. 1A is an example motorized window treatment.
Figure 1B:
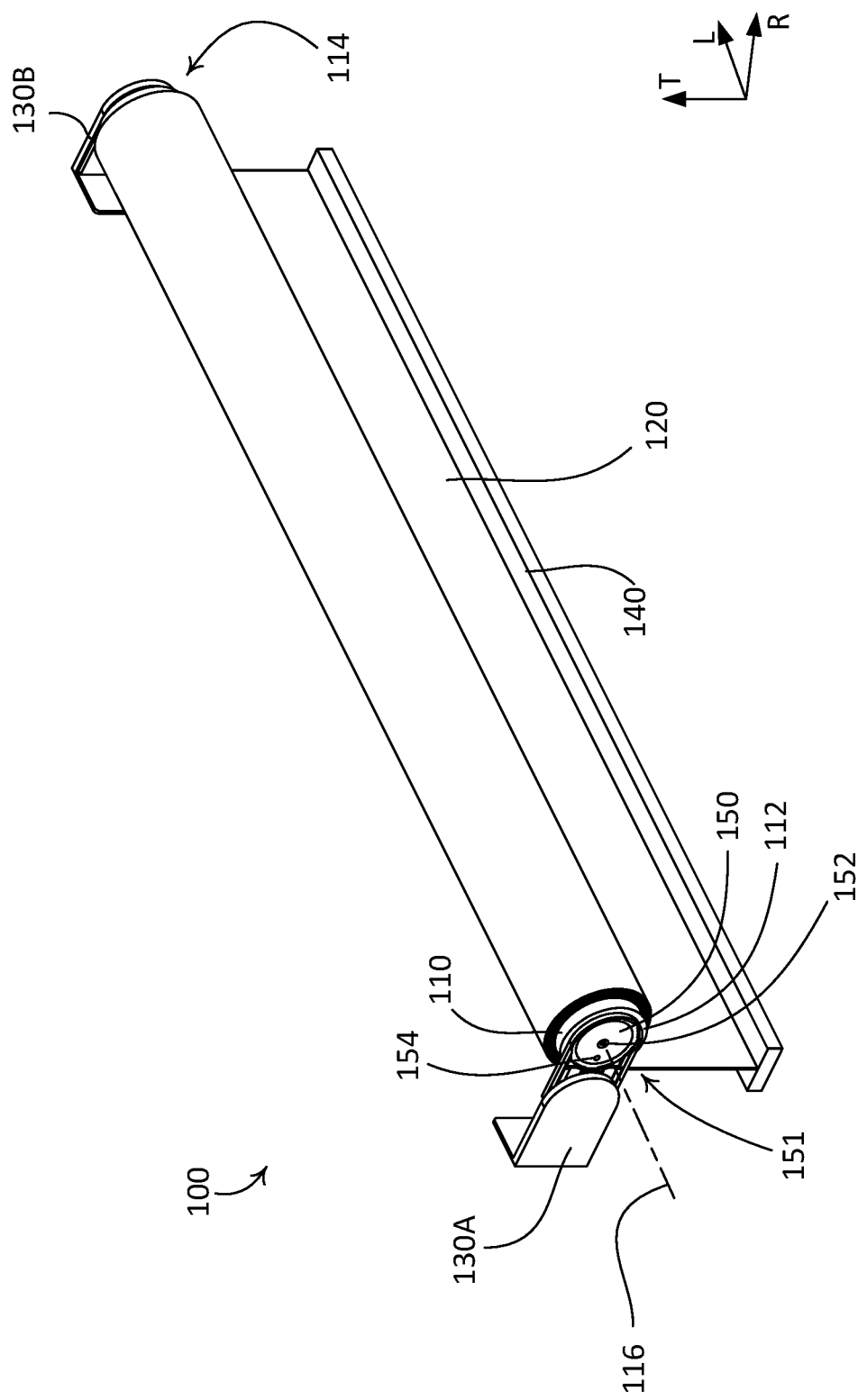
FIG. 1B is a perspective view of an example battery-powered motorized window treatment with one end of the roller tube in a pivoted position.

FIGS. 1A and 1B depict an example motorized window treatment 100 (e.g., a battery-powered motorized window treatment system) that includes a roller tube 110 and a flexible material 120 (e.g., a covering material) windingly attached to the roller tube 110. The motorized window treatment 100 may be a window treatment assembly that includes a roller tube assembly 111 and one or more mounting brackets 130A, 130B. The roller tube assembly 111 may include a roller tube 110, a flexible material 120, a motor drive unit 151 at a first end 112 of the roller tube assembly 111, and an idler end (not shown) at a second end 114 of the roller tube assembly 111. The mounting brackets 130A, 130B may be configured to be coupled to or otherwise mounted to a structure. For example, each of the mounting brackets 130A, 130B may be configured to be mounted to (e.g., attached to) a window frame (e.g., to a head jamb or side jambs of the window frame), a wall, a ceiling, or other structure, such that the motorized window treatment 100 is mounted proximate to an opening (e.g., over the opening or in the opening), such as a window for example. The mounting brackets 130A, 130B may be configured to be mounted to a vertical structure (e.g., wall-mounted to a wall as shown in FIG. 1A) and/or mounted to a horizontal structure (e.g., ceiling-mounted to a ceiling). For example, the mounting brackets 130A, 130B may be rotated 90 degrees from what is shown in FIG. 1A.

The roller tube 110 may operate as a rotational element of the motorized window treatment 100. The roller tube 110 may be elongate along a longitudinal direction L and rotatably mounted (e.g., rotatably supported) by the mounting brackets 130. The roller tube 110 may define a longitudinal axis 116. The longitudinal axis 116 may extend along the longitudinal direction L. The mounting bracket 130A may extend from the structure in a radial direction R, as shown in FIG. 1B. It should be appreciated that when the mounting brackets 130 are ceiling-mounted, the mounting bracket 130A may extend from the structure in a transverse direction T. The radial direction R may be defined as a direction perpendicular to the structure and the longitudinal axis 116. The flexible material 120 may be windingly attached to the roller tube 110, such that rotation of the roller tube 110 causes the flexible material 120 to wind around or unwind from the roller tube 110 along a transverse direction T that extends perpendicular to the longitudinal direction L. For example, rotation of the roller tube 110 may cause the flexible material 120 to move between a raised (e.g., open) position (e.g., as shown in FIG. 1A) and a lowered (e.g., closed) position along the transverse direction T.

The roller tube 110 may be made of aluminum. The roller tube 110 may be a low-deflection roller tube and may be made of a material that has high strength and low density, such as carbon fiber. The roller tube 110 may have, for example, a diameter of approximately two inches. For example, the roller tube 110 may exhibit a deflection of less than ¼ of an inch when the flexible material 120 has a length of 12 feet and a width of 12 feet (e.g., and the roller tube 110 has a corresponding width of 12 feet and the diameter is two inches). Examples of low-deflection roller tubes are described in greater detail in U.S. Patent Application Publication No. 2016/0326801, published Nov. 10, 2016, entitled LOW-DEFLECTION ROLLER SHADE TUBE FOR LARGE OPENINGS, the entire disclosure of which is hereby incorporated by reference.

The flexible material 120 may include a first end (e.g., a top or upper end) that is coupled to the roller tube 110 and a second end (e.g., a bottom or lower end) that is coupled to a hembar 140. The hembar 140 may be configured, for example weighted, to cause the flexible material 120 to hang vertically. Rotation of the roller tube 110 may cause the hembar 140 to move toward or away from the roller tube 110 between the raised and lowered positions.

The flexible material 120 may be any suitable material, or form any combination of materials. For example, the flexible material 120 may be "scrim," woven cloth, non-woven material, light-control film, screen, and/or mesh. The motorized window treatment 100 may be any type of window treatment. For example, the motorized window treatment 100 may be a roller shade as illustrated, a soft sheer shade, a drapery, a cellular shade, a Roman shade, or a Venetian blind. As shown, the flexible material 120 may be a material suitable for use as a shade fabric, and may be alternatively referred to as a flexible material. The flexible material 120 is not limited to shade fabric. For example, in accordance with an alternative implementation of the motorized window treatment 100 as a retractable projection screen, the flexible material 120 may be a material suitable for displaying images projected onto the flexible material 120.

Figure 8A:
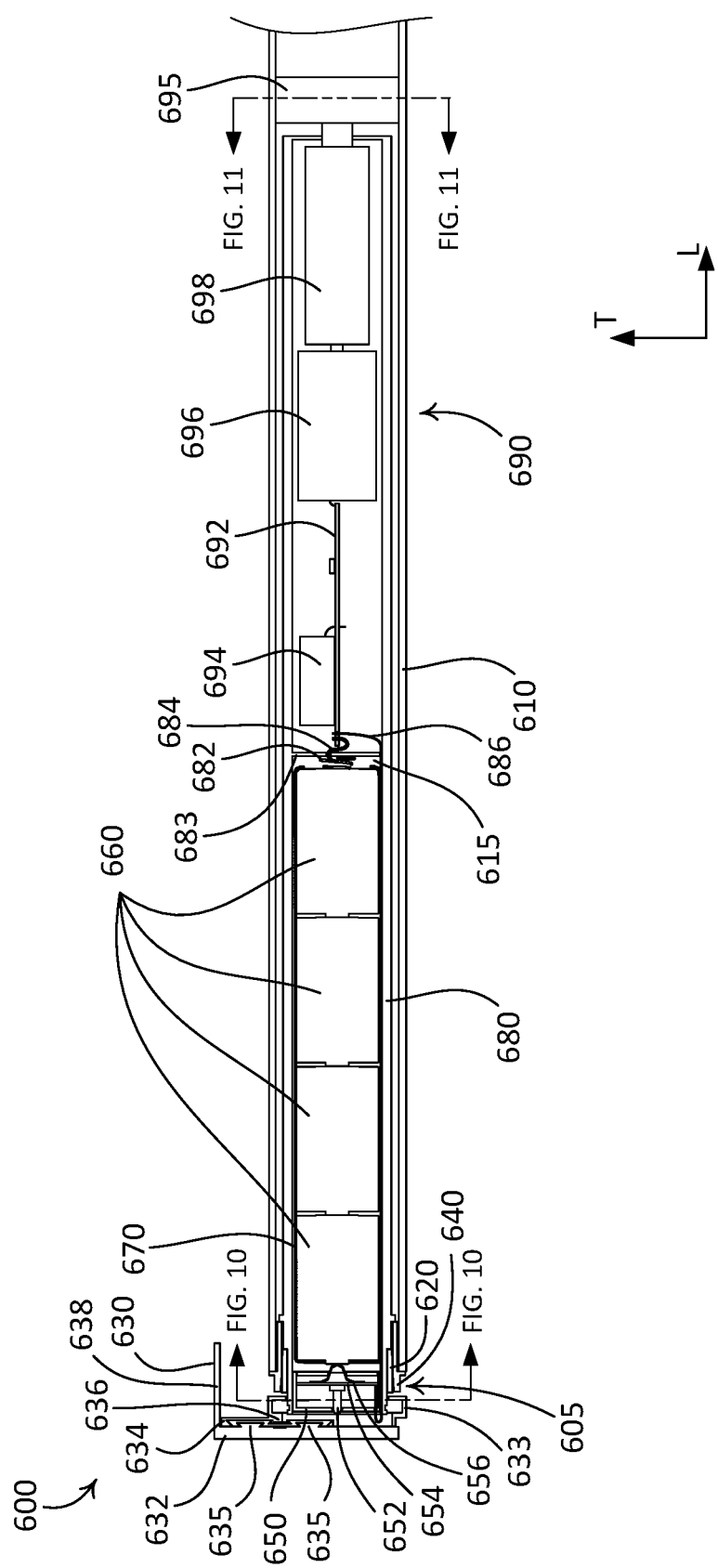
FIG. 8A is a front cross-section view of another example battery-powered motorized window treatment taken through the center of a roller tube of the motorized window treatment.

The motorized window treatment 100 may include a drive assembly (e.g., such as the motor drive unit 690 shown in FIG. 8A). The drive assembly may at least partially be disposed within the roller tube 110. For example, the drive assembly may be retained within a motor drive unit housing (e.g., such as the motor drive unit housing 680 shown in FIG. 8A) that is received within the roller tube 110. The drive assembly may include a control circuit that may include a microprocessor and may be mounted to a printed circuit board. The drive assembly may be powered by a power source (e.g., an alternating-current or direct-current power source) provided by electrical wiring and/or batteries (e.g., as shown in FIGS. 2A-6). The drive assembly may be operably coupled to the roller tube 110 such that when the drive assembly is actuated, the roller tube 110 rotates. The drive assembly may be configured to rotate the roller tube 110 of the example motorized window treatment 100 such that the flexible material 120 is operable between the raised position and the lowered position. The drive assembly may be configured to rotate the roller tube 110 while reducing noise generated by the drive assembly (e.g., noise generated by one or more gear stages of the drive assembly). Examples of drive assemblies for motorized window treatments are described in greater detail in commonly-assigned U.S. Pat. No. 6,497,267, issued Dec. 24, 2002, entitled MOTORIZED WINDOW SHADE WITH ULTRAQUIET MOTOR DRIVE AND ESD PROTECTION, and U.S. Pat. No. 9,598, 901, issued Mar. 21, 2017, entitled QUIET MOTORIZED WINDOW TREATMENT SYSTEM, the entire disclosures of which are hereby incorporated by reference.

The motorized window treatment 100 may be configured to enable access to one or more ends of the roller tube 110 while remaining secured to the mounting brackets 130A, 130B. For example, the motorized window treatment 100 may be adjusted (e.g., pivoted or slid) between an operating position (e.g., as shown in FIG. 1A) to an extended position (e.g., as shown in FIG. 1B) while secured to the mounting brackets 130A, 130B. The operating position may be defined as a position in which the roller tube 110 is supported by and aligned with both mounting brackets 130A, 130B. The extended position may be defined as a position in which one or more ends of the roller tube 110 are accessible while still attached to the brackets 130A, 130B. Operation of the motorized window treatment 100 may be disabled when it is adjusted between the operating position and the extended position. For example, operation of the motorized window treatment 100 may disabled when the extended position is reached. Alternatively, operation of the motorized window treatment 100 may be disabled at some point between the operating position and the extended position, for example, when the motorized window treatment 100 exits the operating position. Operation of the motorized window treatment 100 may be enabled when it enters the operating position.

When in the extended position, the one or more ends of the roller tube 110 may be accessed, for example, to replace batteries, adjust one or more settings, make an electrical connection, repair one or more components, and/or the like. One or more of the mounting brackets 130A, 130B may enable an end of the roller tube 110 to be accessed when the motorized window treatment is in the extended position. One or more of the mounting brackets 130A, 130B may include a sliding portion to enable the end of the roller tube 110 to be accessible. For example, a first portion (e.g., sliding portion) of one or more of the mounting brackets 130A, 130B may extend from a second portion (e.g., fixed portion). For example, a sliding portion of one or more of the mounting brackets 130A, 130B may be adjusted with respect to a fixed portion, for example, to expose a respective end of the roller tube 110.

One end of the roller tube may slide out when the motorized window treatment is in the extended position. For example, one of the mounting brackets (e.g., mounting bracket 130A) may be configured to slide out and the other one of the mounting brackets (e.g., mounting bracket 130B) may remain stationary when the motorized window treatment 100 (e.g., the roller tube 110) is in the extended position, for example, as shown in FIG. 1B. The extended position of the motorized window treatment 100 may include a first end 112 of the roller tube assembly 111 proximate to a first mounting bracket (e.g., mounting bracket 130A) being further from a window and/or the structure to which the first mounting bracket is anchored than when the motorized window treatment 100 is in the operating position. A second end 114 (e.g., opposite the first end 112) of the roller tube assembly 111 proximate to the second mounting bracket (e.g., mounting bracket 130B) may remain substantially fixed when the motorized window treatment 100 is in the extended position, for example, as shown in FIG. 1B. Stated differently, the roller tube 110 may pivot between the operating position and the extended position. The second end 114 of the roller tube 110 and the mounting bracket 130B may define a fulcrum about which the motorized window treatment 100 (e.g., the roller tube 110) pivots.

Alternatively, both ends of the roller tube may slide out when the motorized window treatment is in the extended position. For example, both of the mounting brackets 130A, 130B may be configured to slide out. That is, both of the mounting brackets 130A, 130B may include sliding portions. In this configuration, both the first end 112 and the second end 114 may be further from the window and/or the structure when the motorized window treatment 100 is in the extended position. Stated differently, the motorized window treatment 100 may slide between the operating position and the extended position. When both ends of the roller tube are configured to slide out, two people may be required to operate the motorized window treatment 100 between the operating position and the extended position.

When the motorized window treatment 100 is in the extended position, a motor drive unit housing end 150 of the motor drive unit 151 (e.g., the cap 250 shown in FIGS. 2A and 2B) may be exposed (e.g., accessible). The motor drive unit housing end 150 may be located proximate to the first end 112 of the roller tube assembly 111. The motor drive unit housing end 150 may cover a cavity of the roller tube 110. The motor drive unit housing end 150 may be configured to be removably secured to the roller tube 110 (e.g., the first end 112 of the roller tube assembly 111). For example, the motor drive unit housing end 150 may be configured to be secured within the cavity. The motor drive unit housing end 150 may be configured to retain one or more components (e.g., such as the batteries 260 shown in FIGS. 2A and 2B).

The motor drive unit housing end 150 may include a control button 152. The control button 152 may be backlit. For example, the control button 152 may include a light pipe (e.g., may be translucent or transparent) that is illuminated by a light emitting diode (LED) within the motor drive unit housing. The control button 152 may be configured to enable a user to change one or more settings of the motorized window treatment 100. For example, the control button 152 may be configured to change one or more wireless communication settings and/or one or more drive settings. The control button 152 may be configured to enable a user to pair the motorized window treatment 100 with a remote control device to allow for wireless communication between the remote control device and a wireless communication circuit (e.g., an RF transceiver) in the motor drive unit housing end 150. The control button 152 may be configured to provide feedback (e.g., a status indication) to a user. For example, the control button 152 may be configured to flash and/or change colors to provide the status indication to the user. The status indication may indicate when the motorized window treatment 100 is in a programming mode.

The motor drive unit housing end 150 may include a disable actuator 154 for detecting when the roller tube 110 is not in the operating position. The drive assembly may be deactivated (e.g., automatically deactivated) when the roller tube 110 is not in the operating position. For example, the disable actuator 154 may be configured to deactivate the drive assembly such that the covering material cannot be raised or lowered when the roller tube 110 is not in the operating position. The disable actuator 154 may disable the operation of a motor of the drive assembly, for example, when the roller tube 110 is pivoted (e.g., or slid) from the operating position to the extended position. The disable actuator 154 may enable the operation of the motor when the roller tube 110 reaches the operating position. For example, the disable actuator 154 may be a button, a switch, and/or the like.

In addition, the motor drive unit housing end 150 may also comprise a position detect circuit (not shown) for detecting when the roller tube 110 is not in the operating position and deactivating (e.g., automatically deactivating) the drive assembly (e.g., rather than including the disable actuator 154). For example, the position detect circuit may comprise a magnetic sensing circuit (e.g., a Hall-effect sensor circuit) configured to detect when the motor drive unit housing end 150 is in the extended position and not in close proximity to a magnet (e.g., such as magnet 675 shown in FIG. 8B) located inside of the mounting bracket 130A. For example, the position detect circuit may detect proximity of the magnet to the motor drive unit housing end 150. The position detect circuit may be configured to disable the drive assembly such that the covering material cannot be raised or lowered when the roller tube 110 is not in the operating position. The position detect circuit may disable a motor of the drive assembly, for example, when the roller tube 110 is pivoted (e.g., or slid) from the operating position to the extended position. The position detect circuit may enable the motor when the roller tube 110 reaches the operating position. For example, the position detect circuit may also comprise an IR sensor, a switch, and/or the like.

Figure 2A:
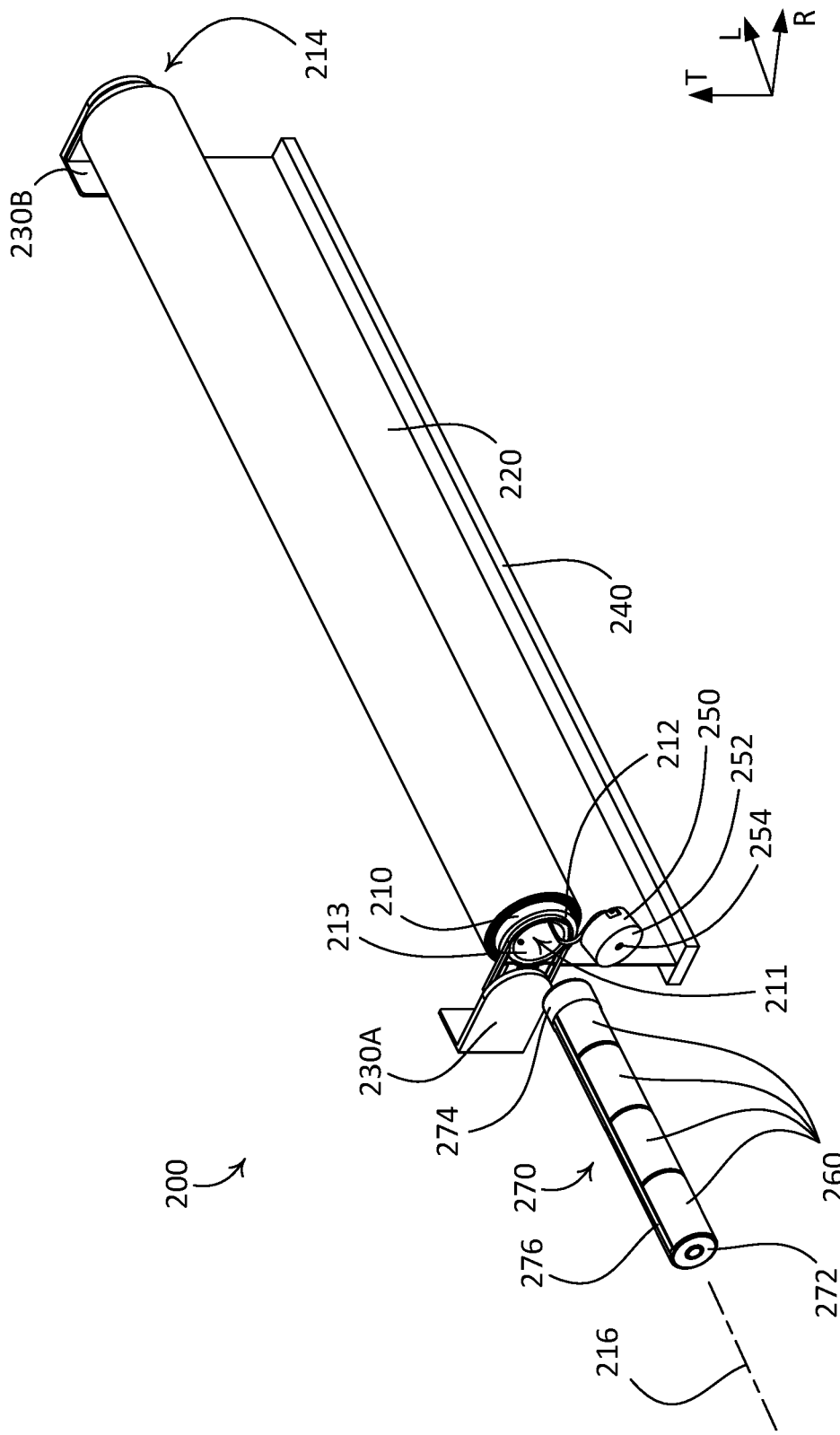
FIG. 2A is a perspective view of another example battery-powered motorized window treatment shown with the batteries removed.
Figure 2B:
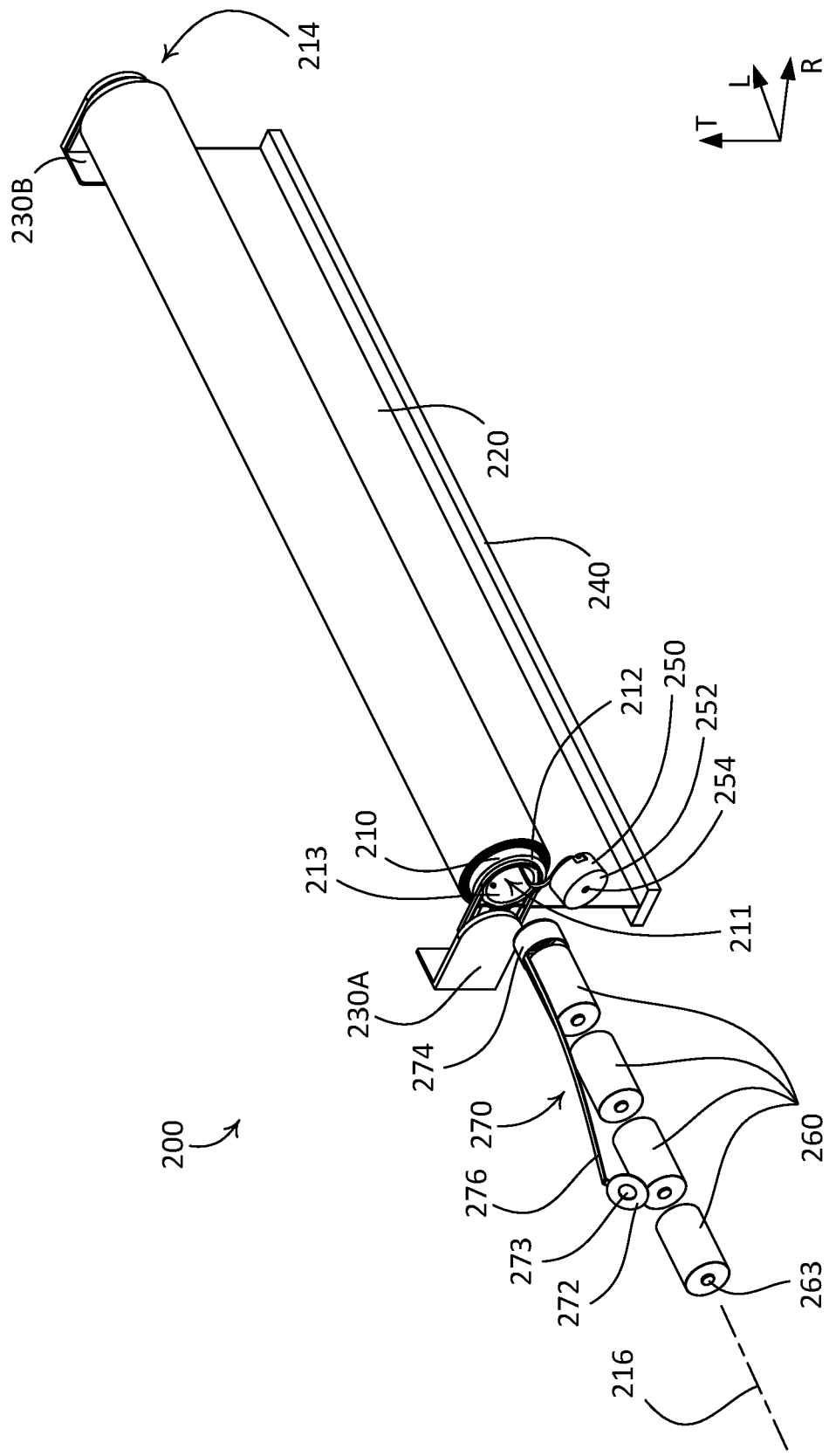
FIG. 2B is another perspective view of the example battery-powered motorized window treatment shown in FIG. 2A with the batteries removed.

FIGS. 2A and 2B depict an example battery-powered motorized window treatment 200 (e.g., such as the motorized window treatment 100 shown in FIGS. 1A and 1B). The battery-powered motorized window treatment 200 may include a roller tube 210 (e.g., such the roller tube 110 shown in FIG. 1A), a flexible material 220 (e.g., a covering material) windingly attached to the roller tube 210, a drive assembly (e.g., such as the motor drive unit 690 shown in FIG. 8A), and a plurality of batteries 260. The battery-powered motorized window treatment 200 may further include a hembar 240 (e.g., such as the hembar 140 shown in FIGS. 1A and 1B) and one or more mounting brackets 230A, 230B (e.g., such as the mounting brackets 130A, 130B shown in FIGS. 1A and 1B). The battery-powered motorized window treatment 200 (e.g., the drive assembly) may be powered by the batteries 260. Although the battery-powered motorized window treatment 200 is shown with four batteries 260, it should be appreciated that the battery-powered motorized window treatment 200 may include a greater or smaller number of batteries. The roller tube 210 may define a longitudinal axis 216. The longitudinal axis 216 may extend along a longitudinal direction L.

The battery-powered motorized window treatment 200 may include a cap 250 that is configured to retain the batteries 260 within the roller tube 210. The cap 250 may be a part of the drive assembly. The cap 250 may define an outer surface 252 with a button 254. The button 254 may be backlit. For example, the button 254 may include a light pipe that is illuminated by an LED within the cap 250. The cap 250 may include a wireless communication circuit (e.g., such as the wireless communication circuit 1542 shown in FIG. 29). The button 254 may be configured to enable a user to change one or more settings of the battery-powered motorized window treatment 200. The button 254 may be configured to enable a user to pair the battery-powered motorized window treatment 200 with a remote control device to allow for wireless communication between the remote control device and the wireless communication circuit in the cap 250. The button 254 may be configured to provide a status indication to a user. For example, the button 254 may be configured to flash and/or change colors to provide the status indication to the user. The button 254 may indicate when the battery-powered motorized window treatment 200 is in a programming mode, for example, via the status indication.

The drive assembly may be at least partially received within the roller tube 210. For example, the roller tube 210 may define a cavity 211 (e.g., a battery compartment) that is configured to receive one or more components of the drive assembly. The cavity 211 may be defined by the inner surface 213 of the roller tube 210. The cavity 211 may be accessible when the battery-powered motorized window treatment 200 is in the extended position (e.g., pivoted) and the cap 250 is removed.

The battery-powered motorized window treatment 200 may include a battery holder 270. The battery holder 270 may be configured to keep the batteries 260 fixed in place securely while the batteries 270 are providing power to the drive assembly. The battery holder 270 may be configured to clamp the batteries 260 together (e.g., as shown in FIG. 2A) such that the batteries 260 can be removed from the battery-powered motorized window treatment 200 at the same time (e.g., together). The battery holder 270 may include a head 272, a base 274, and an arm 276 connecting the head 272 and the base 274. The battery holder 270 may create a spring tension to hold the batteries 260 together. For example, the head 272, the base, 274, and the arm 276 may be configured to apply a tension force to the batteries 260.

The head 272 may define an aperture 273 that is configured to receive a nub 263 of one of the batteries 260, for example, such that the nub 263 can be electrically connected to the cap 250. For example, the nub 263 may extend beyond the head 272 when the batteries are clamped within the battery holder 270. The base 274 may define an aperture configured to receive a spring (e.g., such as spring 682 shown in FIG. 8A) to electrically connect the batteries 260 to a printed circuit board of the motor drive unit. For example, the spring may be located within the cavity 211 proximate to the motor drive unit. Additionally or alternatively, the base 274 may include an electrical contact (e.g., a negative contact). The electrical contact of the battery holder 270 may be electrically connected to the printed circuit board of the motor drive unit. The base 274 (e.g., the electrical contact) may be configured to abut the spring within the roller tube 210 (e.g., the motor drive unit housing). One or more of the batteries 260 may be received (e.g., at least partially received) within the base 274. The battery holder 270 may be configured to be removed from the roller tube 210 (e.g., the cavity 211 of the roller tube 210) while clamping the batteries 260. Although the battery holder 270 is shown having the arm 276, it should be appreciated that the battery holder 270 may include alternate means for clamping and/or securing the batteries 260 together. For example, the battery holder 270 may include a sleeve between the head 272 and the base 274. The sleeve may be configured to surround the batteries 260.

The battery holder 270 may be configured to be removed (e.g., completely removed as shown in FIG. 2A) from the roller tube 210. When the battery holder 270 is removed from the roller tube 210, the batteries 260 may be removed from the battery holder 270 (e.g., as shown in FIG. 2B) while still clamped together. Replacement batteries may be installed in the battery holder 270 and the battery holder 270 may be installed within the cavity 211 of the roller tube 210. When the battery holder 270 is installed within the roller tube 210 (e.g., the cavity 211), the cap 250 may be removably secured to the roller tube 210 (e.g., the end 212), for example, to secure the battery holder 270 within the roller tube 210. Additionally or alternatively, the cap 250 may be configured to be removably secured to the motor drive unit housing.

Figure 3A:
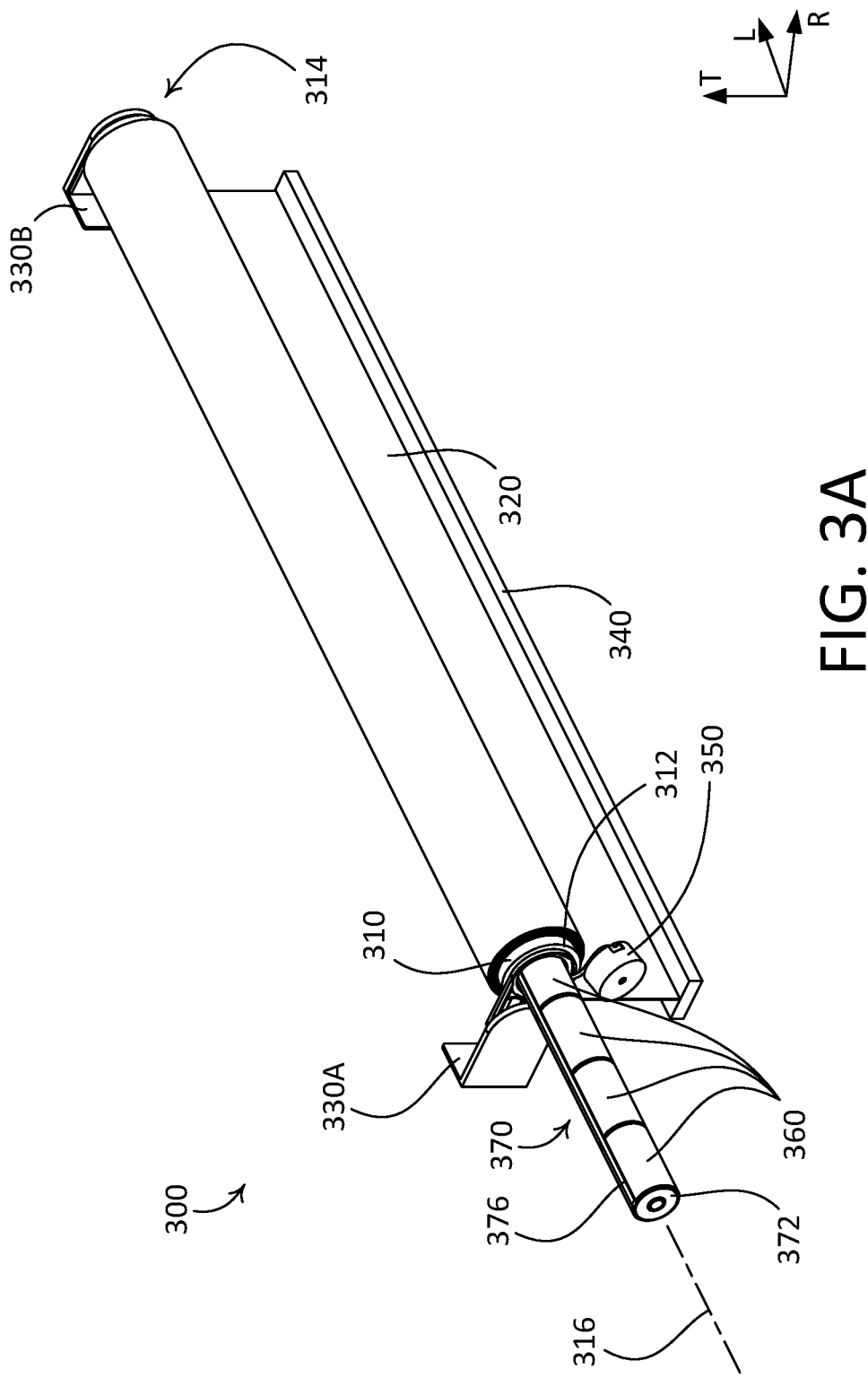
FIG. 3A is a perspective view of another example battery-powered motorized window treatment where the batteries are removed one at a time.
Figure 3B:
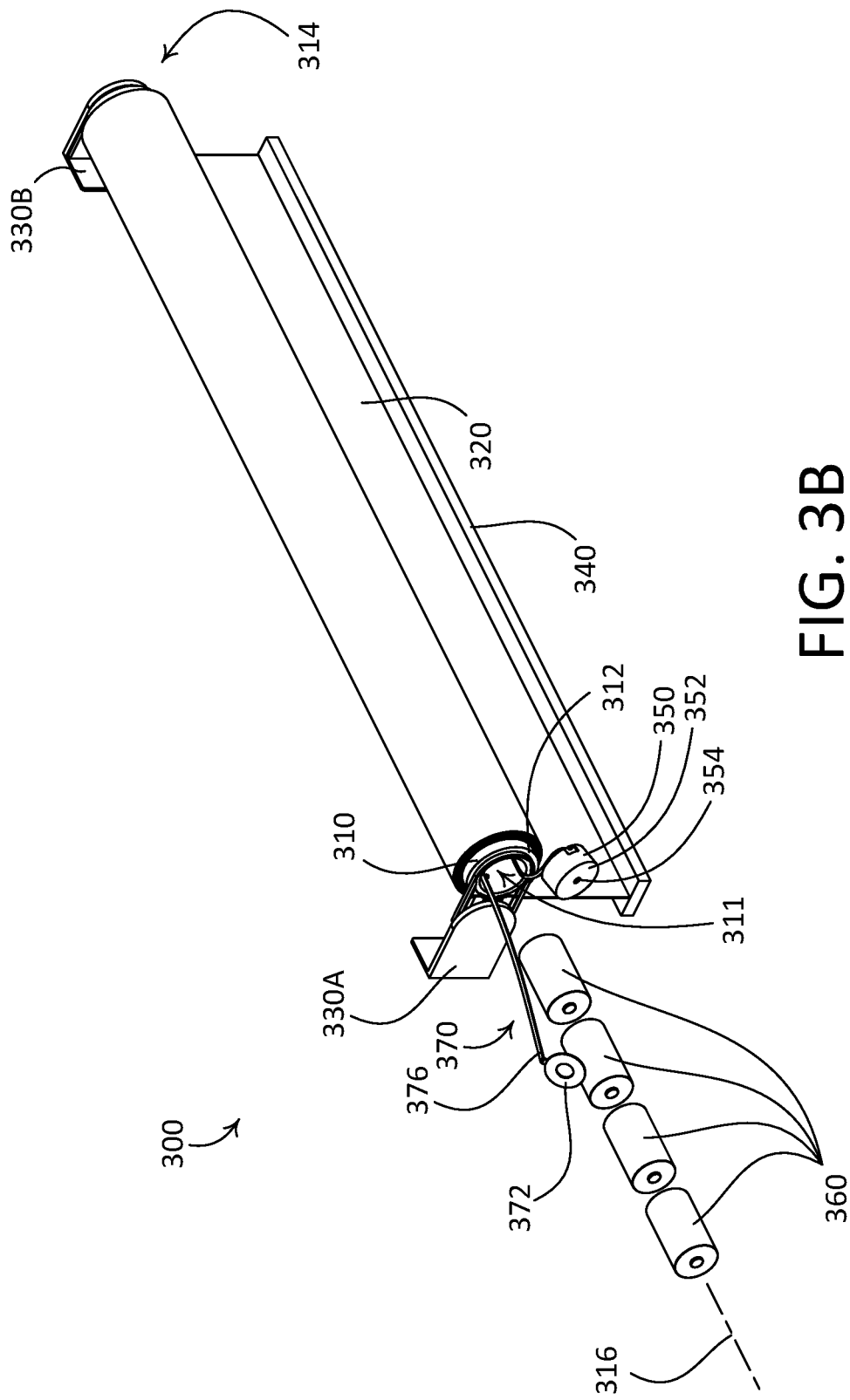
FIG. 3B is another perspective view of the example battery-powered motorized window treatment shown in FIG. 3A.

FIGS. 3A and 3B depict an example battery-powered motorized window treatment 300 (e.g., such as the motorized window treatment 100 shown in FIGS. 1A and 1B and/or the battery-powered motorized window treatment 200 shown in FIGS. 2A and 2B). The battery-powered motorized window treatment 300 may include a roller tube 310 (e.g., such the roller tube 110 shown in FIGS. 1A and 1B and/or the roller tube 210 shown in FIGS. 2A and 2B), a flexible material 320 (e.g., a covering material) windingly attached to the roller tube 310, a drive assembly (e.g., such as the motor drive unit 690 shown in FIG. 8A), and a plurality of batteries 360. The battery-powered motorized window treatment 300 may further include a hembar 340 (e.g., such as the hembar 140 shown in FIGS. 1A and 1B and/or the hembar 240 shown in FIGS. 2A and 2B) and one or more mounting brackets 330A, 330B (e.g., such as the mounting brackets 130A, 130B shown in FIGS. 1A and 1B and/or the mounting brackets 230A, 230B shown in FIGS. 2A and 2B). The roller tube 310 may define a longitudinal axis 6. The longitudinal axis 316 may extend along a longitudinal direction L.

The battery-powered motorized window treatment 300 may include a battery holder 370 (e.g., such as the battery holder 270) that is configured to be received in a cavity 311 (e.g., a battery compartment) of the roller tube 310. The battery-powered motorized window treatment 300 may include a cap 350 (e.g., such as the cap 250 shown in FIGS. 2A and 2B) that is configured to retain the batteries 360 within the roller tube 310. The cap 350 may be removably secured to the end 312 of the roller tube 310. Alternatively, the cap 350 may be removably secured to the motor drive unit housing (e.g., such as the motor drive unit housing 680 shown in FIG. 8A).

The batteries 360 may be configured to be removed from the cavity 311 along the longitudinal axis 316 of the roller tube 310. For example, the cap 350 may be removed (e.g., disengaged from the roller tube 310 and/or the motor drive unit housing) such that the batteries 360 can be accessed. The battery holder 370 may be configured to be translated (e.g., along the longitudinal axis 316 of the roller tube 310) until at least a portion is distal from the end 312 of the roller tube 310. The battery holder 370 may not fully pull out of the roller tube 310. Stated differently, a portion (e.g., an end) of the battery holder 370 may remain within the cavity 311 of the roller tube 310 when the batteries 360 are removed and/or replaced. In this case, one or more of the batteries 360 may be removed from the battery holder 370 while a portion of the battery holder 370 is retained within the roller tube 310 (e.g., the cavity 311). Replacement batteries may be installed within the battery-powered motorized window treatment 300 while the portion of the battery holder 370 is retained within the roller tube 310.

The battery holder 370 may include a head 372 and an arm 376. The head 372 may define an aperture 373 that is configured to receive a nub 363 of one of the batteries 360, for example, such that the nub 363 can be electrically connected to the cap 350. For example, the nub 363 may extend beyond the head 372 when the batteries 360 are clamped within the battery holder 370. The battery holder 370 may be electrically connected to a printed circuit board of the motor drive unit. For example, the battery holder 370 may be configured to abut a spring (e.g., such as spring 682 shown in FIG. 8A) within the roller tube 310 (e.g., the motor drive unit housing).

Figure 4A:
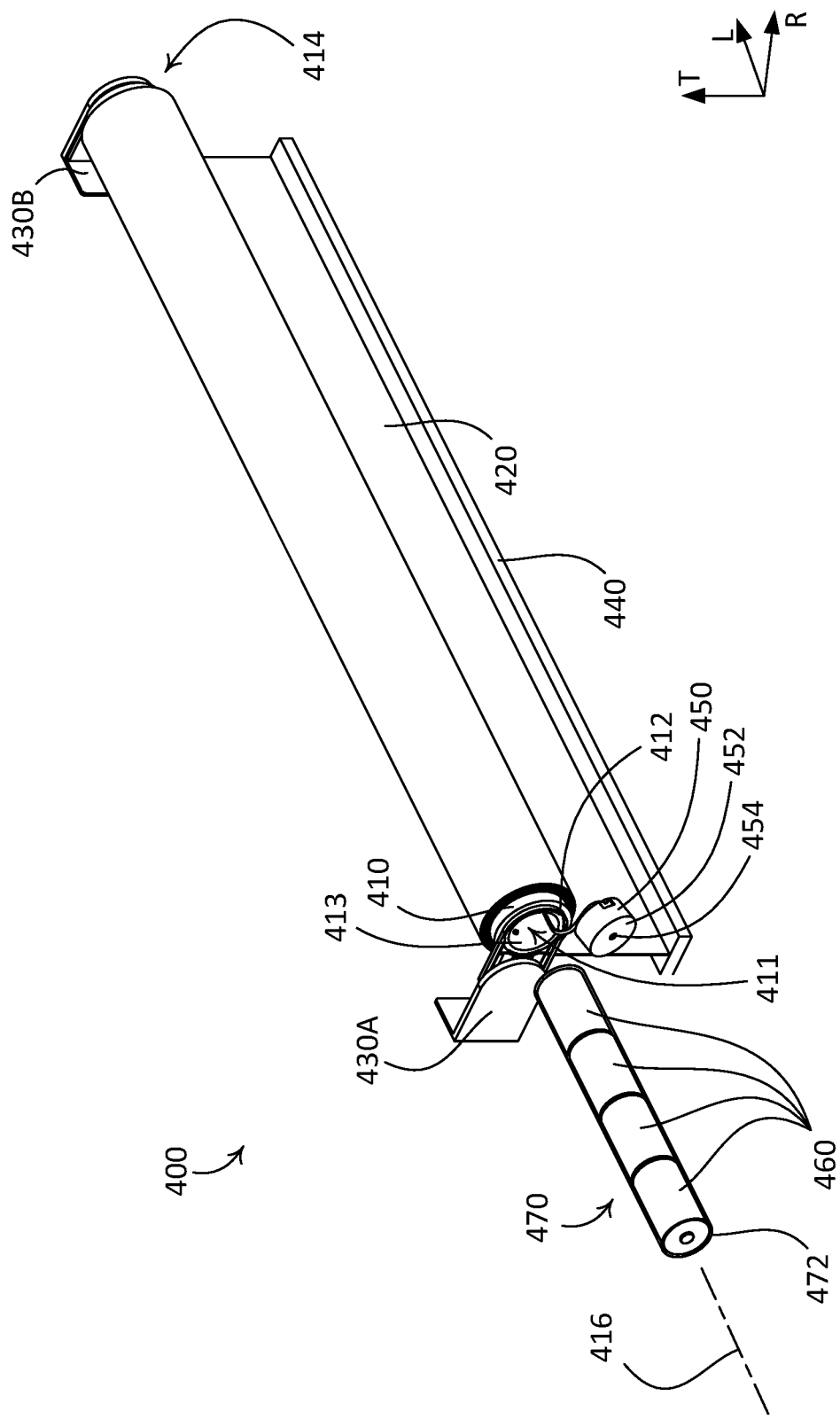
FIG. 4A is a perspective view of another example battery-powered motorized window treatment with a tube configured to retain the batteries.
Figure 4B:
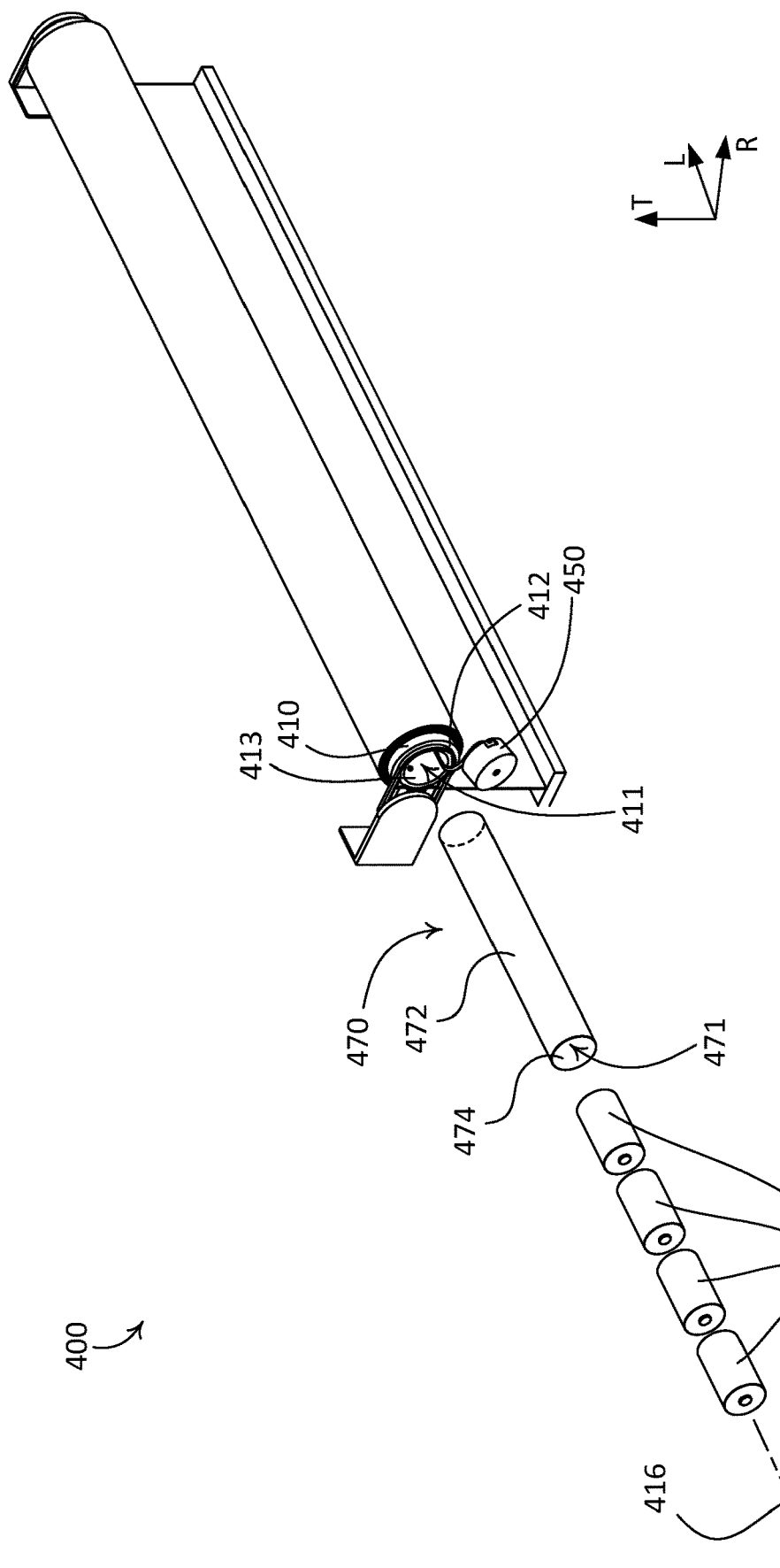
FIG. 4B is another perspective view of the example battery-powered motorized window treatment shown in FIG. 4A.

FIGS. 4A and 4B depict an example battery-powered motorized window treatment 400 (e.g., such as the motorized window treatment 100 shown in FIGS. 1A and 1B, the battery-powered motorized window treatment 200 shown in FIGS. 2A and 2B, and/or the battery-powered motorized window treatment 300 shown in FIGS. 3A and 3B) with a battery holder 470 configured to retain the batteries 460. The battery holder 470 may be configured to be received in a cavity 411 (e.g., a battery compartment) of the roller tube 410. The battery-powered motorized window treatment 400 may include a cap 450 (e.g., such as the cap 250 shown in FIGS. 2A and 2B) that is configured to retain the batteries 460 and the battery holder 470 within the roller tube 410. The cap 450 may be removably secured to the end 412 of the roller tube 410. Alternatively, the cap 450 may be removably secured to the motor drive unit housing (e.g., such as the motor drive unit housing 680 shown in FIG. 8A). The roller tube 410 may define a longitudinal axis 416. The longitudinal axis 416 may extend along a longitudinal direction L.

The battery holder 470 may define a hollow tube with an outer surface 472, an inner surface 474, and a bore 471. The bore 471 may be configured to receive the batteries 460. For example, the bore 471 may retain the batteries 460 within the battery holder 470. For example, the inner surface 474 may abut the batteries 460 when the batteries are installed within the battery holder 470. The outer surface 472 may be configured to abut an inner surface 413 of the roller tube 410, for example, when the battery holder 470 is installed within the roller tube 410. The battery holder 470 may be transparent or semi-transparent such that the batteries 460 are visible through the outer surface 472. The battery holder 470 (e.g., the hollow tube) may be semi-rigid.

The batteries 460 and the battery holder 470 may be configured to be removed from the cavity 411 along the longitudinal axis 416 of the roller tube 410. For example, the cap 450 may be removed (e.g., disengaged from the roller tube 410 and/or the motor drive unit housing) such that the batteries 460 and battery holder 470 can be accessed. The battery holder 470 may be configured to be translated (e.g., along the longitudinal axis 416 of the roller tube 410) until it is removed from the roller tube 410. The batteries 460 may remain within the battery holder 470 of the roller tube 410 when the battery holder 470 is removed from the cavity 411. The batteries 460 may be removed from the battery holder 470 when it is removed from the cavity 411. Replacement batteries may be installed within the battery holder 470 while it is removed from the cavity 411. The battery holder 470 may be open at opposed ends, for example, such that the batteries 460 can be electrically connected to a printed circuit board of the motor drive unit. For example, one of the batteries 460 (e.g., the battery distal from the end 413 of the roller tube 410 when the battery holder 470 is installed within the cavity 411) may be configured to abut a spring (e.g., such as spring 682 shown in FIG. 8A) within the roller tube 410 (e.g., the motor drive unit housing). And, one of the batteries 460 (e.g., the battery proximate to the end 413 of the roller tube 410 when the battery holder 470 is installed within the cavity 411) may be configured to abut an electrical contact (e.g., the electrical contact 656 shown in FIG. 8A) within the cap 450.

FIG. 5A depicts an example battery-powered motorized window treatment 500 (e.g., such as the motorized window treatment 100 shown in FIGS. 1A and 1B, the battery-powered motorized window treatment 200 shown in FIGS. 2A and 2B, the battery-powered motorized window treatment 300 shown in FIGS. 3A and 3B, and/or the battery-powered motorized window treatment 400 shown in FIGS. 4A and 4B) with a battery holder 570 configured to retain the batteries 560. The battery holder 570 may be configured to be received in a cavity 511 (e.g., a battery compartment) of the roller tube 510. The battery-powered motorized window treatment 500 may include a cap 550 (e.g., such as the cap 250 shown in FIGS. 2A and 2B) that is configured to retain the batteries 560 and the battery holder 570 within the roller tube 510. The cap 550 may be removably secured to the end 512 of the roller tube 510. Alternatively, the cap 550 may be removably secured to the motor drive unit housing (e.g., such as the motor drive unit housing 680 shown in FIG. 8A). The roller tube 510 may define a longitudinal axis 516. The longitudinal axis 516 may extend along a longitudinal direction L.

Figure 5B:
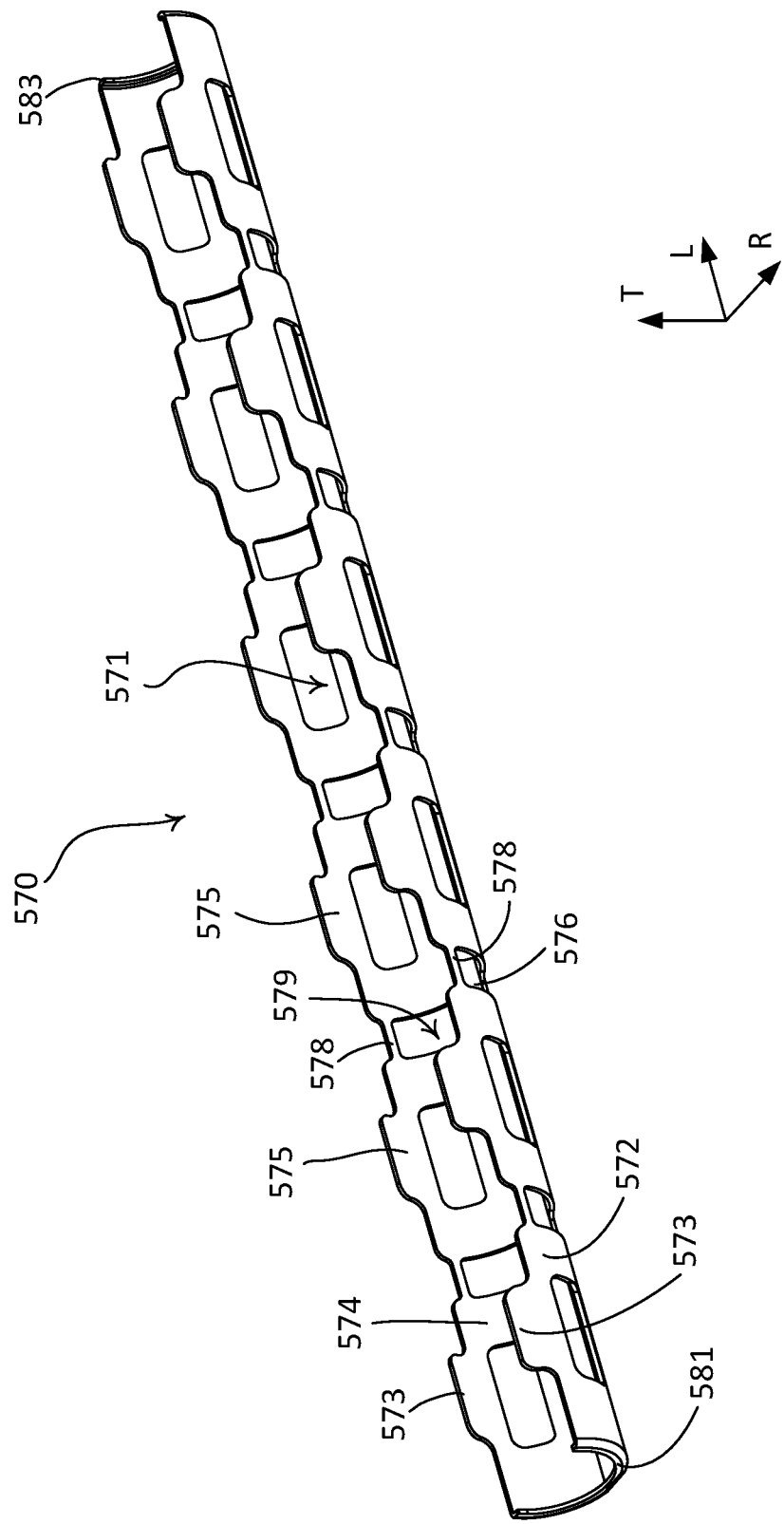
FIG. 5B is a perspective view of a battery holder of the example battery-powered motorized window treatment shown in FIG. 5A.

FIG. 5B is a perspective view of the battery holder 570 without the batteries 560 installed. The battery holder 570 may define a cylindrical compartment having a recess 571, an outer surface 572, and an inner surface 574. The cylindrical compartment may define a semi-circular cross-section that extends approximately 180 degrees. The recess 571 may be configured to receive the batteries 560. For example, the recess 571 may retain the batteries 560 within the battery holder 570. For example, the inner surface 574 may abut the batteries 560 when the batteries are installed within the battery holder 570. The outer surface 572 may be configured to abut an inner surface 513 of the roller tube 510, for example, when the battery holder 570 is installed within the roller tube 510.

The batteries 560 and the battery holder 570 may be configured to be removed from the cavity 511 along the longitudinal axis 516 of the roller tube 510. For example, the cap 550 may be removed (e.g., disengaged from the roller tube 510 and/or the motor drive unit housing) such that the batteries 560 and battery holder 570 can be accessed. The battery holder 570 may be configured to be translated (e.g., along the longitudinal axis 516 of the roller tube 510) until it is removed from the roller tube 510. The batteries 560 may remain within the battery holder 570 of the roller tube 510 when the battery holder 570 is removed from the cavity 511. The batteries 560 may be removed from the battery holder 570 when it is removed from the cavity 511. Replacement batteries may be installed within the battery holder 570 while it is removed from the cavity 511. The battery holder 570 may be open at opposed ends, for example, such that the batteries 560 can be electrically connected to a printed circuit board of the motor drive unit. For example, one of the batteries 560 (e.g., the battery distal from the end 513 of the roller tube 510 when the battery holder 570 is installed within the cavity 511) may be configured to abut a spring (e.g., such as spring 682 shown in FIG. 8A) within the roller tube 510 (e.g., the motor drive unit housing). And, one of the batteries 560 (e.g., the battery proximate to the end 513 of the roller tube 510 when the battery holder 570 is installed within the cavity 511) may be configured to abut an electrical contact (e.g., the electrical contact 656 shown in FIG. 8A) within the cap 550.

The battery holder 570 may comprise multiple sections 575, which may each be configured to hold one of the batteries 560 (e.g., as shown in FIG. 5A). The sections 575 may be connected together via flexible portions 576 and linking portions 578. For example, the battery holder 570 may comprise one flexible portion 576 and two linking portions 578 between each pair of adjacent sections 575. The flexible portions 576 and the linking portion 578 may extend along the longitudinal axis L of the roller tube 510 between the sections 575 of the battery holder 575, such that gaps 579 are formed between the flexible portion 576 and each respective linking portion 578. The flexible portions 576 may be arranged towards a lower side of the battery holder 570 (e.g., as shown in FIG. 5B) and the linking portions 578 may be arranged on opposite sides of the recess 571 of the battery holder 570 (e.g., along the radial direction R). The linking portions 578 may be configured to hold the sections 575 together in rigid connection. For example, the linking portions 578 may prevent relative movement between the sections 575. The linking portions 578 may be configured to be disconnected from respective sections 575. The linking portions 578 may be thinner than the flexible portions 576, such that the linking portions 578 may be cut by a tool (e.g., wire cutters) to along the flexible portions 576 to flex (e.g., away from the longitudinal axis). When the linking portions 578 are disconnected (e.g., cut away) from respective sections 575, the flexible portions 576 may flex, for example, to allow the batteries 560 to be removed from the cavity 511 when the mounting bracket 530A is located near a wall. For example, the flexible portions 576 may be configured to bend (e.g., in response to an applied force) to allow the battery holder 570 to be bent (e.g., curved) while being removed and/or installed from/into the roller tube 510. The flexible portions 576 may be resilient such that the battery holder 570 are linear when the applied force is removed. For example, the sections 575 may be arranged linearly when no force is applied to the battery holder 570.

The battery holder may comprise tabs 573 extending from opposed sides (e.g., along the radial direction R) of each of the sections 575. The tabs 573 may extend beyond 180 degrees (e.g., the semi-circular cross-section of the battery holder 570). A pair of the tabs 573 in a specific section 575 may be configured to abut and apply a force to a respective battery of the batteries 560 to retain the respective battery within the cavity 571 in the transverse direction T. Each pair of the tabs 573 may be separated (e.g., in the longitudinal direction L) by less than a diameter of the batteries 560 both when no battery is installed in a respective section 575 and when a battery is installed in the respective section 575. The tabs 573 may be configured to be biased outward (e.g., flex outward from their resting position) to enable the batteries 560 to be installed within the battery holder 570 (e.g., the cavity 571). The battery holder 570 may comprise lips 581, 583 at respective ends of the battery holder 570. The lips 581, 583 may be configured to prevent the batteries 560 from translating out of the battery holder 570 (e.g., the cavity 571) in the longitudinal direction L. For example, the lips 581, 583 may be configured to abut and apply a force to a respective battery of the batteries 560 to retain the batteries 560 within the cavity 571 in the longitudinal direction L.

Figure 6:
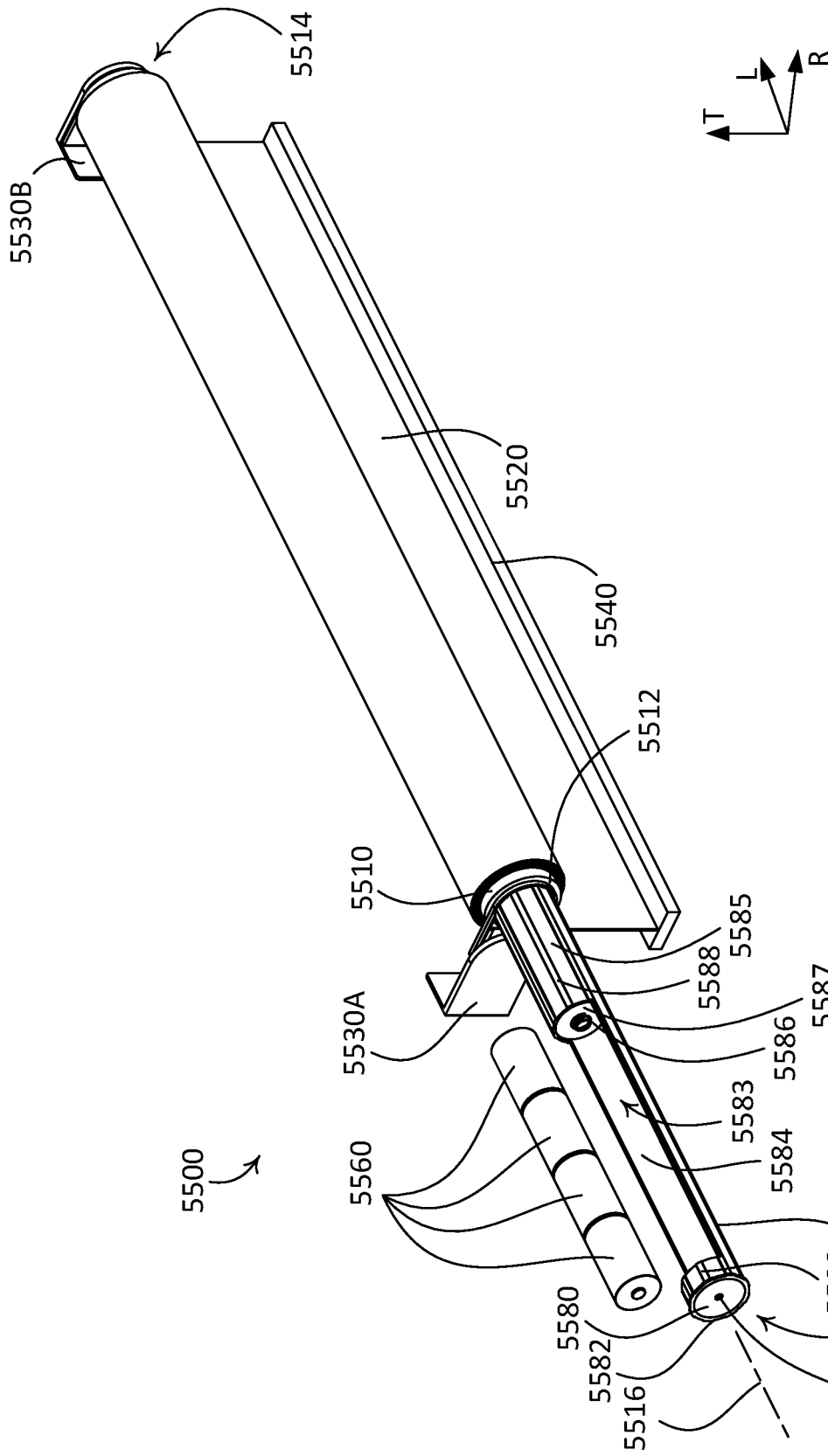
FIG. 6 is a perspective view of another example battery-powered motorized window treatment with a motor housing partially removed from the roller tube to access the batteries.

FIG. 6 is a perspective view of an example battery-powered motorized window treatment 5500 (e.g., such as the motorized window treatment 100 shown in FIGS. 1A and 1B, the battery-powered motorized window treatment 200 shown in FIGS. 2A and 2B, and/or the battery-powered motorized window treatment 300 shown in FIGS. 3A and 3B). The battery-powered motorized window treatment 5500 may include a roller tube 5510 (e.g., such the roller tube 110 shown in FIGS. 1A and 1B, the roller tube 210 shown in FIGS. 2A and 2B, and/or the roller tube 310 shown in FIGS. 3A and 3B), a flexible material 5520 (e.g., a covering material) windingly attached to the roller tube 5510, a motor drive unit 5590 (e.g., a drive assembly), and a plurality of batteries 5560. The battery-powered motorized window treatment 5500 may further include a hembar 5540 (e.g., such as the hembar 140 shown in FIGS. 1A and 1B, the hembar 240 shown in FIGS. 2A and 2B, and/or the hembar 340 shown in FIGS. 3A and 3B) and one or more mounting brackets 5530A, 5530B (e.g., such as the mounting brackets 130A, 130B shown in FIGS. 1A and 1B, the mounting brackets 230A, 230B shown in FIGS. 2A and 2B, the mounting brackets 330A, 330B shown in FIGS. 3A and 3B, and/or the mounting brackets 430A, 430B shown in FIGS. 4A and 4B).

The motor drive unit 5590 may include a motor drive unit housing 5580. The motor drive unit housing 5580 may be configured to be received within the roller tube 5510. The motor drive unit housing 5580 may be a hollow shell that defines an outer surface 5581 and an inner surface 5584. For example, the motor drive unit housing 5580 may be configured to house the components of the motor drive unit 5590 and the batteries 5560. The motor drive unit housing 5580 may define a first portion 5585 that encloses assembly motor (e.g., such as the motor 696 shown in FIG. 8A) and motor drive circuitry of the motor drive unit 5590, a second portion 5582 that is configured to retain the batteries 5560 within the roller tube 5510, and a third portion 5584 that is configured to receive the batteries 5560. For example, the third portion 5584 may be a battery holder that is configured to retain the batteries 5560 therein. The third portion 5584 may define a trough 5583 (e.g., a battery compartment) that is configured to receive the batteries 5560. The trough 5583 of the third portion 5584 may be defined by a cutout of an upper portion of the motor drive unit housing 5580 (e.g., between the first portion 5585 and the second portion 5582). For example, the motor drive unit housing 5580 may include a cutout between the first portion 5585 and the second portion 5582 that defines the trough 5583.

The motor drive unit housing 5580 may be configured to be removed (e.g., at least partially removed) from the roller tube 5510. When the motor drive unit housing 5580 is partially removed from the roller tube 5510, the batteries 5560 may accessible, for example, for replacement. For example, a user may adjust the battery-powered motorized window treatment 5500 to an extended position (e.g., slid or pivoted position) and may translate the motor drive unit housing 5580 along the longitudinal axis 5516 such that the third portion 5584 (e.g., the trough 5583) is external to the roller tube 5510. The batteries 5560 may be accessible when the third portion 5584 is external to the roller tube 5510. The batteries 5560 may rest within the trough 5583 or may be placed within a battery holder and then installed within the trough 5583.

The battery-powered motorized window treatment 5500 may include a spring 5586. The spring 5586 may extend from the first portion 5585 (e.g., an end 5587) of the motor drive unit housing 5580, for example, into the trough 5583. The spring 5586 may be configured to abut and apply a force to one of the batteries 5560, for example, such that the batteries 5560 remain in contact with one another while installed within the motor drive unit housing 5580. The spring 5586 may be configured to apply a force to the batteries 5560 to maintain electrical connection of the batteries 5560 with the spring 5586 and an electrical contact on the second portion 5582 of the motor drive unit housing 5580. The spring 5586 may be configured as another electrical contact (e.g., the negative electrical contact). The spring 5586 and the electrical contact on the second portion 5582 may be electrically connected to the motor drive circuitry of the motor drive unit 5590 (e.g., a motor drive printed circuit board of the motor drive unit 5590).

Figure 7:
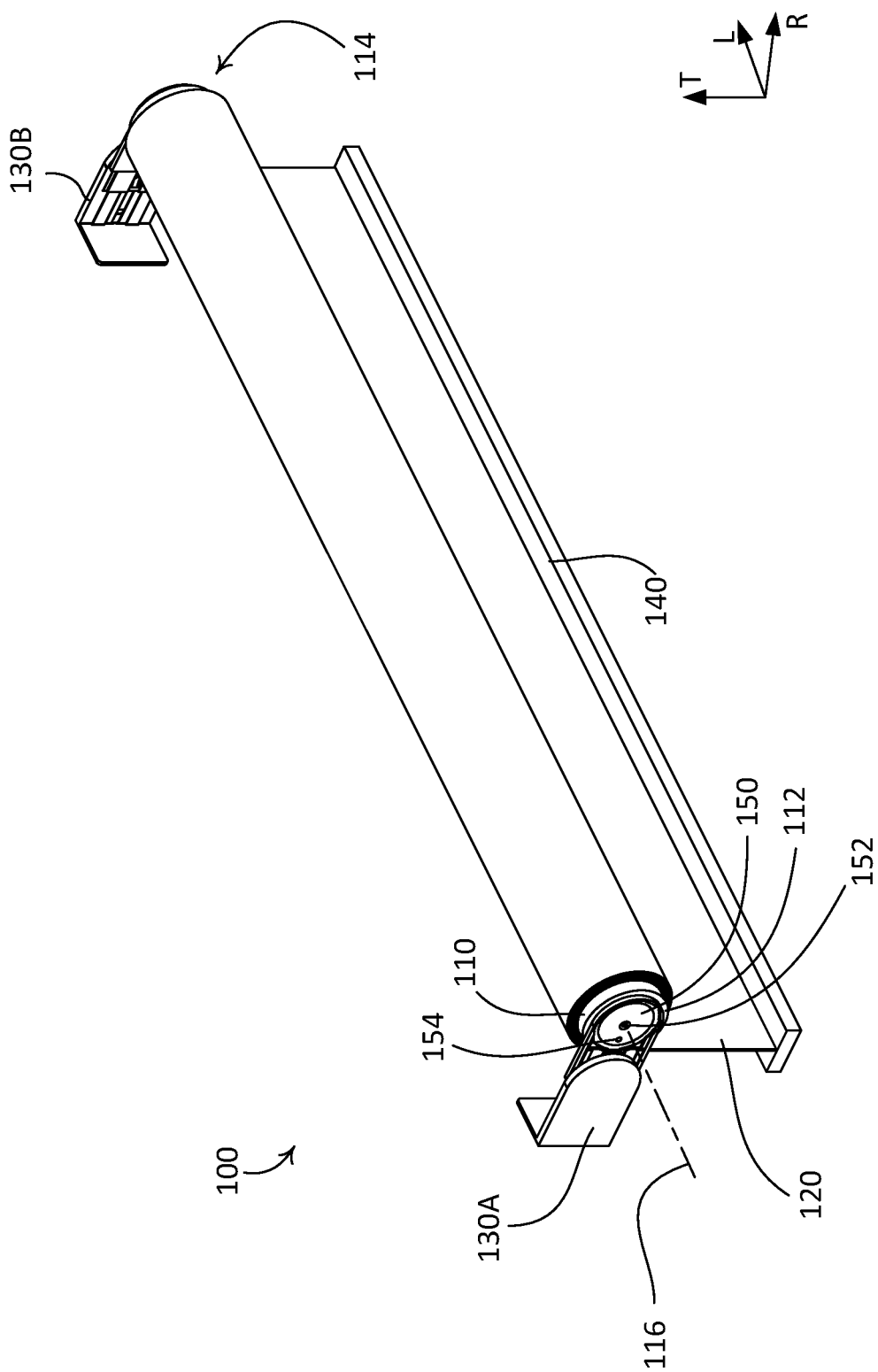
FIG. 7 is a perspective view of another example battery-powered motorized window treatment with both ends of the roller tube in a pivoted position.
Figure 11:
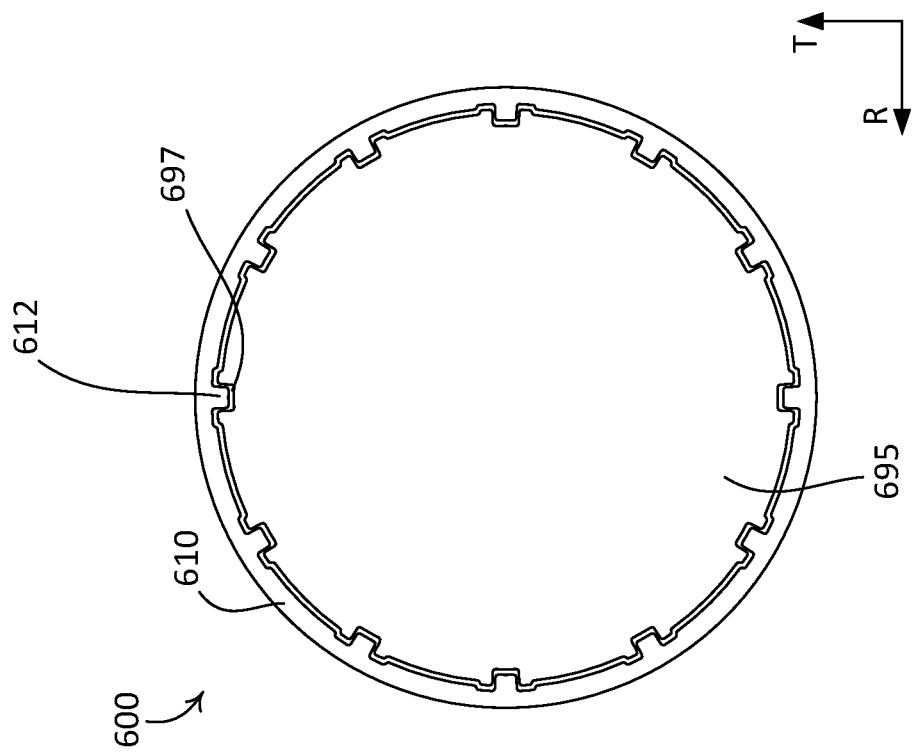
FIG. 11 is a right-side view of the example battery-powered motorized window treatment shown in FIG. 8A.
Figure 10:
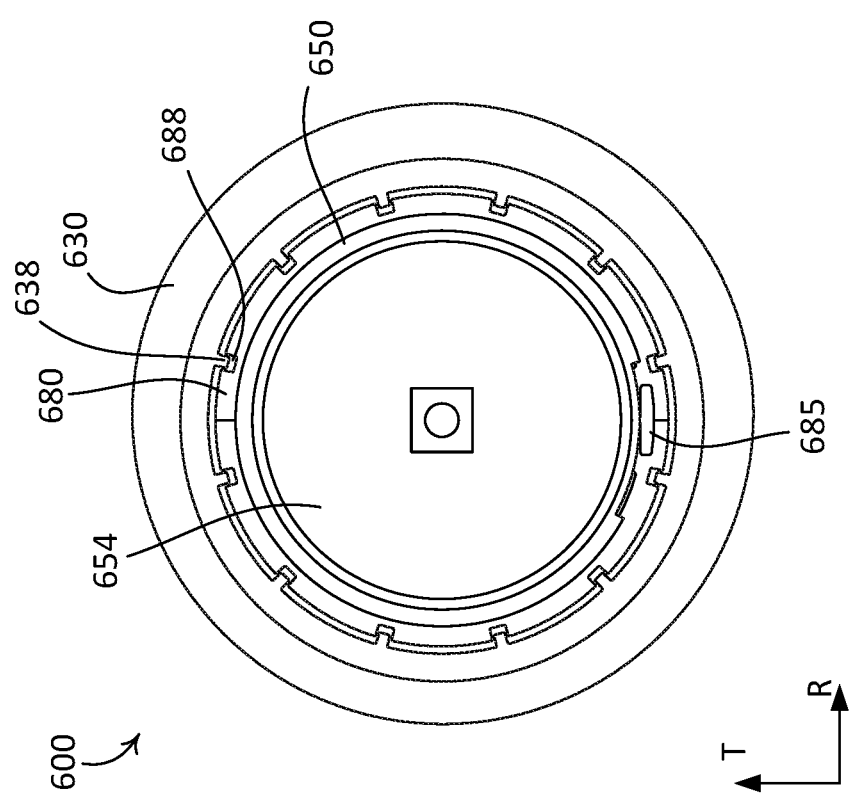
FIG. 10 is a left-side view of the example battery-powered motorized window treatment shown in FIG. 8A.

The mounting brackets 5530A, 5530B may be keyed to the respective end 5512, 5514 of the roller tube 5510. For example, the motor drive unit housing 5580 may define an outer surface 5581 that may include one or more splines 5588. The splines 5588 may extend along the length of the motor drive unit housing 5580, for example, from the first portion 5585 to the second portion 5582. The splines 5588 (e.g., on the second portion 5582) may engage with the mounting brackets 5530A, 5530B (e.g., corresponding features of the mounting brackets 5530A, 5530B). For example, the mounting brackets 530A, 530B may define one or more grooves (e.g., as shown in FIGS. 10 and 11) that are configured to receive the splines 5588. The splines 5588 may be configured to enable the motor drive unit 5590 to torque against one or more of the mounting brackets 5530A, 5530B. For example, the motor drive unit 5590 may drive against one or more of the mounting brackets 5530A, 5530B as the covering material 5520 is operated between a raised (e.g., open) position and a lowered (e.g., closed) position FIG. 7 depicts the example motorized window treatment 100 in an extended position. The mounting bracket 130B may include a sliding portion. The sliding portion of the mounting bracket 130B may enable a second end 114 of the roller tube 110 to be accessible. For example, when the motorized window treatment 100 is in the extended position the second end 114 of the roller tube 110 may be further from a window and/or the structure to which the mounting bracket 130B is anchored than when the motorized window treatment 100 is in an operating position. Stated differently, both mounting brackets 130A, 130B of the motorized window treatment 100 may be configured to slide out when the motorized window treatment is operated to the extended position.

The extended position may define a translated position, for example, as shown in FIG. 7, where both of the mounting brackets 130A, 130B extend such that both ends of the roller tube 110 are accessible (e.g., at the same time). The translated position may enable pre-winding of a motor drive spring (e.g., such as spring assist assembly 616 shown in FIGS. 9A and 9B). For example, the motorized window treatment 100 may be rotated in the translated position to pre-wind the motor drive spring.

FIGS. 8A-11 depict an example battery-powered motorized window treatment 500 (e.g., such as the motorized window treatment 100 shown in FIGS. 1A and 1B, the battery-powered motorized window treatment 200 shown in FIGS. 2A and 2B, the battery-powered motorized window treatment 300 shown in FIGS. 3A and 3B, the battery-powered motorized window treatment 400 shown in FIGS. 4A and 4B, the battery-powered motorized window treatment 500 shown in FIG. 5A, and/or the battery-powered motorized window treatment 5500 shown in FIG. 6) in an operating position. The battery-powered motorized window treatment 600 may include a roller tube 610, a motor drive unit 690, a plurality of batteries 660, and one or more mounting brackets 630, 631. The operating position may be defined as a position in which the roller tube 610 is supported by and aligned with both of the mounting brackets 630, 631. The battery-powered motorized window treatment 600 may be configured to be operated between the operating position and an extended position, for example, to enable access to replace the batteries 660. The extended position may be defined as a position in which one or more ends of the roller tube 610 are accessible while still attached to the mounting brackets 630, 631. The extended position may define a pivoted position, for example, as shown in FIGS. 1B-6, where one of the mounting brackets 630, 631 extends such that the batteries 660 are accessible via the end of the roller tube 610. Although not shown in FIGS. 8A-11, the battery-powered motorized window treatment 600 may include a flexible material windingly attached to the roller tube 610 and a hembar that is coupled to a bottom or lower end of the flexible material.

The mounting bracket 630 may be configured to attach the battery-powered motorized window treatment 600 to a horizontal structure (e.g., such as a ceiling). The mounting bracket 630 may define a base 638 and an arm 632. The base 638 and the arm 632 may define a stationary portion of the mounting bracket 630. The mounting bracket 630 may define a translating portion 634. The translating portion 634 may include an attachment member 633 that is configured to receive an end of the roller tube 610 and/or a motor drive unit housing 680. The attachment member 633 may define an aperture. The base 638 may be configured to attach the mounting bracket 630 to a structure. The structure may include a window frame (e.g., a head jamb or side jambs of a window frame), a wall, a ceiling, or other structure, such that the battery-powered motorized window treatment 600 is mounted proximate to an opening (e.g., over the opening or in the opening), such as a window for example. When the mounting bracket 630 is attached to a vertical structure, such as a wall, the arm 632 of the mounting bracket 630 may extend horizontally (e.g., in the radial direction R) from the base 638.

Figure 12B:
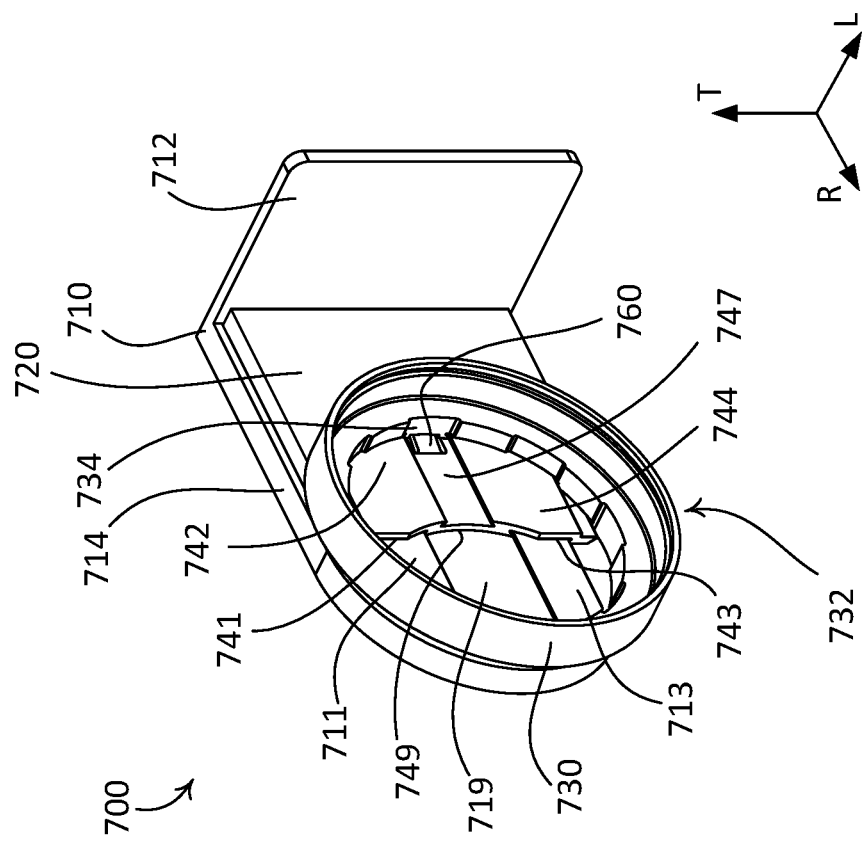
FIG. 12B is a rear perspective view of the example mounting bracket shown in FIG. 12A.
Figure 12A:
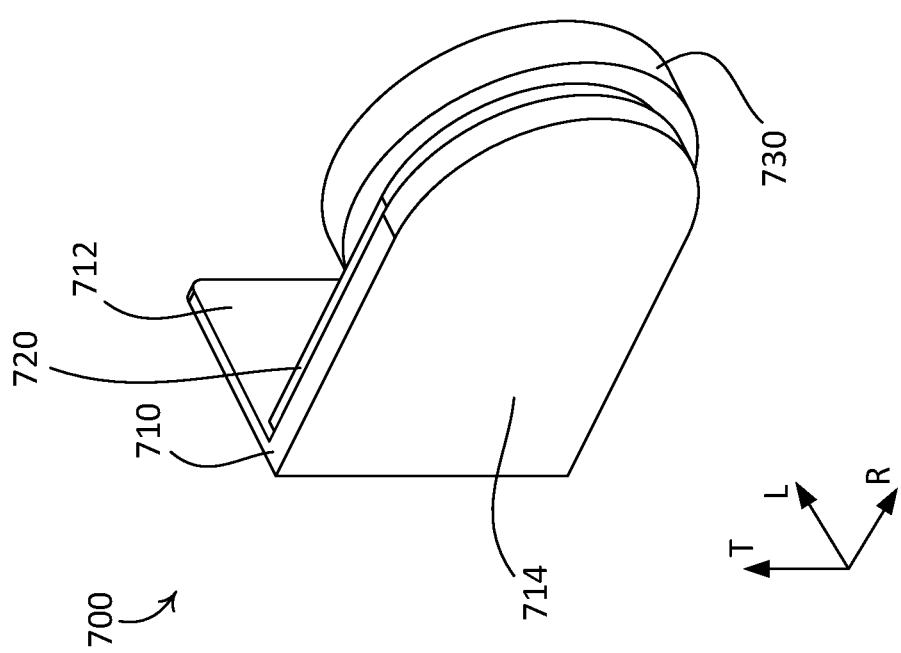
FIG. 12A is a front perspective view of an example mounting bracket for mounting a battery-powered motorized window treatment (e.g., to a vertical surface, such as a wall).
Figures 13A, 13B:
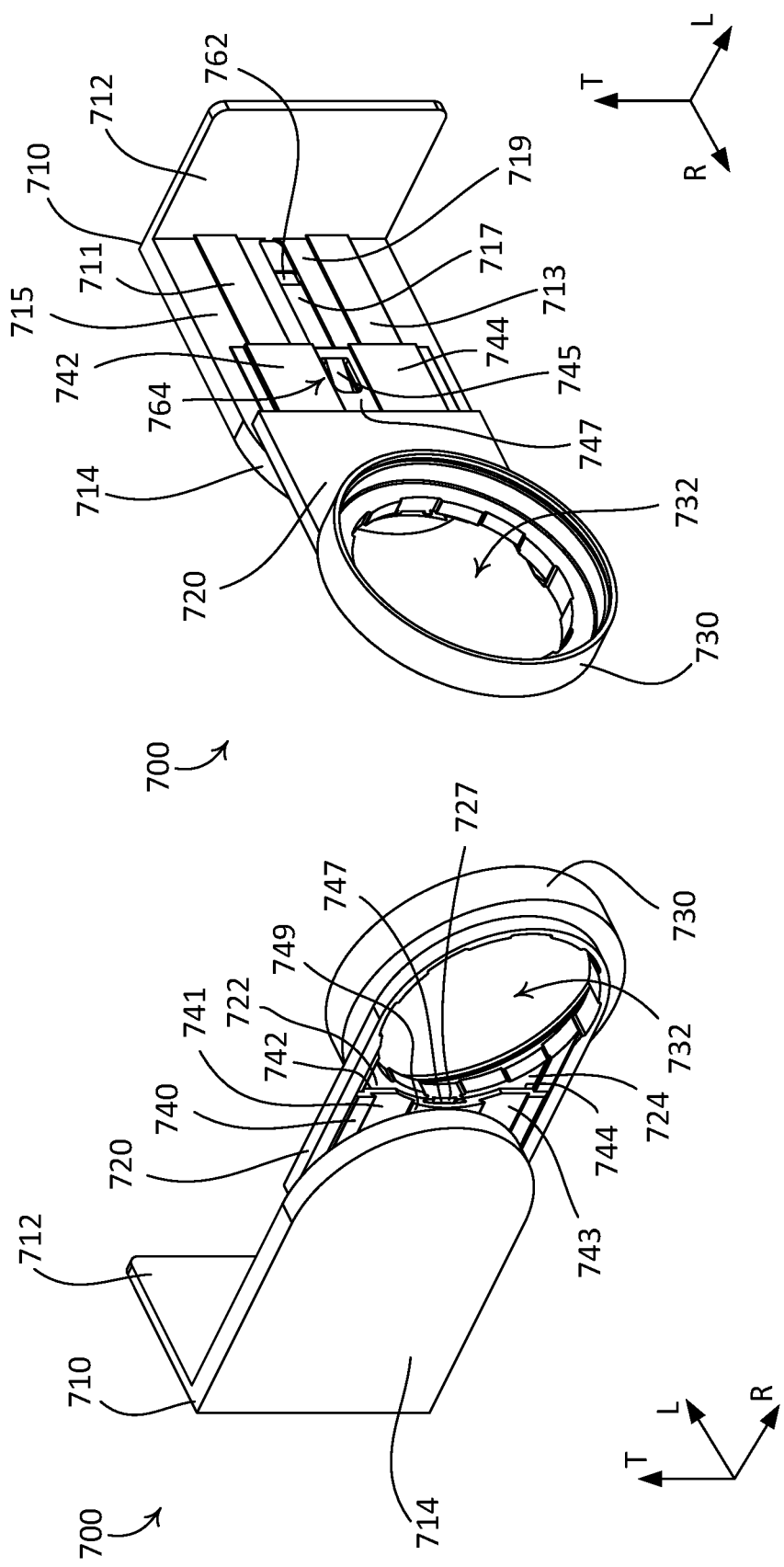
FIG. 13A is a front perspective view of the example mounting bracket shown in FIG. 12A in an extended position.
FIG. 13B is a rear perspective view of the example mounting bracket shown in FIG. 12A in the extended position.

The translating portion 634 may be configured to translate the roller tube 610 between the operating position (e.g., as shown in FIGS. 12A and 12B) and the extended position (e.g., as shown in FIGS. 13A and 13B). The translating portion 634 may be proximate to the base 638 when in the operating position and distal from the base 638 when in the extended position. The end of the roller tube 610 and/or the motor drive unit housing 680 may be accessible via the aperture (e.g., to replace the batteries 660) when the translating portion 634 is in the extended position.

The arm 632 may define one or more features that enable the translating portion 634 to be translated between the operating position and the extended position while remaining attached thereto. The translating portion 634 may define one or more corresponding features that are configured to cooperate with the one or more features on the arm 632. The arm 632 may define one or more slides 635 (e.g., an upper slide and a lower slide). The slides 635 may protrude from an inner surface of the arm 632. The translating portion 634 may define one or more channels (e.g., an upper channel and a lower channel) that are configured to receive the slides 635. The translating portion 634 may define a middle slide 636, for example, between the channels. The arm 632 may define a channel (e.g., a middle channel) that is configured to receive the middle slide 636. The slides 635, 636 and the channels may define angled edges (e.g., tapered edges) such that the attachment of the translating position 634 to the arm 632 defines an interlocking slide, e.g., such as a dovetail slide. The translating portion 634 may translate along the slides 635 between the operating position and the extended position. For example, the translating portion 634 may translate along the slides 635 in the radial direction R.

The mounting bracket 630 may be configured to be secured (e.g., locked) in the operating position and the extended position. The mounting bracket 630 (e.g., the translating portion) may define a locking tab (e.g., such as the locking tab 722 shown in FIGS. 12B and 13B). In addition, the mounting bracket 630 may comprise a release button (not shown) that may need to be actuated by a user in order to be released the mounting bracket 630 from the operating position and be moved into the extended position.

The motor drive unit 690 may include a motor drive printed circuit board 692, an intermediate storage device 694, a motor 696, and a gear assembly 698. The intermediate storage device 694 may include one or more capacitors (e.g., super capacitors) and/or one or more rechargeable batteries. The intermediate storage device 694 may be configured to power the motor 696 when one or more of the batteries 660 are not installed within the roller tube 610, for example, such that position data is retained (e.g., on the motor drive printed circuit board 692). The motor drive unit 690 may be operatively coupled to the roller tube 610, for example, via a coupler 695 (e.g., a drive coupler). The coupler 695 may be an output gear that is driven by the motor 696 and transfers rotation of the motor 696 to the roller tube 610. For example, the coupler 695 may define a plurality of grooves 697 about its periphery. An inner surface of the roller tube 610 may be splined. That is, the inner surface of the roller tube 610 may define a plurality of splines 612. The grooves 697 may be configured to engage respective splines 612 such that rotation of the motor 696 is transferred to the roller tube 610, for example, via the coupler 695. The motor drive unit 690 may be configured to detect when one or more batteries 660 are not installed, for example, when the roller tube 610 is in the operating position. When the motor drive unit 690 detects that one or more batteries 660 are not installed and the roller tube 610 is in the operating position, the motor drive unit 690 may prevent rotation of the roller tube 610. In doing so, the motor drive unit 690 may prevent depletion of the intermediate storage device 694.

The battery-powered motorized window treatment 600 (e.g., the motor drive unit 690) may include an inner bearing 620 and an outer bearing 640 that are located external to the roller tube 610. The inner bearing 620 and the outer bearing 640 may be non-metallic (e.g., plastic) sleeve bearings. The inner bearing 620 and the outer bearing 640 may be captured between the roller tube 610 and the mounting bracket 630. The inner bearing 620 may engage the motor drive unit housing 680. The inner bearing 620 may be operatively coupled to the motor drive unit housing 680. For example, the inner bearing 620 may define splines (not shown) that are configured to be received by grooves 688 around the periphery of the motor drive unit housing 680. The inner bearing 620 may be press fit onto the motor drive unit housing 680. The outer bearing 640 may engage the roller tube 610. The outer bearing 640 may be operatively coupled to the roller tube 610. The outer bearing 640 may rotate with the roller tube 610. The outer bearing 640 may be press fit into engagement with the roller tube 610. For example, the outer bearing 640 may engage the plurality of splines 612 of the roller tube 610. The inner bearing 620 may remain stationary with the motor drive unit housing 680 as the roller tube 610 rotates. Stated differently, the roller tube 610 and the outer bearing 640 may rotate about the inner bearing 620 and the motor drive unit housing 680.

The batteries 660 may be configured to be removed from the roller tube 610, for example, while the motor drive unit housing 680 remains engaged with the mounting brackets 630. That is, the batteries 660 may be configured to be removed from the roller tube 610 when the battery-powered motorized window treatment 600 is in the pivoted position. An inside diameter of the inner bearing 620 may be greater than an outer diameter of the batteries 660 and/or the battery holder 670.

The battery-powered motorized window treatment 600 (e.g., the motor drive unit 690) may include a battery holder 670 and a cap 650. For example, the motor drive unit 690 may include the battery holder 670 and the cap 650. The battery holder 670 and the cap 650 may keep the batteries 660 fixed in place securely while the batteries 670 are providing power to the motor drive unit 690 and/or the cap 650. The battery holder 670 may be configured to clamp the batteries 660 together (e.g., as shown in FIG. 8A) such that the batteries 660 can be removed from the battery-powered motorized window treatment 600 at the same time (e.g., together).

The battery holder 670 may be received in a motor drive unit cavity 689 of the motor drive unit 690. The motor drive unit cavity 689 may extend in the longitudinal direction L from an end 681 of the motor drive unit 690 (e.g., the motor drive unit housing 680) to an internal wall 683 of the motor drive unit 690. The motor drive unit cavity 689 may be open at the end 681. The motor drive unit 690 may be received within a roller tube cavity 615. The roller tube cavity 615 may be open proximate to an end of the roller tube 610. The roller tube cavity 615 may extend in the longitudinal direction L along the entire length of the roller tube 610. The cap 650 may be configured to cover the end 681 to the motor drive unit cavity 689. For example, the cap 650 may be received (e.g., at least partially) within the motor drive unit cavity 689. The cap 650 may include one of more wireless communication components, such as a wireless communication circuit (e.g., a control interface printed circuit board 654) and/or an antenna (e.g., such as the antenna 1545 shown in FIG. 29). The wireless communication circuit and/or the antenna may be configured to communicate (e.g., transmit and receive messages to/from) external control devices via wireless signals, such as radio-frequency (RF) signals. The cap 650 may include a button 652, one or more wireless communication circuits mounted to the control interface printed circuit board 654, and an electrical contact 656 electrically coupled to the control interface printed circuit board 654. The electrical contact 656 may be a positive electrical contact, for example, as shown in FIG. 8A. Alternatively, the electrical contact 656 may be a negative electrical contact. The cap 650 may include a switch 655 (e.g., a mechanical tactile switch) mounted to the control interface printed circuit board 654 and configured to be actuated in response to actuations of the button 652. The button 652 may operate as a light pipe (e.g., may be translucent or transparent), and may be illuminated by an LED (not shown) mounted to the control interface printed circuit board 654.

The cap 650 may include a switch or button (e.g., button 154 shown in FIG. 1B) that is configured to disable (e.g., automatically disable) operation of the motor 696 by the motor drive unit 690 when the roller tube 610 is not in the operating position. The switch or button may disable the operation of the motor 696 of the motor drive unit 690, for example, when the roller tube 610 is pivoted (e.g., or slid) from the operating position to the extended position. The switch or button may enable the operation of the motor 696 when the roller tube 610 reaches the operating position.

The cap 650 may also comprise a position detect circuit (e.g., such as the position detect circuit 1546 shown in FIG. 29) for detecting when the roller tube 610 is not in the operating position and deactivating (e.g., automatically deactivating) operation of the motor 696 by the motor drive unit 690 (e.g., rather than including the switch or button for deactivating the motor drive unit). For example, the position detect circuit may comprise a magnetic sensing circuit (e.g., a Hall-effect sensor circuit) configured to detect when the cap 650 is in the extended position and not in close proximity to a magnet 675 located inside of the arm 632 of the mounting bracket 630. For example, the position detect circuit may detect proximity of the cap 650 to the magnet 675. The motor drive unit 690 may disable operation of the motor 696 in response to a signal from the position detect circuit such that the covering material cannot be raised or lowered when the roller tube 610 is not in the operating position. The operation of the motor 696 of the motor drive unit 690 may be disabled, for example, when the roller tube 610 is pivoted (e.g., or slid) from the operating position to the extended position. The operation of the motor 696 of the drive assembly 690 may be enabled in response to the position detect circuit when the roller tube 610 is in the operating position. For example, the position detect circuit may also comprise an IR sensor, a switch, and/or the like.

The batteries 660 may be located between the cap 650 (e.g., the wireless communication circuits of the motor drive unit 690 of the battery-powered motorized window treatment 600) and a motor drive printed circuit board 692 of the motor drive unit 690. For example, the wireless communication circuits in the cap 650 may be located at a first end of the batteries 660 installed in the roller tube 610 and the motor drive unit 690 may be located at an opposed second end of the batteries 660.

The wireless communication circuit may be electrically coupled to the antenna within the cap 650. The antenna may be a loop antenna that is located on (e.g., around a periphery of) the control interface printed circuit board 654. Alternatively, the antenna may be a monopole. The antenna may be located proximate to a gap 605 between the bracket 630 and the roller tube 610. For example, the antenna may be aligned with the gap 605. The antenna may transmit and/or receive RF signals through the gap 605. The gap 605 includes non-metal components such that radio-frequency interference and/or shielding is minimized. For example, the battery-powered motorized window treatment 600 may not include metal components at the gap 605. The inner bearing 620 and/or the outer bearing 640 may be disposed within or proximate to the gap 605.

The gap 605 between the roller tube 610 and the bracket 630 may also be configured to enable a predetermined tolerance (e.g., angular misalignment tolerance) between the roller tube 610 and the bracket 630 in a pivoted position. For example, when the battery-powered motorized window treatment 600 is in the pivoted position, the gap 605 may enable a portion of the roller tube 610 to be closer to the bracket 630 (e.g., without contacting the bracket 630) than another portion of the roller tube 610. When the battery-powered motorized window treatment 600 is in the pivoted position, the gap 605 may be configured such that the roller tube 610 does not abut the bracket 630.

The motor drive unit 690 may include a spring 682, which may extend from the internal wall 683 of the motor drive unit 690. The spring 682 may be configured to abut and apply a force to one of the batteries 660, for example, such that the batteries 660 remain in contact with one another while installed within the motor drive unit cavity 689. The spring 682 may be electrically coupled to the motor drive printed circuit board 692 via a wire 684. The spring 682 may be a negative electrical contact, for example, as shown in FIG. 8A. Alternatively, the spring 682 may be a positive electrical contact. The spring 682 may be configured to apply a force to the batteries 660 to maintain electrical connection of the batteries 660 with the spring 682 and the electrical contact 656 of the cap 650.

The electrical contact 656 may be electrically connected to the control interface printed circuit board 654. The button 652 may be backlit. For example, the button 652 may include a light pipe that is illuminated by the LED within the cap 650 and mounted to the control interface printed circuit board 654. The button 652 may be configured to enable a user to change one or more settings of the battery-powered motorized window treatment 600. For example the button 652 may be configured to change one or more settings of the control interface printed circuit board 654 and/or a motor drive printed circuit board 692. The button 652 may be configured to enable a user to pair the battery-powered motorized window treatment 600 with a remote control device to allow for wireless communication between the remote control device and the wireless communication circuit mounted to the control interface printed circuit board 654 in the cap 650. The button 652 may be configured to provide a status indication to a user. For example, the control button 652 may be configured to flash and/or change colors to provide the status indication to the user. The button 652 may be configured to indicate (e.g., via the status indication) whether the motor drive unit 690 is in a programming mode.

The control interface printed circuit board 654 and the motor drive printed circuit board 692 may be electrically connected. For example, the battery-powered motorized window treatment 600 may include a ribbon cable 686. The ribbon cable 686 may be attached to the control interface printed circuit board 654 and the motor drive printed circuit board 692. The ribbon cable 686 may be configured to electrically connect the control interface printed circuit board 654 and the motor drive printed circuit board 692. The ribbon cable 686 may terminate at the control interface printed circuit board 654 and the motor printed circuit board 692. For example, the ribbon cable 686 may extend within the cavity 615. The ribbon cable 686 may include electrical conductors for providing power from the batteries 660 to the control interface printed circuit board 654 and/or the motor drive printed circuit board 692. The ribbon cable 686 may include electrical conductors for conducting control signals (e.g., for transmitting one or more messages) between the control interface printed circuit board 654 and the motor drive printed circuit board 692. For example, the ribbon cable 686 may be configured to conduct power and/or control signals between the control interface printed circuit board 654 and the motor drive printed circuit board 692. The motor control unit 690 may include a retainer 685 that is configured to retain the ribbon cable 686 within the motor drive unit cavity 689. For example, the retainer 685 may prevent the ribbon cable 686 from being pressed into the motor drive unit cavity 689 when the battery holder 670 and/or batteries 660 are installed therein. Alternatively, the wireless communication circuits may be mounted to the motor drive printed circuit board 692 (e.g., rather than the control interface printed circuit board 654), while the antenna may be located on the control interface printed circuit board 654. For example, the antenna on the control interface printed circuit board 654 may be electrically coupled to the wireless communication circuits on the motor drive printed circuit board 692 via a coaxial cable (e.g., which may replace the ribbon cable 686 and/or be included in addition to the ribbon cable 686).

Figure 9A:
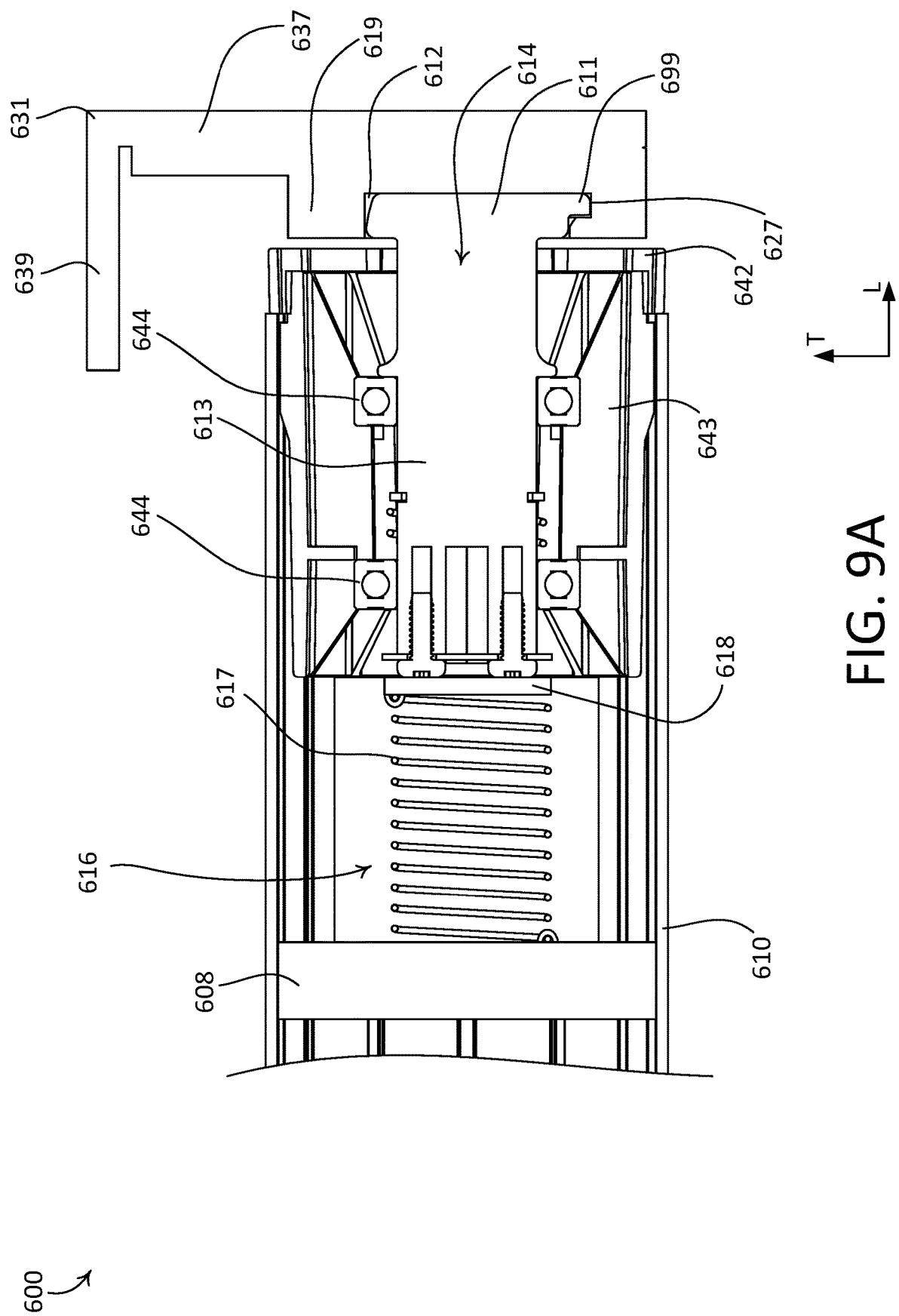
FIG. 9A is an enlarged cross-section view of an idler end of the example battery-powered motorized window treatment shown in FIG. 8A.
Figure 9B:
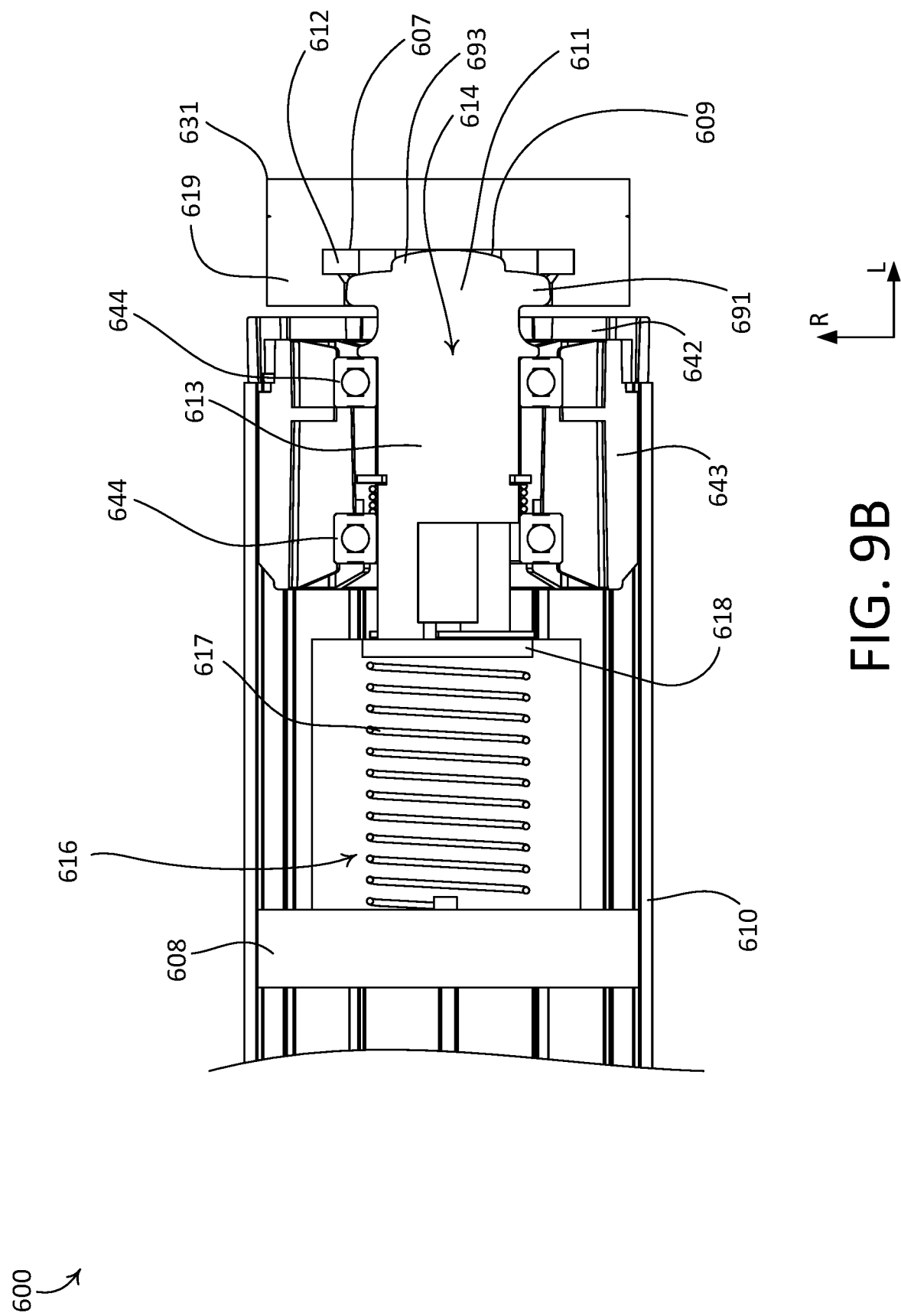
FIG. 9B is a top view of the enlarged cross-section view of the idler end of the example battery-powered motorized window treatment shown in FIG. 9A.
Figure 9C:
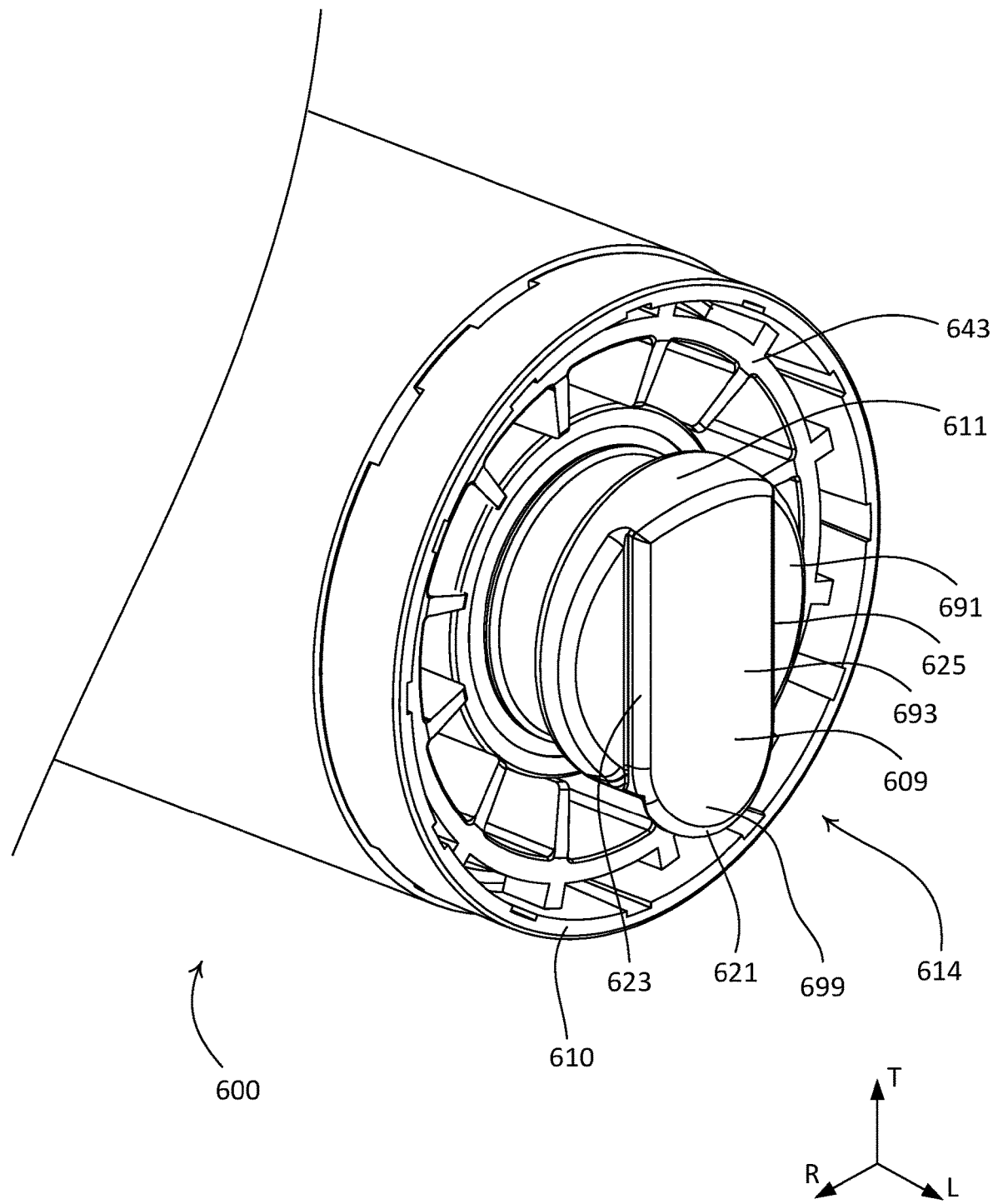
FIG. 9C is a perspective view of the idler end of the example battery-powered motorized window treatment shown in FIG. 9A

FIGS. 9A, 9B, and 9C depict an idler end of the example battery-powered motorized window treatment 600. FIG. 9A is a side view and FIG. 9B is a top view of the idler end of the example battery-powered motorized window treatment 600. FIG. 9C is a perspective view of the idler end of the roller tube 610. The mounting bracket 631 (e.g., with the mounting bracket 630) may be configured to attach the battery-powered motorized window treatment 600 to a horizontal structure (e.g., such as a ceiling). The mounting bracket 631 may define a base 639 and an arm 637. The mounting bracket 631 may be stationary or may be configured to transition between an operating position and an extended position (e.g., such as the mounting bracket 630). The arm 637 may include an attachment member 619 that is configured to receive an end of the roller tube 610. The arm 637 (e.g., the attachment member 619) may define a cavity 612. The base 639 may be configured to attach the mounting bracket 631 to the structure. The structure may include a window frame (e.g., a head jamb or side jambs of a window frame), a wall, a ceiling, or other structure, such that the battery-powered motorized window treatment 600 is mounted proximate to an opening (e.g., over the opening or in the opening), such as a window for example. When the mounting bracket 631 is attached to a vertical structure, such as a wall, the arm 637 of the mounting bracket 631 may extend horizontally (e.g., in the radial direction R) from the base 639. When the mounting bracket 631 is attached to a horizontal structure, such as a ceiling, the arm 637 of the mounting bracket 631 may extend vertically (e.g., in the transverse direction T) from the base 639.

The battery-powered motorized window treatment 600 may include an idler assembly 601. The idler assembly 601 may include an idler shaft 614 and an idler coupler 643. The idler shaft 614 may be configured to support the idler end of the battery-powered motorized window treatment 600. The idler shaft 614 may define an idler arm 613 and an idler base 611. The idler shaft 614 may be received by the roller tube 610. For example, the idler arm 613 may extend within the roller tube 610 (e.g., the cavity 615). For example, the cavity 615 of the roller tube 610 may be open at both ends. The cavity 615 at the idler end of the battery-powered motorized window treatment 600 may be covered by a cover 642. The idler shaft 614 (e.g., the idler arm 613) may extend through the cover 642. The idler shaft 614 (e.g., the idler base 611) may be received (e.g., captively received) by the cavity 612 in the mounting bracket 631.

The idler shaft 614 (e.g., the idler base 611) may define a pivot surface 609 that is proximate to the mounting bracket 631, when the idler end of the roller tube is supported by the mounting bracket 631. The pivot surface 609 may be curved to enable the roller tube 610 to pivot about its idler end between the operating position and the pivoted position. For example, the pivot surface 609 may define a convex surface. The pivot surface 609 may be configured to enable a predetermined tolerance (e.g., angular misalignment tolerance) between the idler base 611 and the cavity 612, for example, when the roller tube 610 is in a pivoted position. For example, when the battery-powered motorized window treatment 600 is in the pivoted position, the pivot surface 609 may enable the idler base 611 to remain engaged (e.g., secured) within the cavity 612 of the mounting bracket 631. Different portions of the pivot surface 609 may be configured to abut an inner surface 607 of the cavity 612, for example, as the battery-powered motorized window treatment 600 is moved between the operating position and the pivoted position.

The idler base 611 may define a disk portion 691 and an extension 693 that extends from the disk portion 691. The pivot surface 609 may be located on the extension 693. The extension 693 may define edges 623, 625 and a tab 699. The tab 699 may be configured to extend in the transverse direction T beyond an outer perimeter of the disk portion 691. The tab 699 may define a curved bottom edge 621. The curved bottom edge 621 may extend between the edges 623, 625. The tab 699 may be configured to secure the idler end of the roller tube 610 within the mounting bracket 631. For example, the tab 699 may be configured to be received within a notch 627 (e.g., such as the notch 934 shown in FIG. 16) in the mounting bracket 631 (e.g., in the cavity 612). The notch 627 may be located within the cavity 612 distal from the base 639. The tab 699 may be configured to prevent unmounting of the roller tube 610 from the mounting bracket 631, for example, in the longitudinal direction L. The tab 699 may be configured to rest within the notch 627 when the roller tube 610 is in the operating position, in the pivoted position, and between the operating position and the pivoted position. The notch 627 may be configured to prevent movement of the roller tube in the longitudinal direction L.

The idler shaft 614 may remain stationary as the roller tube 610 rotates. The battery-powered motorized window treatment 600 may include idler bearings 644. The idler bearings 644 may be configured to support the roller tube 610 while enabling the roller tube 610 to rotate about the idler shaft 614. The idler bearings 644 may be roller bearings (e.g., such as ball bearings, cylindrical bearings, and/or the like). The idler coupler 643 may be configured to operatively couple the roller tube 610 to the idler bearings 644. For example, the idler coupler 643 may be configured to engage (e.g., mesh with) the plurality of splines 612 on the roller tube 610 such that the idler coupler 643 rotates with the roller tube 610. The idler coupler 643 may be configured to transfer the weight of the roller tube 610 to the idler shaft 614.

The battery-powered motorized window treatment 600 may include a spring assist assembly 616 (e.g., a torsion spring assembly). The spring assist assembly 616 may include a spring 617 (e.g., a torsion spring), a bracket coupling portion 618, and a roller tube coupling portion 608. The bracket coupling portion 618 may be attached to the idler shaft 614 (e.g., the idler arm 613) such that the bracket coupling portion 618 remains stationary as the roller tube 610 rotates. The roller tube coupling portion 608 may be operatively coupled to the roller tube 610 (e.g., the splines 612) such that the roller tube coupling portion 608 rotates with the roller tube 610. The spring 617 may be attached to the bracket coupling portion 618 at one end and to the roller tube coupling portion 608 at the other end. The spring 617 may be configured to coil and uncoil as the roller tube 610 rotates (e.g., depending on the direction of rotation). For example, the torque applied by the spring 617 to the roller tube 610 may change as the roller tube rotates.

The spring assist assembly 616 may be configured to assist the motor drive unit 690 to operate the battery-powered motorized window treatment 600. For example, the spring assist assembly 616 may reduce the torque required from the motor drive unit 690 to raise and/or lower the covering material of the battery-powered motorized window treatment 600. The spring assist assembly 616 may prolong the life of the batteries 660, for example, by assisting the motor drive unit 690. The spring assist assembly 616 may be coupled to the roller tube 610 for providing a constant torque on the roller tube 610 in a direction opposite a direction of the torque provided on the roller tube 610 by the motor drive unit 690. For example, the spring assist assembly 616 may provide a torque on the roller tube 610 opposite a torque provided by the motor drive unit 690 to raise the covering material to a position approximately midway between the fully-closed and fully-open position without substantial energy being provided by the motor unit 690. The torque applied by the spring assist assembly 616 on the roller tube 610 may increase as the covering material is lowered. This increasing torque applied by the spring assist assembly 616 may balance the increasing torque created be more of the covering material hanging from the roller tube 610. The balance between the torque applied by the spring assist assembly 616 and the torque applied by the covering material may result in a substantially constant torque on the motor drive unit 690. For example, the spring assist assembly 616 may be configured such that the motor drive unit 690 can operate at a substantially constant torque as the covering material is raised and lowered (e.g., operated between a raised position and a lowered position).

The spring assist assembly 616 may assist the motor drive unit 690 when raising the covering material above the midway position to the fully-open position, and the spring assist assembly 616 may provide a torque on the drive shaft resisting downward motion of the covering material when the covering material is lowered from the fully-open position to the fully-closed position. The motor drive unit 690 may provide a torque that is configured to wind up the spring assist assembly 616 when the covering material is lowered from the midway position to the fully-closed position.

When the roller tube 610 is mounted using two brackets 630 that may be translated into the extended position (e.g., as shown in FIG. 7), the spring assist assembly 616 may be configured to be adjusted (e.g., pre-wound) at the installation site (e.g., when the roller tube 610 is mounted to the mounting brackets 630, 631). Pre-winding the spring assist assembly 616 may enable the spring assembly 616 to provide a constant torque on the roller tube 610 during operation of the motor drive unit 690. Pre-winding the spring assist assembly 616 at the installation site may eliminate the need to pre-wind the spring assist assembly 616 during manufacturing (e.g., at the factory). Pre-winding the spring assist assembly 616 during manufacturing may result in pre-winding in the wrong direction, too many turns, and/or not enough turns for the application. Pre-winding the spring assist assembly 616 during manufacturing may require a locking mechanism to hold the roller tube 610 such that the pre-wound spring assist assembly 616 does not unwind. Pre-winding the spring assist assembly 616 at the installation site may allow for more precise pre-winding settings, eliminate factory pre-winding errors, and eliminate the need for a locking mechanism to hold the roller tube 610 in place prior to installation.

FIGS. 12A and 12B depict an example mounting bracket 700 for use with a battery-powered motorized window treatment (e.g., such as the motorized window treatment 100 shown in FIGS. 1A and 1B, the battery-powered motorized window treatment 200 shown in FIGS. 2A and 2B, the battery-powered motorized window treatment 300 shown in FIGS. 3A and 3B, the battery-powered motorized window treatment 400 shown in FIGS. 4A and 4B, the battery-powered motorized window treatment 500 shown in FIG. 5A, the battery-powered motorized window treatment 5500 shown in FIG. 6, and/or the battery-powered motorized window treatment 600 shown in FIGS. 8A-11) in an operating position. FIGS. 13A and 13B depict the mounting bracket 700 in an extended position. The mounting bracket 700 may be configured to be attached to a structure, e.g., such as a wall or other vertical surface (e.g., as shown in FIGS. 1A-7).

The mounting bracket 700 may be configured to secure, without requiring a tool, a roller tube in a first direction parallel to a longitudinal axis (e.g., the longitudinal direction L), in a second direction that is parallel to the structure and perpendicular to the longitudinal axis (e.g., the transverse direction T), and in a third direction perpendicular to the structure and the longitudinal axis (e.g., the radial direction R). As shown, the mounting bracket 700 may include a stationary portion 710, a translating portion 720, and a sliding portion 740. The stationary portion 710 may include a base 712 (e.g., a foot) and an arm 714. The translating portion 720 may include an attachment member 730 that is configured to receive an end of the roller tube and/or a motor drive unit housing. The attachment member 730 may define an aperture 732 (e.g., an attachment aperture). The base 712 may be configured to attach the mounting bracket 700 to the structure. The structure may include a window frame (e.g., a head jamb or side jambs of a window frame), a wall, a ceiling, or other structure, such that the motorized window treatment is mounted proximate to an opening (e.g., over the opening or in the opening), such as a window for example. When the mounting bracket 700 is attached to a vertical structure, such as a wall, the arm 714 of the mounting bracket 700 may extend horizontally (e.g., in the radial direction R) from the base 712.

The sliding portion 740 may be coupled (e.g., slidably coupled) between the stationary portion 710 and the translating portion 720. The translating portion 720 and the sliding portion 740 may be configured to translate the roller tube between the operating position (e.g., as shown in FIGS. 12A and 12B) and the extended position (e.g., as shown in FIGS. 13A and 13B). The translating portion 720 may be proximate to the base 712 when in the operating position and distal from the base 712 when in the extended position. The end of the roller tube and/or the motor drive unit housing may be accessible via the aperture 732 (e.g., to replace the batteries) when the translating portion 720 is in the extended position.

The stationary portion 710, the translating portion 720, and the sliding portion 740 may define one or more features that enable the translating portion 720 to be translated between the operating position and the extended position. The translating portion 720 and the sliding portion 740 may be configured to move in the radial direction R from the operating position to the extended position (e.g., in the same direction as the arm 714 extends from the base 712). The translating portion 720 may define one or more corresponding features that are configured to cooperate with the one or more features on the sliding portion 740, and the sliding portion 740 may define one or more corresponding features that are configured to cooperate with the one or more features on the stationary portion 710.

The arm 714 of the stationary portion 710 may define one or more slides (e.g., an upper slide 711 and a lower slide 713). The upper slide 711 and the lower slide 713 may protrude from an inner surface 715 of the arm 714. The sliding portion 740 may define one or more channels (e.g., an upper channel 741 and a lower channel 743). The upper channel 741 may be configured to receive the upper slide 711 and the lower channel 743 may be configured to receive the lower slide 713. The sliding portion 740 may translate along the upper slide 711 and the lower slide 713 when the translating portion 720 is moving between the operating position and the extended position. In addition, the sliding portion 740 may define one or more slides (e.g., a middle slide 749), and the arm 714 may define one or more channels (e.g., a middle channel 719). The middle slide 729 may protrude from the sliding portion 740 between the upper channel 721 and the lower channel 723. The middle channel 719 may be located between the upper slide 711 and the lower slide 713. The middle channel 719 may be configured to receive the middle slide 729. The sliding portion 740 may translate along the middle slide 729 when the translating portion 720 is moving between the operating position and the extended position.

The sliding portion 740 may define one or more slides (e.g., an upper slide 742 and a lower slide 744). The upper slide 742 and the lower slide 744 may protrude from the sliding portion 740. The translating portion 720 may define one or more channels (e.g., an upper channel 722 and a lower channel 724). The upper channel 722 may be configured to receive the upper slide 742 and the lower channel 724 may be configured to receive the lower slide 744. The translating portion 720 may translate along the upper slide 742 and the lower slide 744 when the translating portion 720 is moving between the operating position and the extended position. In addition, the translating portion 720 may define one or more slides (e.g., a middle slide 727), and the sliding portion 740 may define one or more channels (e.g., a middle channel 747). The middle slide 727 may protrude from the translating portion 720 between the upper channel 722 and the lower channel 724. The middle channel 747 may be located between the upper slide 742 and the lower slide 744. The middle channel 747 may be configured to receive the middle slide 727. The translating portion 720 (e.g., the middle channel 747) may translate along the middle slide 727 when the translating portion 720 is moving between the operating position and the extended position.

The mounting bracket 700 may be configured to be secured (e.g., locked) in the operating position and the extended position. The mounting bracket 700 (e.g., the sliding portion 740) may define one or more locking tabs (e.g., locking tab 745 and locking tab 760). The stationary portion 710 may define one or more indentations configured to receive the locking tab 745. For example, the arm 714 may define an operating position cavity 762 and an extended position cavity 764. The operating position cavity 762 may define a recess (e.g., detent) that receives the locking tab 745 when the roller tube is in the operating position. The operating position cavity 762 may be configured to receive the locking tab 745 to hold (e.g., lock) the roller tube in the extended position. The extended position cavity 764 may define a recess that receives the locking tab 745 when the roller tube is in the extended position. The extended position cavity 764 may be configured to receive the locking tab 745 to hold (e.g., lock) the roller tube in the extended position. For example, the extended position cavity 764 and the locking tab 745 may be configured to prevent the roller tube from sliding out of engagement with the mounting bracket 700.

The locking tab 745 may be configured to engage the operating position cavity 762 when the roller tube is in the operating position. The locking tab 745 may be configured to engage the extended position cavity 764 when the roller tube is in the extended position. For example, the locking tab 745 (e.g., a distal portion of the locking tab 745) may be configured to abut the inner surface 715 of the arm 714 between the operating position cavity 762 and the extended position cavity 764. Stated differently, the locking tab 745 may slide along the inner surface 715 as the roller tube is operated between the operating position and the extended position. The arm 714 (e.g., the inner surface 715) may define an inner channel 717 that is configured to receive the locking tab 745. For example, the locking tab 745 may be received within and slide along the inner channel 717 as the roller tube is operated between the operating position and the extended position. The inner channel 717 may be configured to prevent the roller tube from being pulled out of engagement with the mounting bracket 745 when in the operating position. For example, the inner channel 717 may define a wall (not shown) distal from the base 712. The wall may be configured to prevent the roller tube from being translated beyond the extended position. For example, the locking tab 745 may abut the wall when the roller tube is in the extended position and/or when a radial force is applied to the roller tube when in the extended position.

The locking tab 760 may be configured to engage an inner surface 734 of the translating portion 730. The inner surface 734 may define the aperture 732. The locking tab 760 may be configured to engage the translating portion 730 (e.g., the inner surface 734) when the roller tube is in the operating position. The translating portion 730 may define one or more indentations configured to receive the locking tab 760 as the roller tube is operated between the operating position and the extended position.

The locking tab 745 and the locking tab 760 may be configured to secure the roller tube in the operating position. The locking tab 745 and the locking tab 760 may be configured to prevent accidental disengagement of the roller tube from the operating position. For example, the locking tab 745 and the operating position cavity 762 may be configured to resist a first threshold force in the radial direction. In addition, the locking tab 760 may be configured to resist a second threshold force in the radial direction. The first threshold force and the second threshold force may be the same. When a force greater than the first threshold force is applied in the radial direction, the locking tab 745 may release (e.g., disengage) from the operating position cavity 762 such that the roller tube can be moved to the extended position. The locking tab 745 may slide along the inner surface until it reaches the extended position cavity 764. For example, the locking tab 745 may be configured to slide along the inner surface between the operating position cavity 762 and the extended position cavity 764. When a force greater than the second threshold force is applied in the radial direction, the locking tab 760 may release (e.g., disengage) from the translating portion 730 (e.g., the inner wall 734) such that the roller tube can be moved to the extended position.

The locking tab 745 may be configured to secure the roller tube in the extended position. The locking tab 745 and the extended position cavity 764 may provide a positive lock that prevents the roller tube from being extended beyond the extended position. The locking tab 745 and the extended position cavity 764 may be configured to enable the roller tube to be released from the extended position and translated back toward the operating position. The locking tab 745 and the extended position cavity 762 may be configured to prevent the roller tube from being pulled out of engagement with the mounting bracket 700, for example, when the roller tube is in the extended position. The mounting bracket 700 may include a release button (not shown) that enables release of the translating portion 720 from the operating position such that it can be moved to the extended position. The mounting bracket 700 may include a disengagement button (e.g., the end portion 1078 shown in FIG. 26) that enables disengagement of the translating portion 720 from the stationary portion 710.

The mounting bracket 700 may be used at both sides of a roller tube, for example, such that the roller tube slides away from the structure. For example, the mounting bracket 700 on the opposite end of the roller tube may be flipped 180 degrees such that the base 712 is also attached to the structure. Alternatively, the mounting bracket 700 may be used at one end of a roller tube such that the roller tube pivots away from the structure. The mounting bracket 700 may be configured as an end bracket (e.g., as shown) that receives a single roller tube. Alternatively, the mounting bracket 700 may be configured as a center bracket that receives two roller tubes. Although the mounting bracket is shown as accepting a roller tube from one side of the arm 714, it should be appreciated that the mounting bracket 700 may be configured to accept one roller tube at a first side of the arm 714 and another roller tube at an opposed second side of the arm 714. The center bracket may define translating portions and/or sliding portions (e.g., such as the translating portion 720 and/or the sliding portion 740) slidably coupled to both sides of the arm 714. The center bracket may define slides (e.g., such as the upper slide 711 and lower slide 713) on both sides of the arm 714. Each of the translating portions and/or the sliding portions may slide independently, for example such that an end of one of the roller tubes can be accessed (e.g., in the extended position) while the other roller tube remains in the operating position.

Figure 8B:
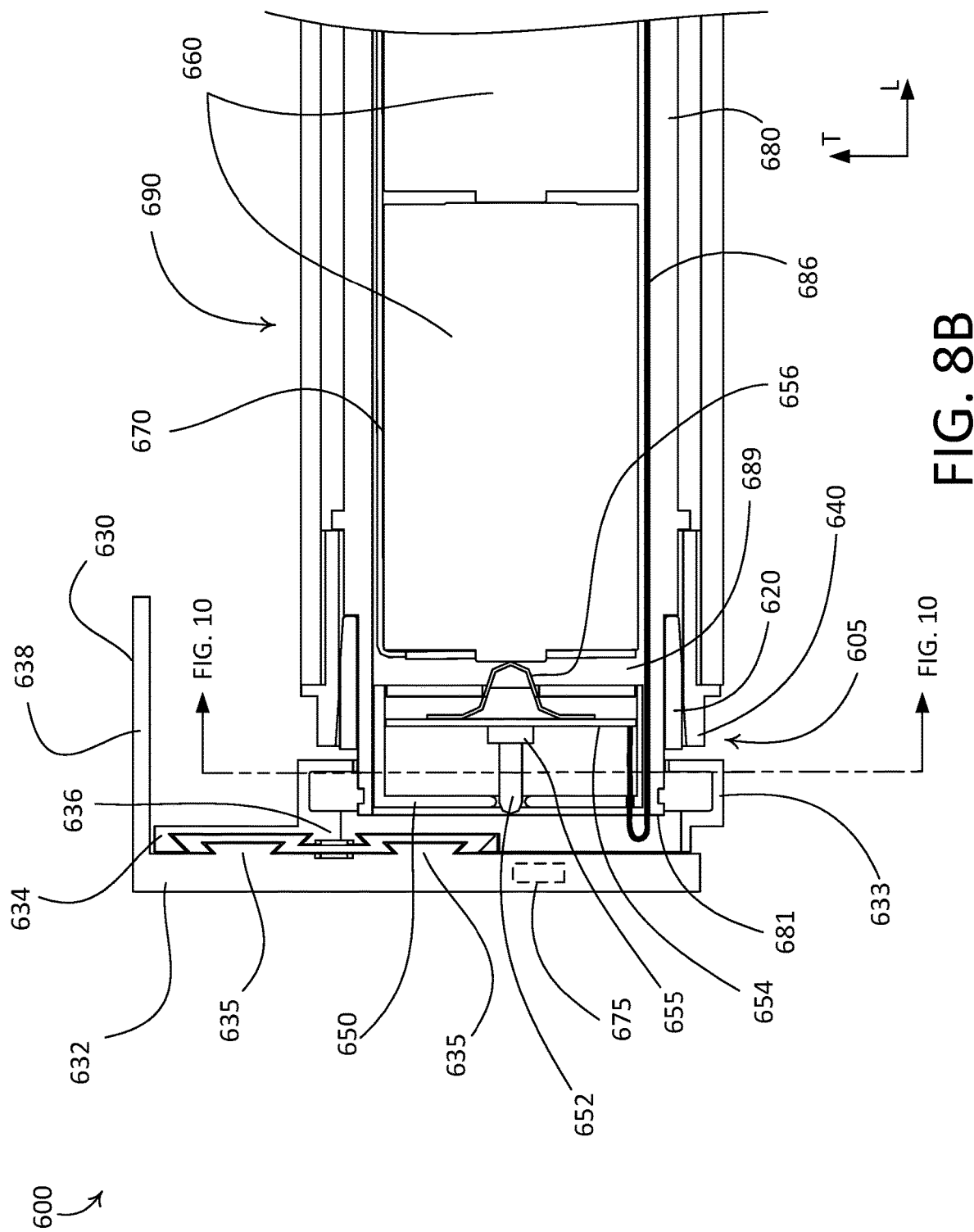
FIG. 8B is an enlarged partial view of the example battery-powered motorized window treatment shown in FIG. 8A.
Figure 14B:
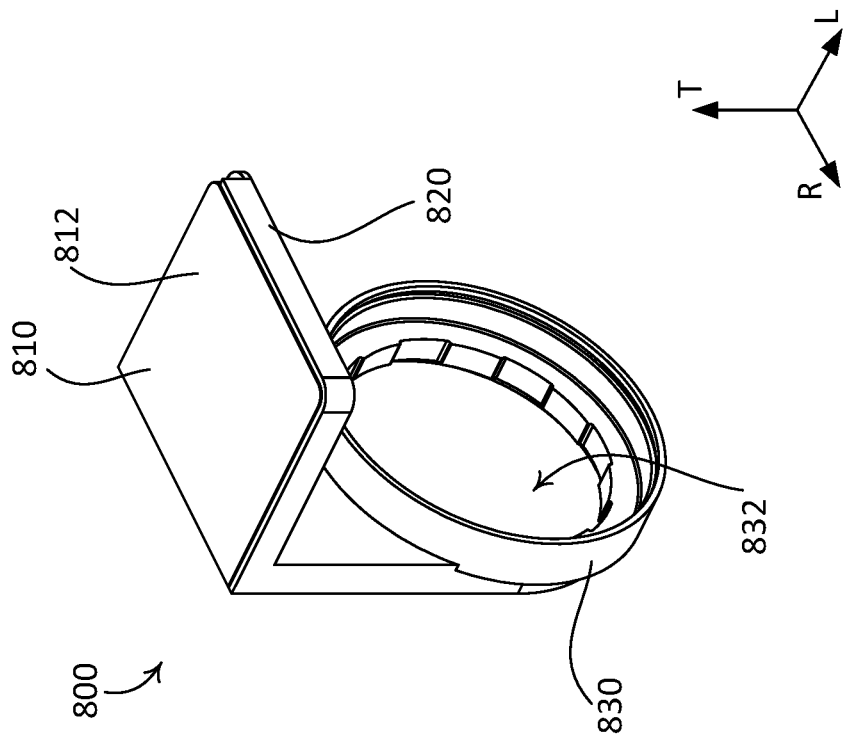
FIG. 14B is a rear perspective view of the example mounting bracket shown in FIG. 14A.
Figure 14A:
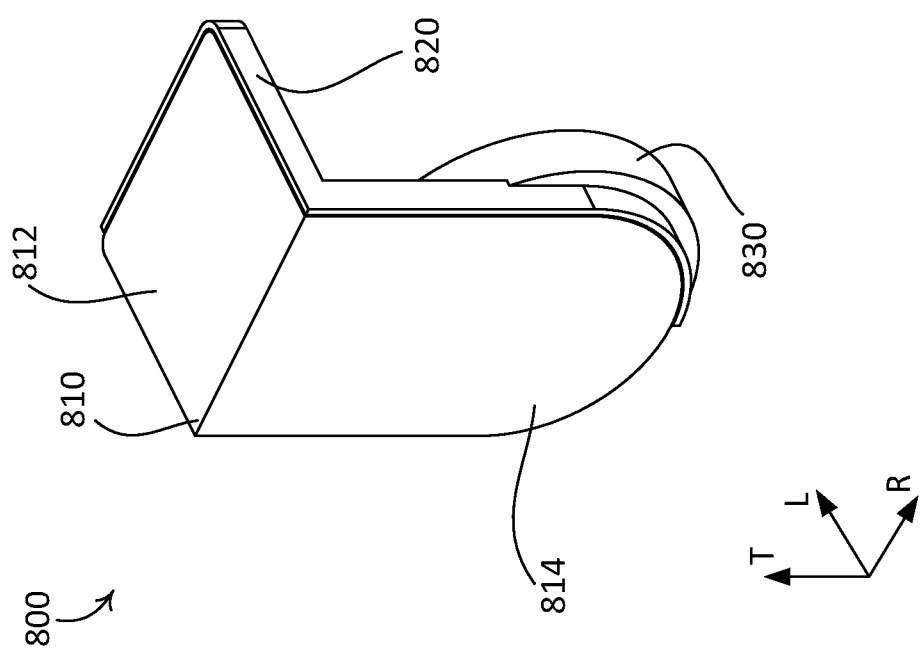
FIG. 14A is a front perspective view of another example mounting bracket for mounting a battery-powered motorized window treatment (e.g., to a horizontal surface, such as a ceiling).

FIGS. 14A and 14B depict an example mounting bracket 800 for use with a battery-powered motorized window treatment (e.g., such as the motorized window treatment 100 shown in FIGS. 1A and 1B, the battery-powered motorized window treatment 200 shown in FIGS. 2A and 2B, the battery-powered motorized window treatment 300 shown in FIGS. 3A and 3B, the battery-powered motorized window treatment 400 shown in FIGS. 4A and 4B, the battery-powered motorized window treatment 500 shown in FIG. 5A, the battery-powered motorized window treatment 5500 shown in FIG. 6, and/or the battery-powered motorized window treatment 600 shown in FIGS. 8A-11) in an operating position. FIGS. 15A and 15B depict the mounting bracket 800 in an extended position. The mounting bracket 800 may be configured to be attached to a structure, e.g., such as a ceiling, a head jamb of a window frame, or other horizontal structure (e.g., as shown in FIGS. 8A, 8B, and 9).

The mounting bracket 800 may be configured to secure, without requiring a tool, a roller tube in a first direction parallel to a longitudinal axis (e.g., the longitudinal direction L), in a second direction that is parallel to the structure and perpendicular to the longitudinal axis (e.g., the transverse direction T), and in a third direction perpendicular to the structure and the longitudinal axis (e.g., the radial direction R). As shown, the mounting bracket 800 may include a stationary portion 810, a translating portion 820, and a sliding portion 840. The stationary portion 810 may include a base 812 (e.g., a foot) and an arm 814. The translating portion 820 may include an attachment member 830 that is configured to receive an end of the roller tube and/or motor drive unit housing. The attachment member 830 may define an aperture 832 (e.g., an attachment aperture). The base 812 may be configured to attach the mounting bracket 800 to the structure. The structure may include a window frame (e.g., a head jamb or side jambs of a window frame), a wall, a ceiling, or other structure, such that the motorized window treatment is mounted proximate to an opening (e.g., over the opening or in the opening), such as a window for example. When the mounting bracket 800 is attached to a horizontal structure, such as a ceiling or a head jamb of a window frame, the arm 814 of the mounting bracket 800 may extend vertically (e.g., in the transverse direction T) from the base 812.

The sliding portion 840 may be coupled (e.g., slidably coupled) between the stationary portion 710 and the translating portion 720. The translating portion 820 may be configured to translate between an operating position (e.g., as shown in FIGS. 14A and 14B) and an extended position (e.g., as shown in FIGS. 15A and 15B). The translating portion 820 may be proximate to (e.g., aligned with) the base 812 when in the operating position and distal from the base 812 when in the extended position. The end of the roller tube and/or the motor drive unit housing may be accessible via the aperture 832 (e.g., to replace the batteries) when the translating portion 820 is in the extended position.

The stationary portion 810, the translating portion 820, and the sliding portion 840 may define one or more features that enable the translating portion 820 to be translated between the operating position and the extended position. The translating portion 820 and the sliding portion 840 may be configured to move in the radial direction R from the operating position to the extended position (e.g., in a direction that is 90° from the direction that the arm 814 extends from the base 812). The stationary portion 810 may define a first slide 811. The first slide 811 may be configured to engage the sliding portion 840. The sliding portion 840 may define a first channel 842 that is configured to receive the first slide 811. The translating portion 820 may define one or more corresponding features that are configured to cooperate with the one or more features on the stationary portion 810. The first slide 811 may protrude from an inner surface 815 of the arm 814. The sliding portion 840 may define a second slide 844 that is configured to engage the translating portion 820. The translating portion 820 may define a second channel 822 that is configured to receive the second slide 844. The translating portion 820 may translate along the second slide 844 and the sliding portion 840 may translate along the first slide 811 between the operating position and the extended position.

The mounting bracket 800 may be configured to be secured (e.g., locked) in the operating position and the extended position. The mounting bracket 800 may define one or more locking tabs (not shown). For example, the sliding portion 840 may define a first locking tab and the translating portion 820 may define a second locking tab. The stationary portion 820 may define an indentation configured to receive the first locking tab on the sliding portion 840. For example, the arm 814 may define an operating position arm cavity (not shown), an extended position arm cavity and the slide may define a first slide cavity 846 and a second slide cavity 848. The operating position arm cavity may define a recess (e.g., detent) that receives the first locking tab and the first slide cavity 846 may define a recess that receives the second locking tab to hold the roller tube in the operating position. The second slide cavity 848 may define a lock that prevents the roller tube from sliding out of engagement with the mounting bracket 800.

The first locking tab on the slide may engage the extend position arm cavity and the second locking tab on the translating portion 820 may be configured to engage the second slide cavity 848 when the roller tube is in the operating position. For example, the first locking tab on the slide may be configured to abut the inner surface 815 of the arm 814 between the operating position arm cavity and the extended position arm cavity. Stated differently, the first locking tab may slide along the inner surface 815 as the roller tube is operated between the operating position and the extended position.

The first and second locking tabs may be configured to secure the roller tube in the operating position. The first and second locking tabs may be configured to prevent accidental disengagement of the roller tube from the operating position. For example, the first locking tab and the operating position arm cavity and the second locking tab and the first slide cavity 846 may be configured to resist a threshold force in the radial direction. When a force greater than the threshold force is applied in the radial direction, the first locking tab may release from the operating position arm cavity and the second locking tab may release from the first slide cavity 846 such that the roller tube can be moved to the extended position. The first locking tab may slide along the inner surface 815 until it reaches the extended position arm cavity. The second locking tab may slide along the sliding portion 840 until it reaches the second slide cavity 848.

The first and second locking tabs may be configured to secure the roller tube in the extended position. The first locking tab and the extended position arm cavity may be configured to prevent the sliding portion 840 from being pulled out of engagement with the mounting bracket 800, for example, when the roller tube is in the extended position. The second locking tab and the second slide cavity 848 may be configured to prevent the translating portion 820 from being pulled out of engagement with the sliding portion 840 and the mounting bracket 800, for example, when the roller tube is in the extended position. The mounting bracket 800 may include one or more release buttons (not shown) that enable release of the translating portion 820 from the operating position such that it can be moved to the extended position. The mounting bracket 800 may include a disengagement button (not shown) that enables disengagement of the translating portion 820 from the sliding portion 840 and/or the sliding portion 840 from the stationary portion 810.

The mounting bracket 800 may be used at both sides of a roller tube, for example, such that the roller tube slides away from a window. For example, the mounting bracket 800 on the opposite end of the roller tube may be flipped 180 degrees such that it mirrors the other mounting bracket. Alternatively, the mounting bracket 800 may be used at one end of a roller tube such that the roller tube pivots away from the window. The mounting bracket 800 may be configured as an end bracket (e.g., as shown) that receives a single roller tube. Alternatively, the mounting bracket 800 may be configured as a center bracket that receives two roller tubes. Although the mounting bracket 800 is shown as accepting a roller tube from one side of the arm 814, it should be appreciated that the mounting bracket 800 may be configured to accept one roller tube at a first side of the arm 814 and another roller tube at an opposed second side of the arm 814. The center bracket may define translating portions (e.g., such as translating portion 820) and slides (e.g., such as sliding portion 840) on both sides of the arm 814. Each of the translating portions and/or slides may slide independently, for example such that an end of one of the roller tubes can be accessed (e.g., in the extended position) while the other roller tube remains in the operating position.

Figure 16:
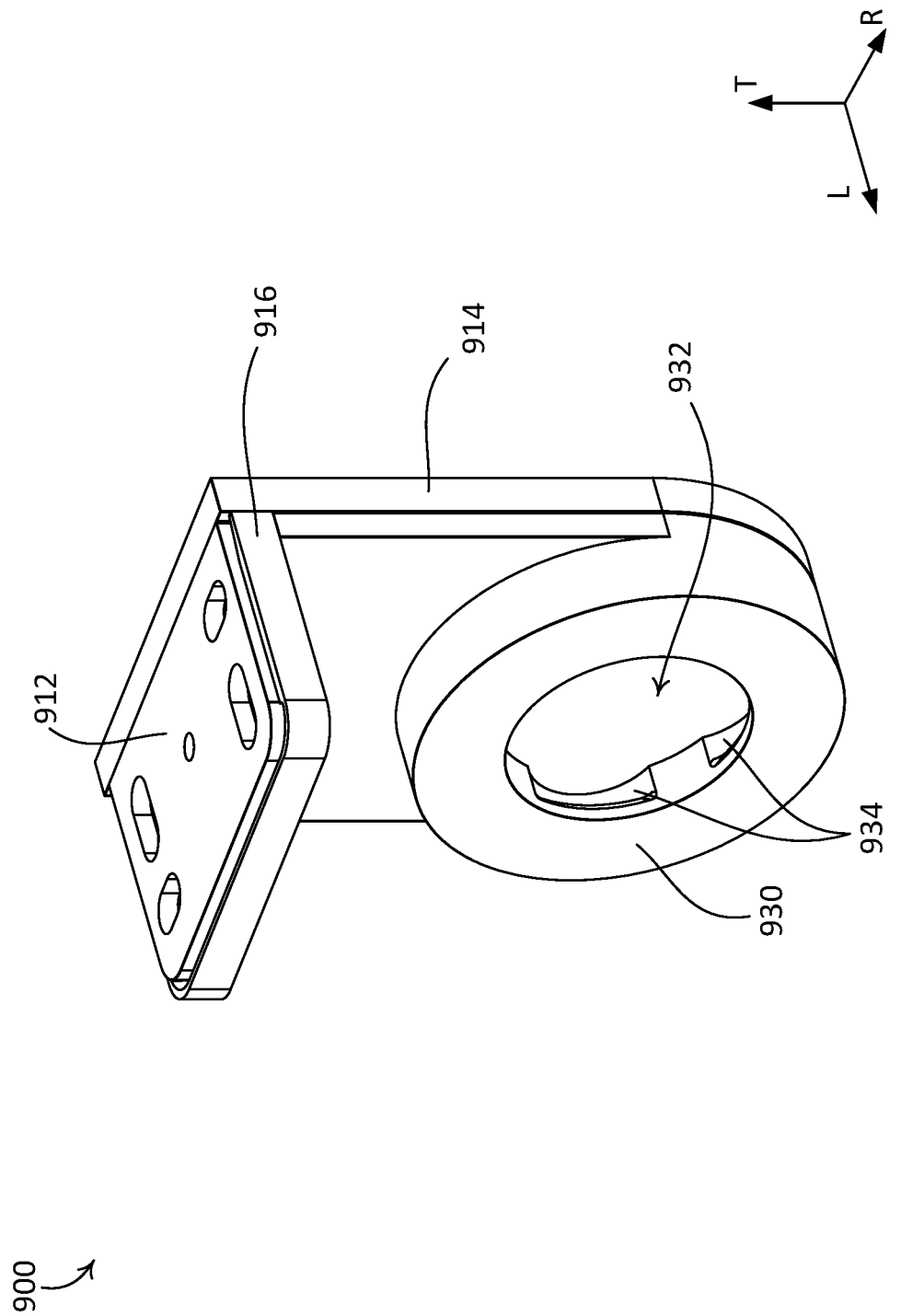
FIG. 16 is a front perspective view of another example mounting bracket for use with a battery-powered motorized window treatment.

FIG. 16 depicts an example mounting bracket 900 for use with a battery-powered motorized window treatment (e.g., such as the motorized window treatment 100 shown in FIGS. 1A and 1B, the battery-powered motorized window treatment 200 shown in FIGS. 2A and 2B, the battery-powered motorized window treatment 300 shown in FIGS. 3A and 3B, the battery-powered motorized window treatment 400 shown in FIGS. 4A and 4B, the battery-powered motorized window treatment 500 shown in FIG. 5A, the battery-powered motorized window treatment 5500 shown in FIG. 6, and/or the battery-powered motorized window treatment 600 shown in FIGS. 8A-11). The mounting bracket 900 may be configured to receive an idler end of the battery-powered motorized window treatment. The mounting bracket 900 may be configured to be attached to a wall or other vertical structure (e.g., as shown in FIGS. 1A-7). The mounting bracket 900 may be configured to be attached to a ceiling or other horizontal structure (e.g., as shown in FIGS. 8A, 8B, and-9).

The mounting bracket 900 may be configured to secure, without requiring a tool, a roller tube in a first direction parallel to a longitudinal axis (e.g., the longitudinal direction L), in a second direction that is parallel to the structure and perpendicular to the longitudinal axis (e.g., the transverse direction T), and in a third direction perpendicular to the structure and the longitudinal axis (e.g., the radial direction R).

The mounting bracket 900 may include a base 912 (e.g., a foot), an arm 914, and an attachment member 930 that is configured to receive an end of the roller tube and/or motor drive unit housing. The attachment member 930 may define an aperture 932 (e.g., such as the cavity 612 shown in FIGS. 9A and 9B) and one or more notches 934 (e.g., such as the notch 627 shown in FIG. 9A). The aperture 932 may be referred to as an attachment aperture. The notches 934 may be configured to retain and prevent disengagement (e.g., accidental disengagement) of the roller tube from the mounting bracket 900. For example, one of the notches 934 may receive a tab (e.g., such as the tab 699 shown in FIGS. 9A and 9C) of an idler shaft (e.g., such as the idler shaft 614 shown in FIGS. 9A, 9B, and 9C) that is installed within the roller tube. The base 912 may be configured to attach the mounting bracket 900 to the structure. The structure may include a window frame (e.g., a head jamb or side jambs of a window frame), a wall, a ceiling, or other structure, such that the motorized window treatment is mounted proximate to an opening (e.g., over the opening or in the opening), such as a window for example. When the mounting bracket 900 is attached to a vertical structure, such as a wall, the arm 914 of the mounting bracket 900 may extend horizontally (e.g., in the radial direction R) from the base 912. A base cover 916 may be configured to be detachably mounted over the base 912 of the mounting bracket 900. The base cover 916 may be configured to cover and/or conceal the base 912.

The translating portion 920 may be configured to translate between an operating position (e.g., as shown in FIG. 16) and an extended position. The translating portion 920 may be proximate to (e.g., aligned with) the base 912 when in the operating position and distal from the base 912 when in the extended position. The end of the roller tube (e.g., the idler end) may be accessible via the aperture 932 when the translating portion 920 is in the extended position. The roller tube may be rotated to set the pre-winding of a spring (e.g., such as the spring assist assembly 616 shown in FIG. 9) of the battery-powered motorized window treatment when the translating portion 920 is in the extended position.

The mounting bracket 900 may be configured as an end bracket (e.g., as shown) that receives a single roller tube. Alternatively, the mounting bracket 900 may be configured as a center bracket that receives two roller tubes. Although the mounting bracket 900 is shown as accepting a roller tube from one side of the arm 914, it should be appreciated that the mounting bracket 900 may be configured to accept one roller tube at a first side of the arm 914 and another roller tube at an opposed second side of the arm 914. The center bracket may define a translating portion (e.g., such as the translating portion 720) on one side of the arm 914. The translating portion may slide, for example such that an end of one of the roller tubes can be accessed (e.g., in the extended position).

Figure 17B:
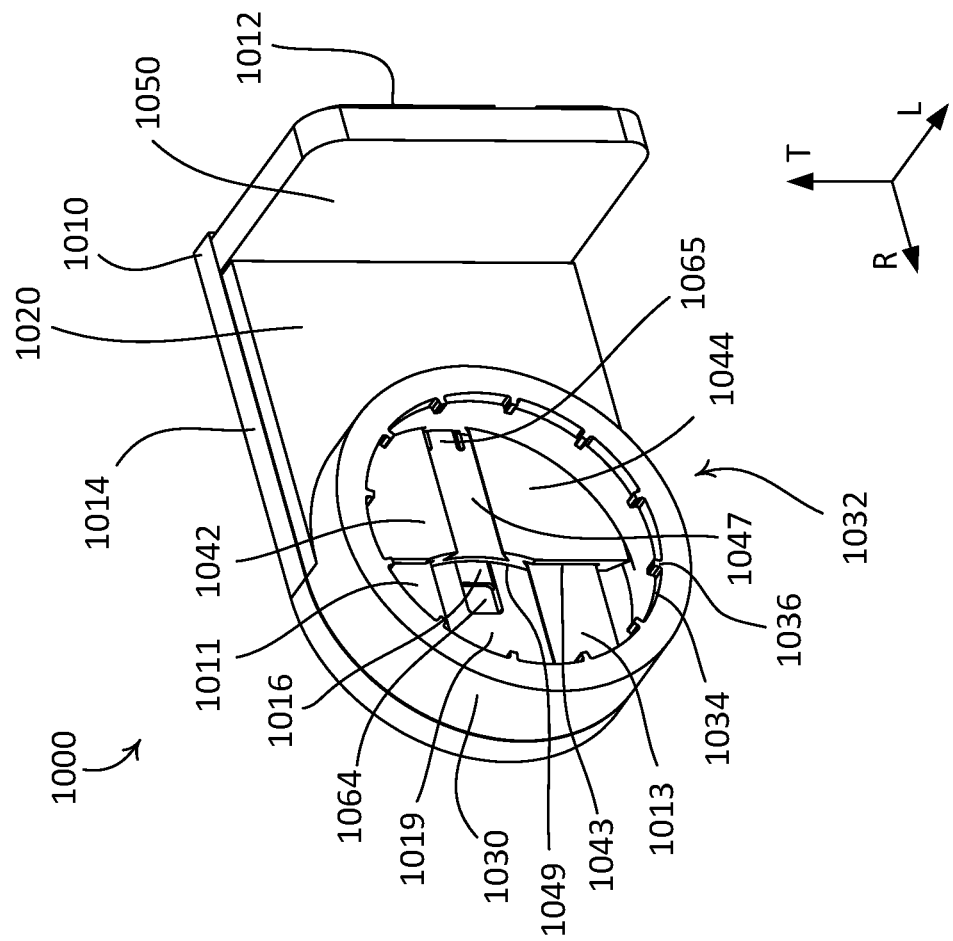
FIG. 17B is a rear perspective view of the example mounting bracket shown in FIG. 17A.
Figure 17A:
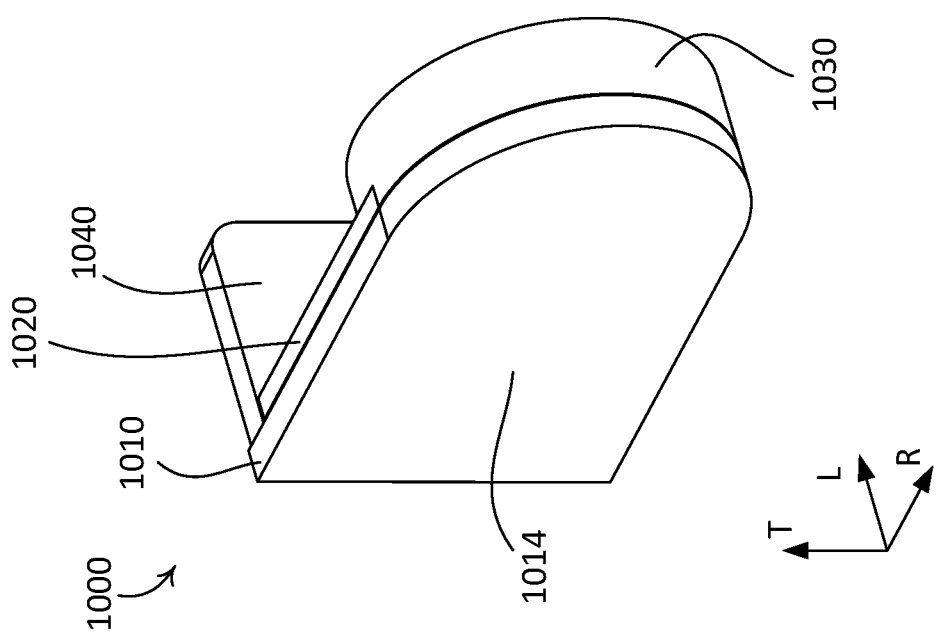
FIG. 17A is a front perspective view of an example mounting bracket for mounting a battery-powered motorized window treatment (e.g., to a vertical surface, such as a wall).
Figure 19A:
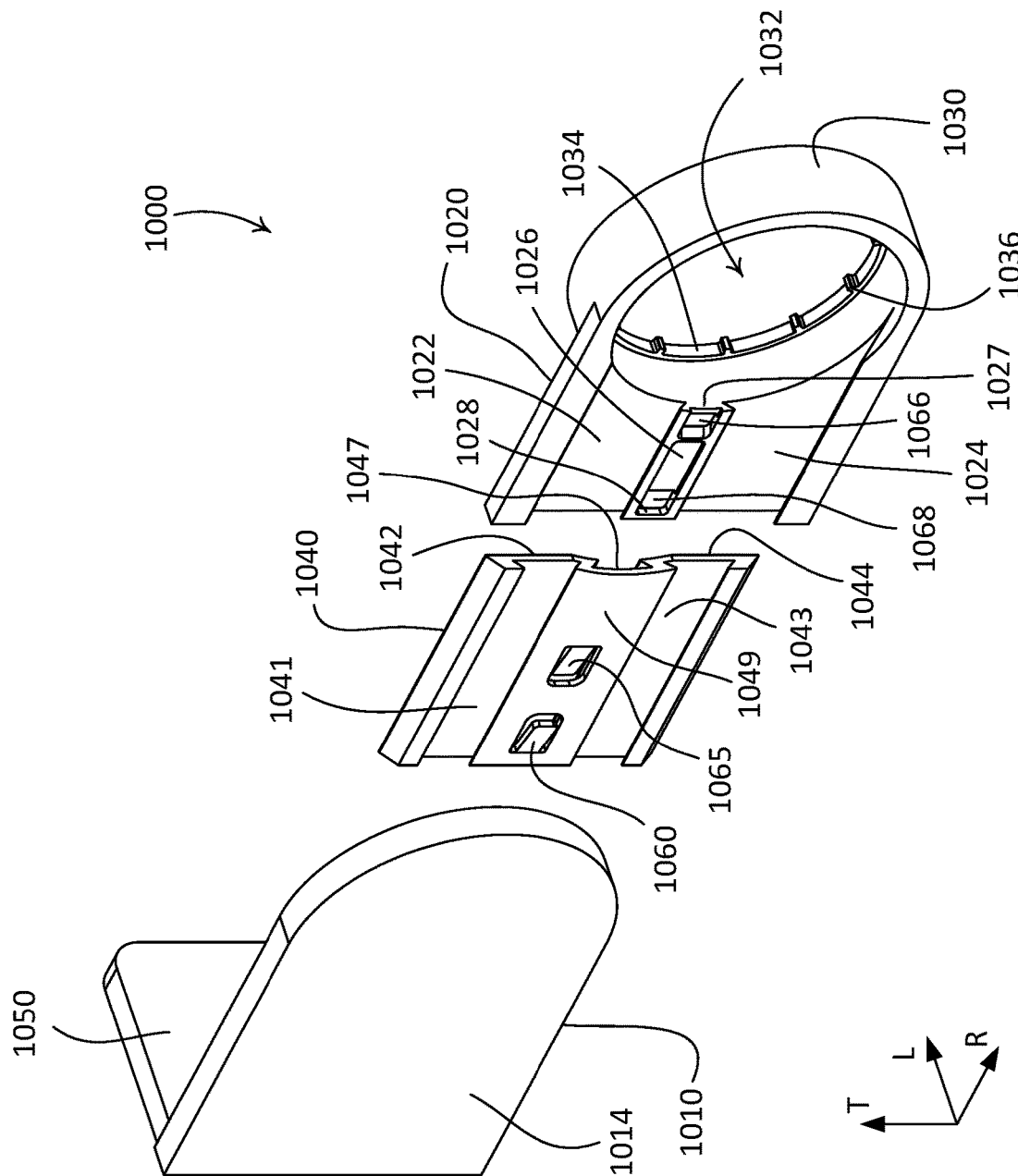
FIG. 19A is a front exploded view of the mounting bracket shown in FIG. 17A.
Figure 19B:
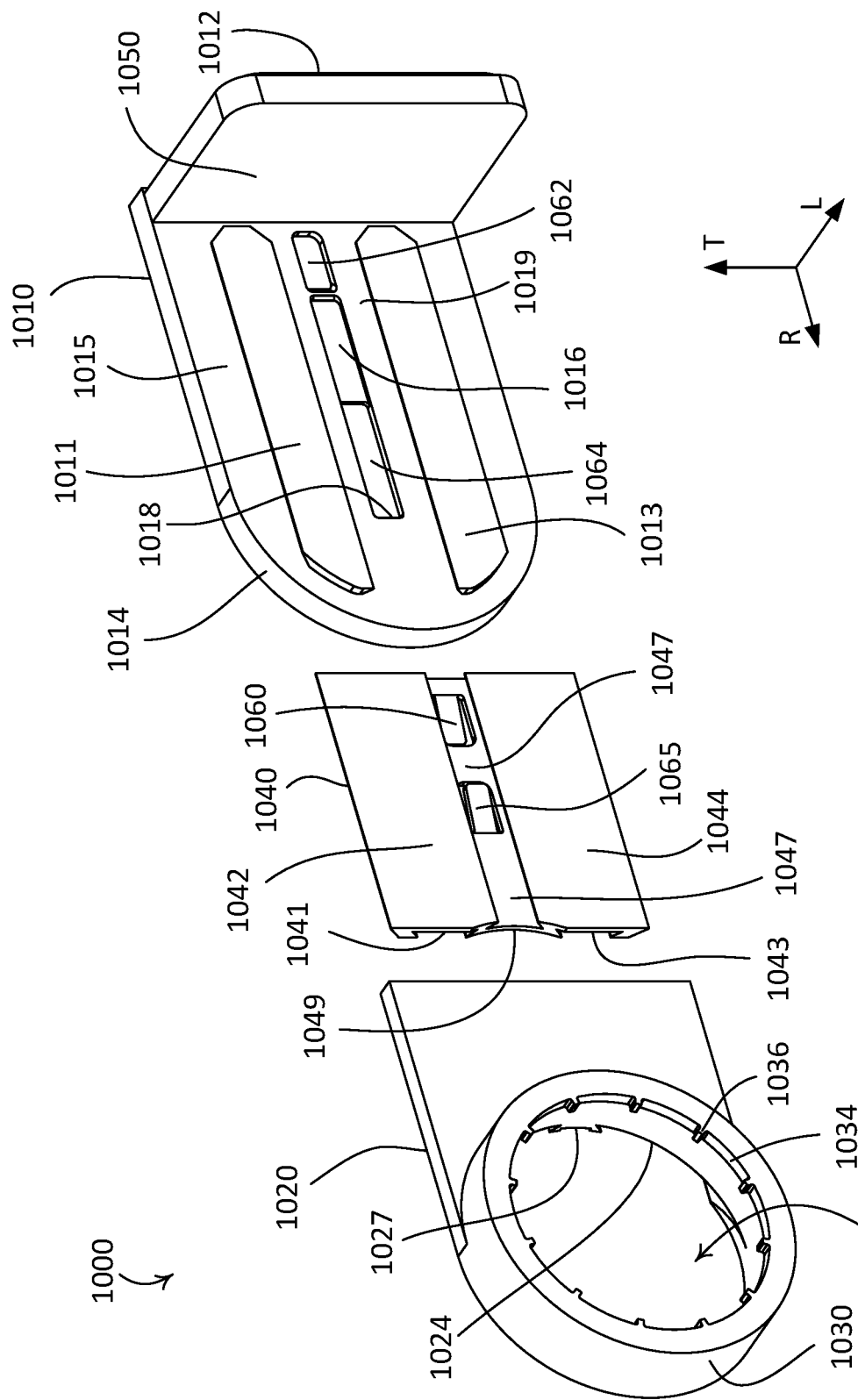
FIG. 19B is a rear exploded view of the mounting bracket shown in FIG. 17A.

FIGS. 17A and 17B depict an example mounting bracket 1000 for use with a battery-powered motorized window treatment (e.g., such as the motorized window treatment 100 shown in FIGS. 1A and 1B, the battery-powered motorized window treatment 200 shown in FIGS. 2A and 2B, the battery-powered motorized window treatment 300 shown in FIGS. 3A and 3B, the battery-powered motorized window treatment 400 shown in FIGS. 4A and 4B, the battery-powered motorized window treatment 500 shown in FIG. 5A, the battery-powered motorized window treatment 5500 shown in FIG. 6, and/or the battery-powered motorized window treatment 600 shown in FIGS. 8A-11) in an operating position. FIGS. 18A and 18B depict the mounting bracket 1000 in an extended position. FIGS. 19A and 19B are exploded views of the mounting bracket 1000. The mounting bracket 1000 may be configured to be attached to a structure, e.g., such as a wall or other vertical surface (e.g., as shown in FIGS. 1A-7).

The mounting bracket 1000 may be configured to secure, without requiring a tool, a roller tube in a first direction parallel to a longitudinal axis (e.g., the longitudinal direction L), in a second direction that is parallel to the structure and perpendicular to the longitudinal axis (e.g., the transverse direction T), and in a third direction perpendicular to the structure and the longitudinal axis (e.g., the radial direction R). As shown, the mounting bracket 1000 may include a stationary portion 1010, a translating portion 1020, and a sliding portion 1040. The stationary portion 1010 may include a base 1012 (e.g., a foot) and an arm 1014. The translating portion 1020 may include an attachment member 1030 that is configured to receive an end of the roller tube and/or a motor drive unit housing. The attachment member 1030 may define an aperture 1032 (e.g., an attachment aperture) surrounded by a rim 1034. The attachment member 1030 may comprise a plurality of teeth 1036 configured to engage corresponding features of the end of the roller tube and/or the motor drive unit housing.

The base 1012 may be configured to attach the mounting bracket 1000 to the structure. The structure may include a window frame (e.g., a head jamb or side jambs of a window frame), a wall, a ceiling, or other structure, such that the motorized window treatment is mounted proximate to an opening (e.g., over the opening or in the opening), such as a window for example. When the mounting bracket 1000 is attached to a vertical structure, such as a wall, the arm 1014 of the mounting bracket 1000 may extend horizontally (e.g., in the radial direction R) from the base 1012. The base 1012 may include holes (e.g., such as holes 1152) configured to receive a fastener (not shown) for securing the mounting bracket 1000 to the structure. The mounting bracket 1000 may comprise a base cover 1050 may be configured to be detachably mounted over the base 1012, e.g., for covering and/or concealing the base 1012.

The sliding portion 1040 may be coupled (e.g., slidably coupled) between the stationary portion 1010, and the translating portion 1020. The translating portion 1020 and the sliding portion 1040 may be configured to translate the roller tube between the operating position (e.g., as shown in FIGS. 17A and 17B) and the extended position (e.g., as shown in FIGS. 18A and 18B). The translating portion 1020 may be proximate to the base 1012 when in the operating position and distal from the base 1012 when in the extended position. The end of the roller tube and/or the motor drive unit housing may be accessible via the aperture 1032 (e.g., to replace the batteries) when the translating portion 1020 is in the extended position.

The stationary portion 1010, the translating portion 1020, and the sliding portion 1040 may define one or more features that enable the translating portion 1020 to be translated between the operating position and the extended position. The translating portion 1020 and the sliding portion 1040 may be configured to move in the radial direction R from the operating position to the extended position (e.g., in the same direction as the arm 1014 extends from the base 1012). The translating portion 1020 may define one or more corresponding features that are configured to cooperate with the one or more features on the sliding portion 1040, and the sliding portion 1040 may define one or more corresponding features that are configured to cooperate with the one or more features on the stationary portion 1010.

The arm 1014 of the stationary portion 1010 may define one or more slides (e.g., an upper slide 1011 and a lower slide 1013). The upper slide 1011 and the lower slide 1013 may protrude from an inner surface 1015 of the arm 1014. The sliding portion 1040 may define one or more channels (e.g., an upper channel 1041 and a lower channel 1043). The upper channel 1041 may be configured to receive the upper slide 1011 and the lower channel 1043 may be configured to receive the lower slide 1013. The sliding portion 1040 may translate along the upper slide 1011 and the lower slide 1013 when the translating portion 1020 is moving between the operating position and the extended position. In addition, the sliding portion 1040 may define one or more slides (e.g., a middle slide 1049), and the arm 1014 may define one or more channels (e.g., a middle channel 1019). The middle slide 1029 may protrude from the sliding portion 1040 between the upper channel 1021 and the lower channel 1023. The middle channel 1019 may be located between the upper slide 1011 and the lower slide 1013. The middle channel 1019 may be configured to receive the middle slide 1029. The sliding portion 1040 may translate along the middle slide 1029 when the translating portion 1020 is moving between the operating position and the extended position.

The sliding portion 1040 may define one or more slides (e.g., an upper slide 1042 and a lower slide 1044). The upper slide 1042 and the lower slide 1044 may protrude from the sliding portion 1040. The translating portion 1020 may define one or more channels (e.g., an upper channel 1022 and a lower channel 1024). The upper channel 1022 may be configured to receive the upper slide 1042 and the lower channel 1024 may be configured to receive the lower slide 1044. The translating portion 1020 may translate along the upper slide 1042 and the lower slide 1044 when the translating portion 1020 is moving between the operating position and the extended position. In addition, the translating portion 1020 may define one or more slides (e.g., a middle slide 1027), and the sliding portion 1040 may define one or more channels (e.g., a middle channel 1047). The middle slide 1027 may protrude from the translating portion 1020 between the upper channel 1022 and the lower channel 1024. The middle channel 1047 may be located between the upper slide 1042 and the lower slide 1044. The middle channel 1047 may be configured to receive the middle slide 1027. The translating portion 1020 may translate along the middle slide 1027 when the translating portion 1047 is moving between the operating position and the extended position.

The mounting bracket 1000 may be configured to be secured (e.g., locked) in the operating position and the extended position. The mounting bracket 1000 (e.g., the sliding portion 1040) may define a first locking tab 1060 and a second locking tab 1065. The stationary portion 1010 and the translating portion 120 may each define one or more indentations configured to receive the first locking tab 1060. For example, the stationary portion 1010 (e.g., the arm 1014) may define an operating position cavity 1062 and an extended position cavity 1064, and the translating portion 1020 may define an operating position cavity 1066 and an extended position cavity 1068. The operating position cavity 1062 of the stationary portion 1010 and the operating position cavity 1066 of the translating portion 1020 may each define a recess (e.g., detent) that is configured to receive the first locking tab 1060 and the second locking tab 1065, respectively, when the roller tube is in the operating position. The extended position cavity 1064 of the stationary portion 1010 and the extended position cavity 1068 of the translating portion 1020 may each define a recess (e.g., detent) that is configured to receive the first locking tab 1060 and the second locking tab 1065, respectively, when the roller tube is in the extended position. The operating position cavity 1062 of the stationary portion 1010 and the operating position cavity 1066 of the translating portion 1020 may be configured to receive the respective locking tabs 1060, 1065 to hold (e.g., lock) the roller tube in the operating position. The extended position cavity 1064 of the stationary portion 1010 and the extended position cavity 1068 of the translating portion 1020 may be configured to receive the respective locking tabs 1060, 1065 to hold (e.g., lock) the roller tube in the extended position. For example, the extended position cavities 1064, 1068 and the respective locking tabs 1060, 1065 may be configured to prevent the roller tube from sliding out of engagement with the mounting bracket 1000.

The first and second locking tabs 1060, 1065 may be configured to engage the respective operating position cavities 1062, 1066 when the roller tube is in the operating position. The first and second locking tab 1060, 1065 may be configured to engage the respective extended position cavities 1064, 1068 when the roller tube is in the extended position. For example, the first and second locking tab 1060, 1065 (e.g., a distal portion of the locking tabs) may be configured to be received in (e.g., and slide along) an inner channel 1016 in the stationary portion 1010 and an inner channel 1026 in the translating portion 1020, respectively, as the mounting bracket 1000 is transitioned between the operating position and the extended position. The inner channels 1016, 1026 may be configured to prevent the roller tube from being pulled out of engagement with the mounting bracket 1000. For example, the inner channels 1016, 1026 may define respective walls 1018, 1028 configured to abut the respective locking tabs 1060, 1065 to prevent the roller tube from being translated beyond the extended position.

The first and second locking tabs 1060, 1065 may be configured to secure the roller tube in the operating position. The first and second locking tabs 1060, 1065 may be configured to prevent accidental disengagement of the roller tube from the operating position. For example, the first locking tab 1060 and the operating position cavity 1062 of the stationary portion 1010 may be configured to resist a threshold force in the radial direction, and the second locking tab 1065 and the operating position cavity 1066 of the translating portion 1020 may be configured to resist a threshold force in the opposing radial direction. When a force greater than the threshold force is applied in the radial direction and the opposing radial direction, the first and second locking tabs 1060, 1065 may release (e.g., disengage) from the operating position cavities 1062, 1066, respectively, such that the roller tube can be moved to the extended position. The first and second locking tabs 1060, 1065 may slide through the respective channels 1016, 1026 until reaching the respective extended position cavity 1064, 1068.

The first and second locking tabs 1060, 1065 may be configured to secure the roller tube in the extended position. The walls 1018, 1028 of the respective channels 1016, 1026 may provide a positive lock with the respective locking tabs 1060, 1065 to prevent the roller tube from being extended beyond the extended position. For example, the locking tabs 1060, 1065 may abut the respective walls 1018, 1028 when the roller tube is in the extended position and/or when a radial force is applied to the roller tube when in the extended position. The first and second locking tabs 1060, 1065 and the respective extended position cavities 1064, 1068 may be configured to enable the roller tube to be released from the extended position and translated back toward the operating position. The first and second locking tabs 1060, 1065 and the respective extended position cavities 1064, 1068 may be configured to prevent the roller tube from being pulled out of engagement with the mounting bracket 1000, for example, when the roller tube is in the extended position. The mounting bracket 1000 may include a release button (not shown) that enables release of the translating portion 1020 and/or the sliding portion 1040 from the operating position such that the mounting bracket 1000 can be translated to the extended position. The mounting bracket 1000 may include a disengagement button (not shown) that enables disengagement of the translating portion 1020 and/or the sliding portion 1040 from the stationary portion 1010.

The mounting bracket 1000 may be used at both sides of a roller tube, for example, such that the roller tube slides away from the structure. For example, the mounting bracket 1000 on the opposite end of the roller tube may be flipped 180 degrees such that the base 1012 is also attached to the structure. Alternatively, the mounting bracket 1000 may be used at one end of a roller tube such that the roller tube pivots away from the structure. The mounting bracket 1000 may be configured as an end bracket (e.g., as shown) that receives a single roller tube. Alternatively, the mounting bracket 1000 may be configured as a center bracket that receives two roller tubes. Although the mounting bracket 1000 is shown as accepting a roller tube from one side of the arm 1014, it should be appreciated that the mounting bracket 1000 may be configured to accept one roller tube at a first side of the arm 1014 and another roller tube at an opposed second side of the arm 1014. The center bracket may define translating portions and/or sliding portions (e.g., such as translating portion 1020 and/or the sliding portion 1040) on both sides of the arm 1014. The center bracket may define slides (e.g., such as upper slide 1011 and lower slide 1013) on both sides of the arm 1014. Each of the translating portions and/or sliding portions may slide independently, for example such that an end of one of the roller tubes can be accessed (e.g., in the extended position) while the other roller tube remains in the operating position.

Figure 22A:
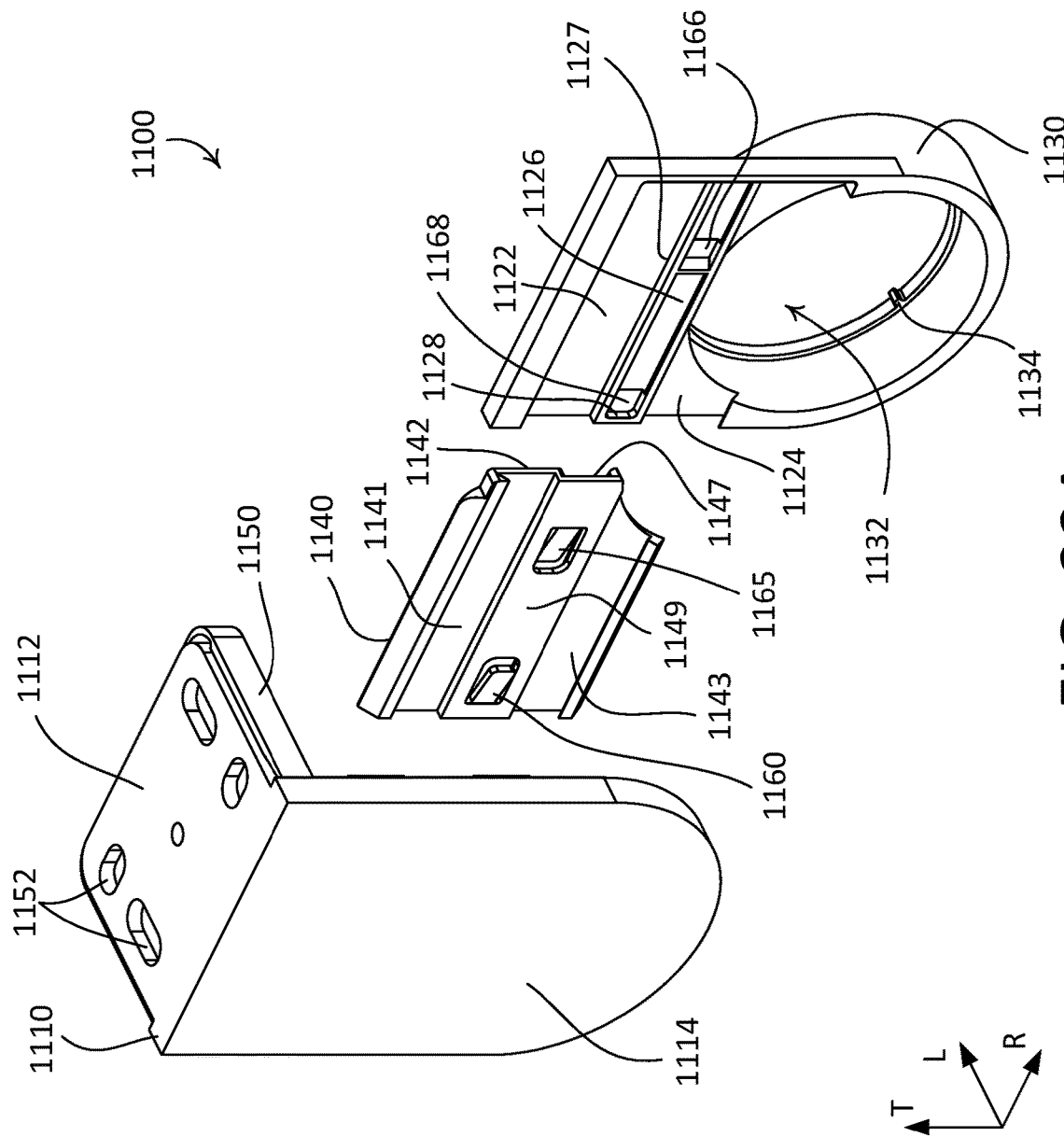
FIG. 22A is a front exploded view of the mounting bracket shown in FIG. 20A.
Figure 22B:
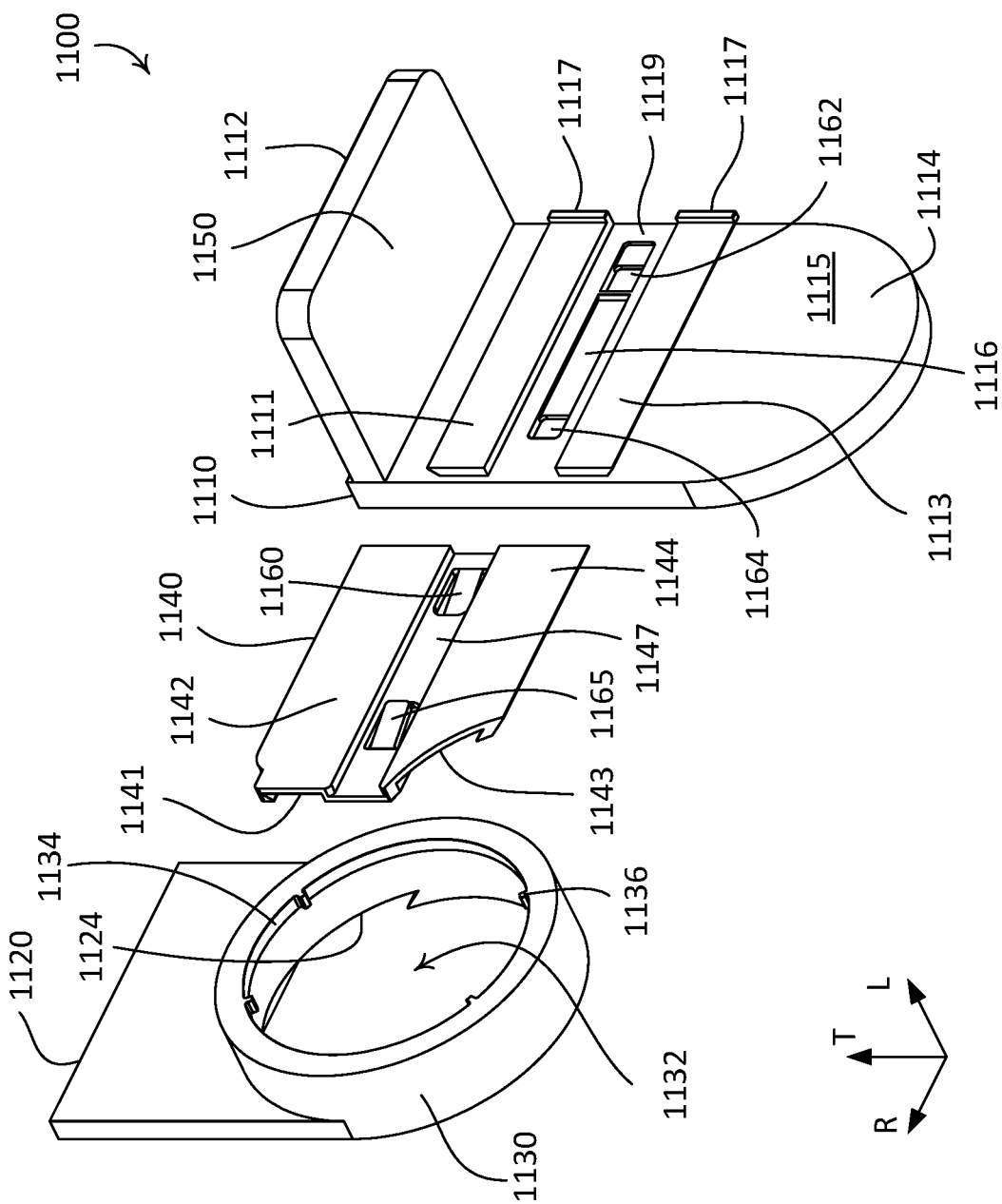
FIG. 22B is a rear exploded view of the mounting bracket shown in FIG. 20A.

FIGS. 20A and 20B depict an example mounting bracket 1100 for use with a battery-powered motorized window treatment (e.g., such as the motorized window treatment 100 shown in FIGS. 1A and 1B, the battery-powered motorized window treatment 200 shown in FIGS. 2A and 2B, the battery-powered motorized window treatment 300 shown in FIGS. 3A and 3B, the battery-powered motorized window treatment 400 shown in FIGS. 4A and 4B, the battery-powered motorized window treatment 500 shown in FIG. 5A, the battery-powered motorized window treatment 5500 shown in FIG. 6, and/or the battery-powered motorized window treatment 600 shown in FIGS. 8A-11) in an operating position. FIGS. 21A and 21B depict the mounting bracket 1100 in an extended position. FIGS. 22A and 22B are exploded views of the mounting bracket 1100 in an extended position. The mounting bracket 1100 may be configured to be attached to a structure, e.g., such as a ceiling, a head jamb of a window frame, or other horizontal surface (e.g., as shown in 8A, 8B, and 9).

The mounting bracket 1100 may be configured to secure, without requiring a tool, a roller tube in a first direction parallel to a longitudinal axis (e.g., the longitudinal direction L), in a second direction that is parallel to the structure and perpendicular to the longitudinal axis (e.g., the transverse direction T), and in a third direction perpendicular to the structure and the longitudinal axis (e.g., the radial direction R). As shown, the mounting bracket 1100 may include a stationary portion 1110, a translating portion 1120, and a sliding portion 1140. The stationary portion 1010 may include a base 1112 (e.g., a foot) and an arm 1114. The translating portion 1120 may include an attachment member 1130 that is configured to receive an end of the roller tube and/or a motor drive unit housing. The attachment member 1130 may define an aperture 1132 (e.g., an attachment aperture) surrounded by a rim 1134. The attachment member 1130 may comprise a plurality of teeth 1136 configured to engage corresponding features of the end of the roller tube and/or the motor drive unit housing.

The base 1112 may be configured to attach the mounting bracket 1100 to the structure. The structure may include a window frame (e.g., a head jamb or side jambs of a window frame), a wall, a ceiling, or other structure, such that the motorized window treatment is mounted proximate to an opening (e.g., over the opening or in the opening), such as a window for example. When the mounting bracket 1100 is attached to a horizontal structure, such as a ceiling, the arm 1114 of the mounting bracket 1100 may extend vertically (e.g., in the transverse direction T) from the base 1112. The base 1112 may include holes 1152 configured to receive a fastener (not shown) for securing the mounting bracket 1100 to the structure. The mounting bracket 1100 may comprise a base cover 1150 may be configured to be detachably mounted over the base 1112, e.g., for covering and/or concealing the base 1112.

The sliding portion 1140 may be coupled (e.g., slidably coupled) between the stationary portion 1110 and the translating portion 1120. The translating portion 1120 and the sliding portion 1140 may be configured to translate the roller tube between the operating position (e.g., as shown in FIGS. 20A and 20B) and the extended position (e.g., as shown in FIGS. 21A and 21B). The translating portion 1120 may be proximate to the base 1112 when in the operating position and distal from the base 1112 when in the extended position. The end of the roller tube and/or the motor drive unit housing may be accessible via the aperture 1132 (e.g., to replace the batteries) when the translating portion 1120 is in the extended position.

The stationary portion 1110, the translating portion 1120, and the sliding portion 1140 may define one or more features that enable the translating portion 1120 to be translated between the operating position and the extended position. The translating portion 1120 may be configured to move in the radial direction R from the operating position to the extended position (e.g., in a direction that is 90° from the direction that the arm 1114 extends from the base 1112). The translating portion 1120 may define one or more corresponding features that are configured to cooperate with the one or more features on the sliding portion 1140, and the sliding portion 1140 may define one or more corresponding features that are configured to cooperate with the one or more features on the stationary portion 1110.

The stationary portion 1110 may define one or more slides (e.g., an upper slide 1111 and a lower slide 1113). The upper slide 1111 and the lower slide 1113 may protrude from an inner surface 1115 of the arm 1114. The sliding portion 1140 may define one or more channels (e.g., an upper channel 1141 and a lower channel 1143). The upper channel 1141 may be configured to receive the upper slide 1111 and the lower channel 1143 may be configured to receive the lower slide 1113. The sliding portion 1140 may translate along the upper slide 1111 and the lower slide 1113 when the translating portion 1120 is moving between the operating position and the extended position. In addition, the sliding portion 1140 may define one or more slides (e.g., a middle slide 1149), and the stationary portion 1110 may define one or more channels (e.g., a middle channel 1119). The middle slide 1129 may protrude from the sliding portion 1140 between the upper channel 1121 and the lower channel 1123. The middle channel 1119 may be located between the upper slide 1111 and the lower slide 1113. The middle channel 1119 may be configured to receive the middle slide 1129. The sliding portion 1140 may translate along the middle slide 1129 when the translating portion 1120 is moving between the operating position and the extended position.

The sliding portion 1140 may define one or more slides (e.g., an upper slide 1142 and a lower slide 1144). The upper slide 1142 and the lower slide 1144 may protrude from the sliding portion 1140. The translating portion 1120 may define one or more channels (e.g., an upper channel 1122 and a lower channel 1124). The upper channel 1122 may be configured to receive the upper slide 1142 and the lower channel 1124 may be configured to receive the lower slide 1144. The translating portion 1120 may translate along the upper slide 1142 and the lower slide 1144 when the translating portion 1120 is moving between the operating position and the extended position. In addition, the translating portion 1120 may define one or more slides (e.g., a middle slide 1127), and the sliding portion 1140 may define one or more channels (e.g., a middle channel 1147). The middle slide 1127 may protrude from the translating portion 1120 between the upper channel 1122 and the lower channel 1124. The middle channel 1147 may be located between the upper slide 1142 and the lower slide 1144. The middle channel 1147 may be configured to receive the middle slide 1127. The translating portion 1120 may translate along the middle slide 1127 when the translating portion 1147 is moving between the operating position and the extended position.

The mounting bracket 1100 may be configured to be secured (e.g., locked) in the operating position and the extended position. The mounting bracket 1100 (e.g., the sliding portion 1140) may define a first locking tab 1160 and a second locking tab 1165. The stationary portion 1110 and the translating portion 120 may each define one or more indentations configured to receive the first locking tab 1160. For example, the stationary portion 1110 (e.g., the arm 1114) may define an operating position cavity 1162 and an extended position cavity 1164, and the translating portion 1120 may define an operating position cavity 1166 and an extended position cavity 1168. The operating position cavity 1162 of the stationary portion 1110 and the operating position cavity 1166 of the translating portion 1120 may each define a recess (e.g., detent) that is configured to receive the first locking tab 1160 and the second locking tab 1165, respectively, when the roller tube is in the operating position. The extended position cavity 1164 of the stationary portion 1110 and the extended position cavity 1168 of the translating portion 1120 may each define a recess (e.g., detent) that is configured to receive the first locking tab 1160 and the second locking tab 1165, respectively, when the roller tube is in the extended position. The operating position cavity 1162 of the stationary portion 1110 and the operating position cavity 1166 of the translating portion 1120 may be configured to receive the respective locking tabs 1160, 1165 to hold (e.g., lock) the roller tube in the operating position. The extended position cavity 1164 of the stationary portion 1110 and the extended position cavity 1168 of the translating portion 1120 may be configured to receive the respective locking tabs 1160, 1165 to hold (e.g., lock) the roller tube in the extended position. For example, the extended position cavities 1164, 1168 and the respective locking tabs 1160, 1165 may be configured to prevent the roller tube from sliding out of engagement with the mounting bracket 1100.

The first and second locking tabs 1160, 1165 may be configured to engage the respective operating position cavities 1162, 1166 when the roller tube is in the operating position. The first and second locking tab 1160, 1165 may be configured to engage the respective extended position cavities 1164, 1168 when the roller tube is in the extended position. For example, the first and second locking tab 1160, 1165 (e.g., a distal portion of the locking tabs) may be configured to be received in (e.g., and slide along) an inner channel 1116 in the stationary portion 1110 and an inner channel 1126 in the translating portion 1120, respectively, as the mounting bracket 1100 is transitioned between the operating position and the extended position. The inner channels 1116, 1126 may be configured to prevent the roller tube from being pulled out of engagement with the mounting bracket 1100. For example, the inner channels 1116, 1126 may define respective walls 1118, 1128 configured to abut the respective locking tabs 1160, 1165 to prevent the roller tube from being translated beyond the extended position.

The first and second locking tabs 1160, 1165 may be configured to secure the roller tube in the operating position. The first and second locking tabs 1160, 1165 may be configured to prevent accidental disengagement of the roller tube from the operating position. For example, the first locking tab 1160 and the operating position cavity 1162 of the stationary portion 1110 may be configured to resist a threshold force in the radial direction, and the second locking tab 1165 and the operating position cavity 1166 of the translating portion 1120 may be configured to resist a threshold force in the opposing radial direction. When a force greater than the threshold force is applied in the radial direction and the opposing radial direction, the first and second locking tabs 1160, 1165 may release (e.g., disengage) from the operating position cavities 1162, 1166, respectively, such that the roller tube can be moved to the extended position. The first and second locking tabs 1160, 1165 may slide through the respective inner channels 1116, 1126 until reaching the respective extended position cavity 1164, 1168.

The first and second locking tabs 1160, 1165 may be configured to secure the roller tube in the extended position. The walls 1118, 1128 of the respective channels 1116, 1126 may provide a positive lock with the respective locking tabs 1160, 1165 to prevent the roller tube from being extended beyond the extended position. For example, the locking tabs 1160, 1165 may abut the respective walls 1118, 1128 when the roller tube is in the extended position and/or when a radial force is applied to the roller tube when in the extended position. The first and second locking tabs 1160, 1165 and the respective extended position cavities 1164, 1168 may be configured to enable the roller tube to be released from the extended position and translated back toward the operating position. The first and second locking tabs 1160, 1165 and the respective extended position cavities 1164, 1168' may be configured to prevent the roller tube from being pulled out of engagement with the mounting bracket 1100, for example, when the roller tube is in the extended position. The mounting bracket 1100 may include a release button (not shown) that enables release of the translating portion 1120 and/or the sliding portion 1140 from the operating position such that the mounting bracket 1100 can be translated to the extended position. The mounting bracket 1100 may include a disengagement button (not shown) that enables disengagement of the translating portion 1120 and/or the sliding portion 1140 from the stationary portion 1110.

The mounting bracket 1100 may be used at both sides of a roller tube, for example, such that the roller tube slides away from the structure. For example, the mounting bracket 1100 on the opposite end of the roller tube may be flipped 180 degrees such that the base 1112 is also attached to the structure. Alternatively, the mounting bracket 1100 may be used at one end of a roller tube such that the roller tube pivots away from the structure. The mounting bracket 1100 may be configured as an end bracket (e.g., as shown) that receives a single roller tube. Alternatively, the mounting bracket 1100 may be configured as a center bracket that receives two roller tubes. Although the mounting bracket 1100 is shown as accepting a roller tube from one side of the arm 1114, it should be appreciated that the mounting bracket 1100 may be configured to accept one roller tube at a first side of the arm 1114 and another roller tube at an opposed second side of the arm 1114. The center bracket may define translating portions and/or sliding portions (e.g., such as translating portion 1120 and/or the sliding portion 1140) on both sides of the arm 1114. The center bracket may define slides (e.g., such as upper slide 1111 and lower slide 1113) on both sides of the arm 1114. Each of the translating portions and/or sliding portions may slide independently, for example such that an end of one of the roller tubes can be accessed (e.g., in the extended position) while the other roller tube remains in the operating position.

Figure 23B:
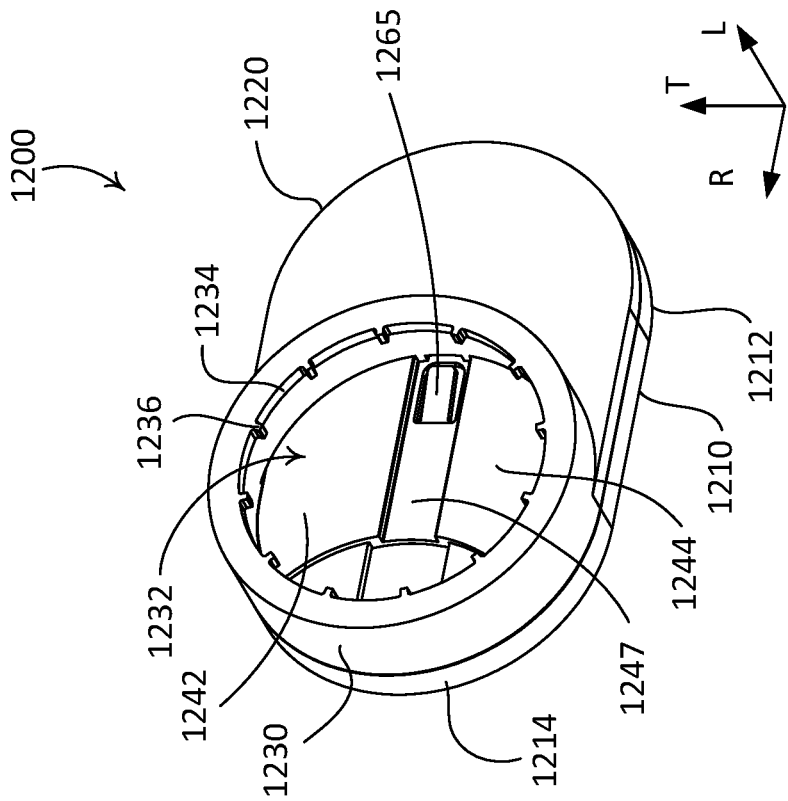
FIG. 23B is a rear perspective view of the example mounting bracket shown in FIG. 23A.
Figure 23A:
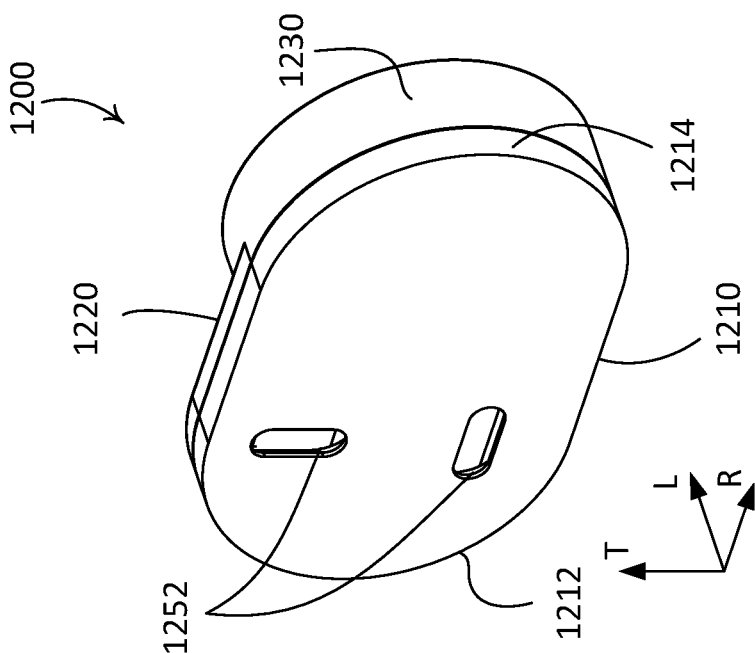
FIG. 23A is a front perspective view of another example mounting bracket for mounting a battery-powered motorized window treatment (e.g., to a vertical surface, such as a window jamb).
Figure 25A:
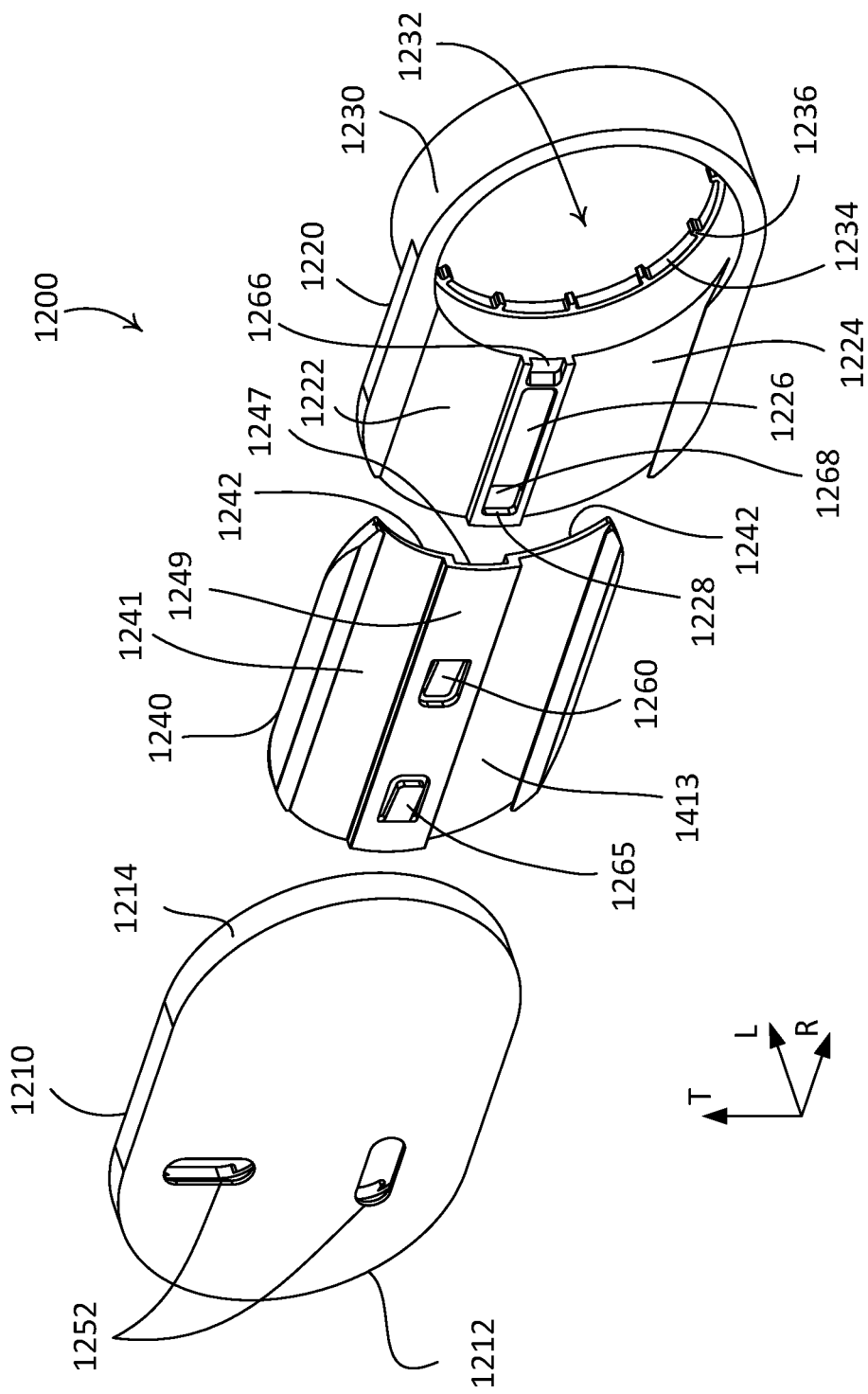
FIG. 25A is a front exploded view of the mounting bracket shown in FIG. 23A.
Figure 25B:
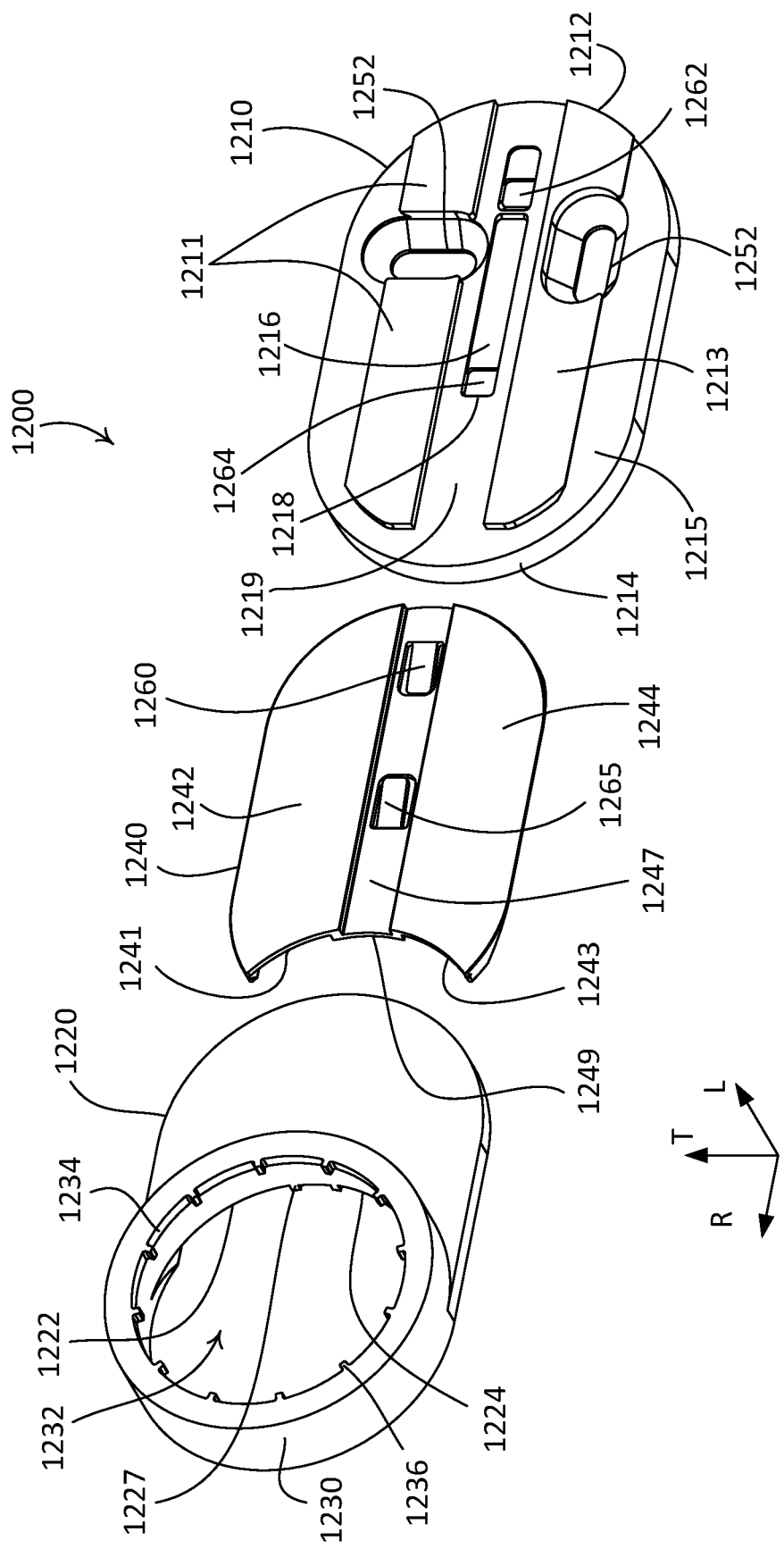
FIG. 25B is a rear exploded view of the mounting bracket shown in FIG. 23A.

FIGS. 23A and 23B depict an example mounting bracket 1200 for use with a battery-powered motorized window treatment (e.g., such as the motorized window treatment 100 shown in FIGS. 1A and 1B, the battery-powered motorized window treatment 200 shown in FIGS. 2A and 2B, the battery-powered motorized window treatment 300 shown in FIGS. 3A and 3B, the battery-powered motorized window treatment 400 shown in FIGS. 4A and 4B, the battery-powered motorized window treatment 500 shown in FIG. 5A, the battery-powered motorized window treatment 5500 shown in FIG. 6, and/or the battery-powered motorized window treatment 600 shown in FIGS. 8A-11) in an operating position. FIGS. 24A and 24B depict the mounting bracket 1200 in an extended position. FIGS. 25A and 25B are exploded views of the mounting bracket 1200 in an extended position. The mounting bracket 1200 may be configured to be attached to a structure, e.g., such as a side jamb of a window frame or other vertical surface.

The mounting bracket 1200 may be configured to secure, without requiring a tool, a roller tube in a first direction parallel to a longitudinal axis (e.g., the longitudinal direction L), in a second direction that is parallel to the structure and perpendicular to the longitudinal axis (e.g., the transverse direction T), and in a third direction perpendicular to the structure and the longitudinal axis (e.g., the radial direction R). As shown, the mounting bracket 1200 may include a stationary portion 1210, a translating portion 1220, and a sliding portion 1240. The stationary portion 1010 may include a rear portion 1212 (e.g., a base or foot) and a front portion 1214 (e.g., an arm). The translating portion 1220 may include an attachment member 1230 that is configured to receive an end of the roller tube and/or a motor drive unit housing. The attachment member 1230 may define an aperture 1232 (e.g., an attachment aperture) surrounded by a rim 1234. The attachment member 1230 may comprise a plurality of teeth 1236 configured to engage corresponding features of the end of the roller tube and/or the motor drive unit housing.

The stationary portion 1210 (e.g., the rear portion 1212) may be configured to attach the mounting bracket 1200 to the structure. The structure may include a window frame (e.g., a head jamb or side jambs of a window frame), a wall, a ceiling, or other structure, such that the motorized window treatment is mounted proximate to an opening (e.g., over the opening or in the opening), such as a window for example. The mounting bracket 1200 may be attached to a vertical structure, such as a side jamb of a window frame, such that the front portion 1214 of the mounting bracket 1200 extends horizontally (e.g., in the radial direction R) from the rear portion 1212. The stationary portion 1210 (e.g., the rear portion 1212) may include holes 1252 configured to receive a fastener (not shown) for securing the mounting bracket 1200 to the structure.

The sliding portion 1240 may be coupled (e.g., slidably coupled) between the stationary portion 1210, and the translating portion 1220. The translating portion 1220 and the sliding portion 1240 may be configured to translate the roller tube between the operating position (e.g., as shown in FIGS. 23A and 23B) and the extended position (e.g., as shown in FIGS. 24A and 24B). The translating portion 1220 may be proximate to the rear portion 1212 when in the operating position and distal from the rear portion 1212 when in the extended position. The end of the roller tube and/or the motor drive unit housing may be accessible via the aperture 1232 (e.g., to replace the batteries) when the translating portion 1220 is in the extended position.

The stationary portion 1210, the translating portion 1220, and the sliding portion 1240 may define one or more features that enable the translating portion 1220 to be translated between the operating position and the extended position. The translating portion 1220 may be configured to move in the radial direction R from the operating position to the extended position (e.g., in the same direction as the front portion 1214 extends from the rear portion 1212). The translating portion 1220 may define one or more corresponding features that are configured to cooperate with the one or more features on the sliding portion 1240, and the sliding portion 1240 may define one or more corresponding features that are configured to cooperate with the one or more features on the stationary portion 1210.

The stationary portion 1210 may define one or more slides (e.g., an upper slide 1211 and a lower slide 1213). The upper slide 1211 and the lower slide 1213 may protrude from an inner surface 1215 of the stationary portion 1210. The sliding portion 1240 may define one or more channels (e.g., an upper channel 1241 and a lower channel 1243). The upper channel 1241 may be configured to receive the upper slide 1211 and the lower channel 1243 may be configured to receive the lower slide 1213. The sliding portion 1240 may translate along the upper slide 1211 and the lower slide 1213 when the translating portion 1220 is moving between the operating position and the extended position. In addition, the sliding portion 1240 may define one or more slides (e.g., a middle slide 1249), and the stationary portion 1210 may define one or more channels (e.g., a middle channel 1219). The middle slide 1229 may protrude from the sliding portion 1240 between the upper channel 1221 and the lower channel 1223. The middle channel 1219 may be located between the upper slide 1211 and the lower slide 1213. The middle channel 1219 may be configured to receive the middle slide 1229. The sliding portion 1240 may translate along the middle slide 1229 when the translating portion 1220 is moving between the operating position and the extended position.

The sliding portion 1240 may define one or more slides (e.g., an upper slide 1242 and a lower slide 1244). The upper slide 1242 and the lower slide 1244 may protrude from the sliding portion 1240. The translating portion 1220 may define one or more channels (e.g., an upper channel 1222 and a lower channel 1224). The upper channel 1222 may be configured to receive the upper slide 1242 and the lower channel 1224 may be configured to receive the lower slide 1244. The translating portion 1220 may translate along the upper slide 1242 and the lower slide 1244 when the translating portion 1220 is moving between the operating position and the extended position. In addition, the translating portion 1220 may define one or more slides (e.g., a middle slide 1227), and the sliding portion 1240 may define one or more channels (e.g., a middle channel 1247). The middle slide 1227 may protrude from the translating portion 1220 between the upper channel 1222 and the lower channel 1224. The middle channel 1247 may be located between the upper slide 1242 and the lower slide 1244. The middle channel 1247 may be configured to receive the middle slide 1227. The translating portion 1220 may translate along the middle slide 1227 when the translating portion 1247 is moving between the operating position and the extended position.

The mounting bracket 1200 may be configured to be secured (e.g., locked) in the operating position and the extended position. The mounting bracket 1200 (e.g., the sliding portion 1240) may define a first locking tab 1260 and a second locking tab 1265. The stationary portion 1210 and the translating portion 1220 may each define one or more indentations configured to receive the first locking tab 1260. For example, the stationary portion 1210 may define an operating position cavity 1262 and an extended position cavity 1264, and the translating portion 1220 may define an operating position cavity 1266 and an extended position cavity 1268. The operating position cavity 1262 of the stationary portion 1210 and the operating position cavity 1266 of the translating portion 1220 may each define a recess (e.g., detent) that is configured to receive the first locking tab 1260 and the second locking tab 1265, respectively, when the roller tube is in the operating position. The extended position cavity 1264 of the stationary portion 1210 and the extended position cavity 1268 of the translating portion 1220 may each define a recess (e.g., detent) that is configured to receive the first locking tab 1260 and the second locking tab 1265, respectively, when the roller tube is in the extended position. The operating position cavity 1262 of the stationary portion 1210 and the operating position cavity 1266 of the translating portion 1220 may be configured to receive the respective locking tabs 1260, 1265 to hold (e.g., lock) the roller tube in the operating position. The extended position cavity 1264 of the stationary portion 1210 and the extended position cavity 1268 of the translating portion 1220 may be configured to receive the respective locking tabs 1260, 1265 to hold (e.g., lock) the roller tube in the extended position. For example, the extended position cavities 1264, 1268 and the respective locking tabs 1260, 1265 may be configured to prevent the roller tube from sliding out of engagement with the mounting bracket 1200.

The first and second locking tabs 1260, 1265 may be configured to engage the respective operating position cavities 1262, 1266 when the roller tube is in the operating position. The first and second locking tab 1260, 1265 may be configured to engage the respective extended position cavities 1264, 1268 when the roller tube is in the extended position. For example, the first and second locking tab 1260, 1265 (e.g., a distal portion of the locking tabs) may be configured to be received in (e.g., and slide along) an inner channel 1216 in the stationary portion 1210 and an inner channel 1226 in the translating portion 1220, respectively, as the mounting bracket 1200 is transitioned between the operating position and the extended position. The inner channels 1216, 1226 may be configured to prevent the roller tube from being pulled out of engagement with the mounting bracket 1200. For example, the inner channels 1216, 1226 may define respective walls 1218, 1228 configured to abut the respective locking tabs 1260, 1265 to prevent the roller tube from being translated beyond the extended position.

The first and second locking tabs 1260, 1265 may be configured to secure the roller tube in the operating position. The first and second locking tabs 1260, 1265 may be configured to prevent accidental disengagement of the roller tube from the operating position. For example, the first locking tab 1260 and the operating position cavity 1262 of the stationary portion 1210 may be configured to resist a threshold force in the radial direction, and the second locking tab 1265 and the operating position cavity 1266 of the translating portion 1220 may be configured to resist a threshold force in the opposing radial direction. When a force greater than the threshold force is applied in the radial direction and the opposing radial direction, the first and second locking tabs 1260, 1265 may release (e.g., disengage) from the operating position cavities 1262, 1266, respectively, such that the roller tube can be moved to the extended position. The first and second locking tabs 1260, 1265 may slide through the respective inner channels 1216, 1226 until reaching the respective extended position cavity 1264, 1268.

The first and second locking tabs 1260, 1265 may be configured to secure the roller tube in the extended position. The walls 1218, 1228 of the respective channels 1216, 1226 may provide a positive lock with the respective locking tabs 1260, 1265 to prevent the roller tube from being extended beyond the extended position. For example, the locking tabs 1260, 1265 may abut the respective walls 1218, 1228 when the roller tube is in the extended position and/or when a radial force is applied to the roller tube when in the extended position. The first and second locking tabs 1260, 1265 and the respective extended position cavities 1264, 1268 may be configured to enable the roller tube to be released from the extended position and translated back toward the operating position. The first and second locking tabs 1260, 1265 and the respective extended position cavities 1264, 1268' may be configured to prevent the roller tube from being pulled out of engagement with the mounting bracket 1200, for example, when the roller tube is in the extended position. The mounting bracket 1200 may include a release button (not shown) that enables release of the translating portion 1220 and/or the sliding portion 1240 from the operating position such that the mounting bracket 1200 can be translated to the extended position. The mounting bracket 1200 may include a disengagement button (not shown) that enables disengagement of the translating portion 1220 and/or the sliding portion 1240 from the stationary portion 1210.

The mounting bracket 1200 may be used at both sides of a roller tube, for example, such that the roller tube slides away from the structure. For example, the mounting bracket 1200 on the opposite end of the roller tube may be flipped 180 degrees. Alternatively, the mounting bracket 1200 may be used at one end of a roller tube such that the roller tube pivots away from the structure. The mounting bracket 1200 may be configured as an end bracket (e.g., as shown) that receives a single roller tube.

Figure 26A:
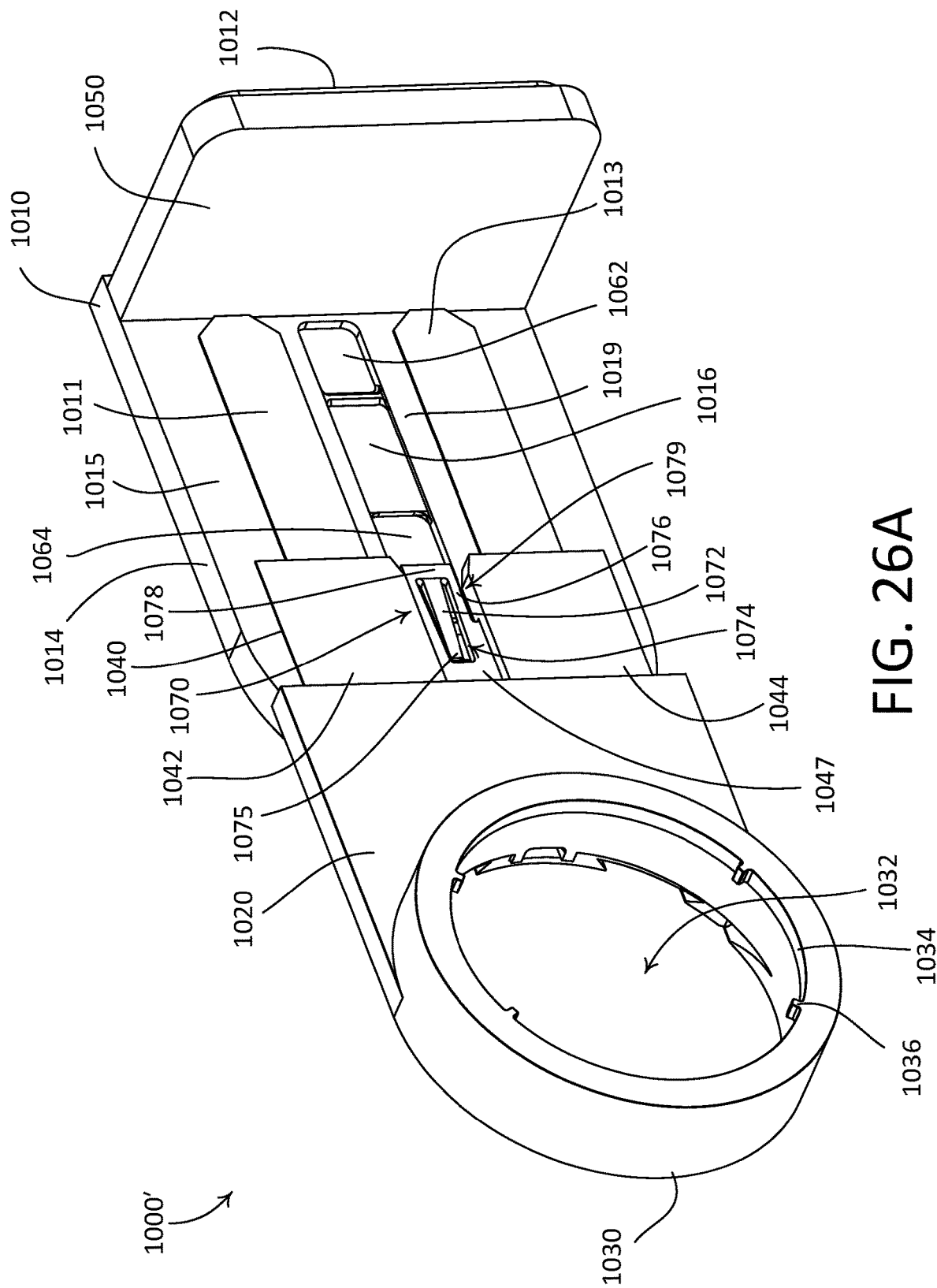
FIG. 26A is a front perspective view of an example mounting bracket for mounting a battery-powered motorized window treatment (e.g., to a vertical surface, such as a wall).

FIG. 26A depicts an example mounting bracket 1000' for use with a battery-powered motorized window treatment (e.g., such as the motorized window treatment 100 shown in FIGS. 1A and 1B, the battery-powered motorized window treatment 200 shown in FIGS. 2A and 2B, the battery-powered motorized window treatment 300 shown in FIGS. 3A and 3B, the battery-powered motorized window treatment 400 shown in FIGS. 4A and 4B, the battery-powered motorized window treatment 500 shown in FIG. 5A, the battery-powered motorized window treatment 5500 shown in FIG. 6, and/or the battery-powered motorized window treatment 600 shown in FIGS. 8A-11) in an operating position. The mounting bracket 1000' may be configured to be attached to a structure, e.g., such as a wall or other vertical surface (e.g., as shown in FIGS. 1A-7). The mounting bracket 1000' may be an alternate version of the mounting bracket 1000 shown in FIGS. 17A-19B, and may have many of the same features and elements.

The mounting bracket 1000' shown in FIG. 26A may comprise a locking tab 1070 (e.g., rather than the first locking tab 1060 shown in FIGS. 18B, 19A, and 19B) that may allow for releasable attachment of the stationary portion 1010 to the translating portion 1020 and the stationary portion 1040. The locking tab 1070 may be located in the middle channel 1047 of the sliding portion 1040. The locking tab 1070 may be received in the operating position cavity 1062 of the stationary portion 1010 when the roller tube is in the operating position, and received in the extended position cavity 1064 of the stationary portion 1010 when the roller tube is in the extended position. The operating position cavity 1062 and the extended position cavity 1064 may be configured to receive the locking tab 1070 to hold the roller tube in the operating position and the extended position, respectively.

As shown in FIG. 26A, the locking tab 1070 may comprise an arm 1072 that extends into an opening 1074 in the middle channel 1074 of the sliding portion 1040. The arm 1072 of the locking tab 1070 may define a distal portion 1075 of the locking tab 1070) that may be received in (e.g., and slide along) the inner channel 1016 in the stationary portion 1010 as the mounting bracket 1000' is transitioned between the operating position and the extended position. The distal portion 1075 of the locking tab 1070 may abut the wall 1018 of the inner channel 1016 when the mounting bracket 1000' is in the extended position to prevent the roller tube from being pulled out of engagement with the mounting bracket 1000'.

The opening 1074 may be formed between opposing extensions 1076 that extend towards an end portion 1078 of the middle channel 1074. The end portion 1078 may be spaced apart from the adjacent structure of the sliding portion 1040 by a gap 1079 (e.g., not connected to the upper slide 1042 and the lower slide 1044). The end portion 1078 may be configured to disengage the sliding portion 1040 and/or the translating portion 1020 from the stationary portion 1010. When the end portion 1078 is depressed by a user, the extensions 1076 may flex to allow the end portion 1078 to move into the inner channel 1016 of the stationary portion 1010 and allow the distal portion 1075 of the arm 1072 to disengage with the wall 1018 of the middle channel 1016, thus allowing the translating portion 1020 and the sliding portion 1040 to be disengaged from the stationary portion 1010 of the mounting bracket 1000'. For example, the user may depress the end portion 1078 to adjust the roller tube from the operating position to the extended position. The user may also depress the end portion 1078 to adjust the roller tube from the extended position to the operating position.

The mounting bracket 1000' may be used to mount the battery-powered motorized window treatment to the structure. For example, the stationary portion 1010 of the mounting bracket 1000' may be mounted to the structure. An idler bracket (e.g., the mounting bracket 631 shown in FIGS. 9A, 9B, the mounting bracket 1330 shown in FIG. 27B, 27C and/or the mounting bracket 1430 shown in FIGS. 28B-28D) may be mounted to the structure. An idler end of a roller tube (e.g., roller tube 110, 210, 310, 410, 510, 5510, 610, 1310, 1410) of the battery-powered motorized window treatment may be inserted into the idler bracket. The translating portion 1020 of the mounting bracket 1000' may be attached to a motor end of the roller tube. The sliding portion 1040 may be connected to the translating portion 1020. The sliding portion 1040 may be inserted into the stationary portion 1010 of the mounting bracket 1000' until the roller tube is in the operating position. For example, the roller tube may be pivoted as the idler end remains attached to the idler bracket to insert the sliding portion 1040 within the stationary portion 1010. Although mounting of the battery-powered motorized window treatment to the structure is described with respect to the mounting bracket 1000', it should be appreciated that the battery-powered motorized window treatment may be similarly mounted to the structure using any of the other mounting brackets (e.g., mounting brackets 130A, 130B, 230A, 330A, 430A, 530A, 5530A, 630, 700, 800, 900, 1000, 1100, 1200) described herein having a stationary portion, a sliding portion, and a translating portion.

It should be appreciated that the locking tab 1070 shown in FIG. 26A may also be used in any of the other mounting brackets shown and described herein (e.g., mounting brackets 130A, 130B, 230A, 330A, 430A, 530A, 5530A, 630, 700, 800, 900, 1000, 1100, 1200) having a stationary portion, a sliding portion, and a translating portion.

Figure 26B:
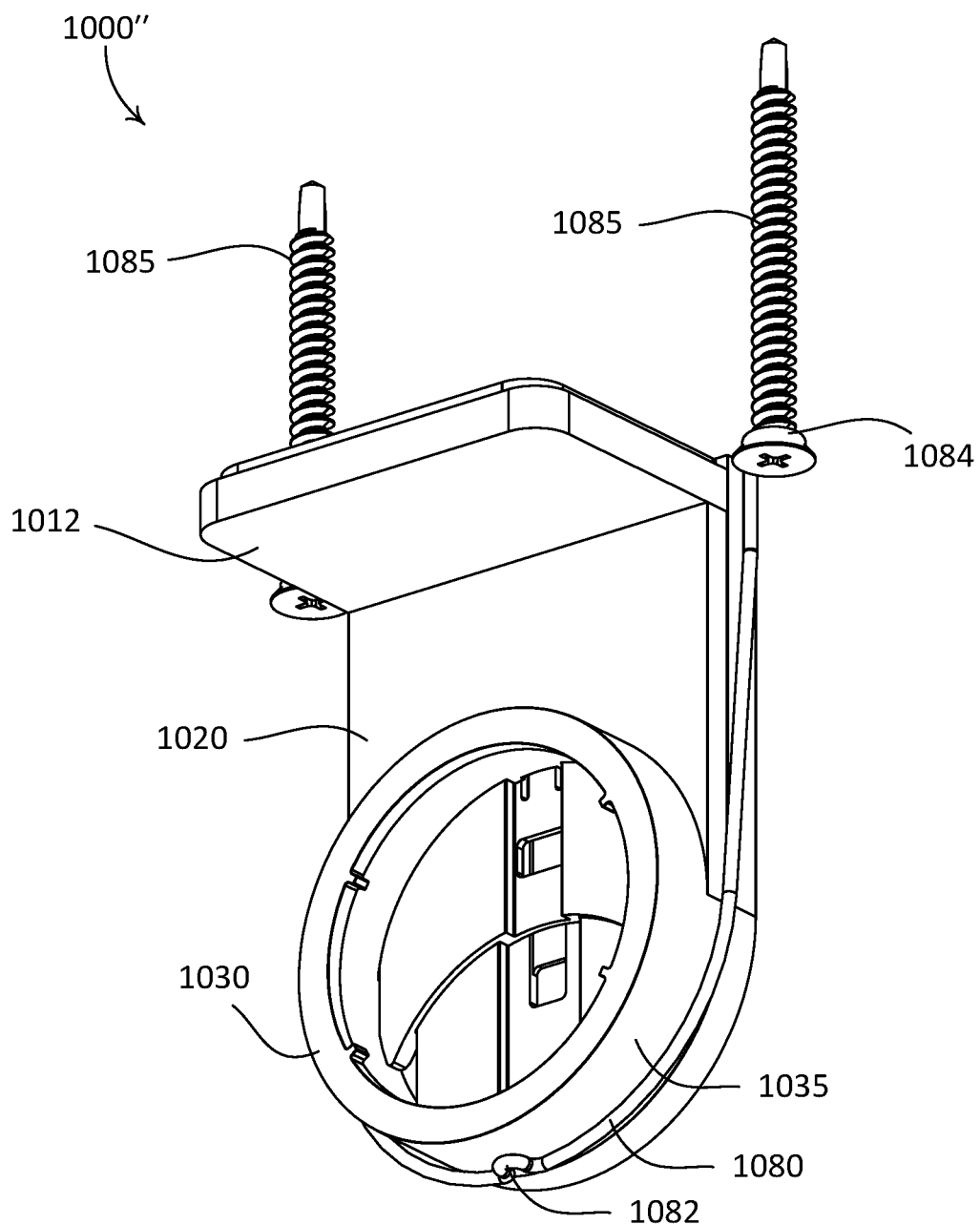
FIG. 26B is a front perspective view of another example mounting bracket for mounting a battery-powered motorized window treatment.
Figure 26C:
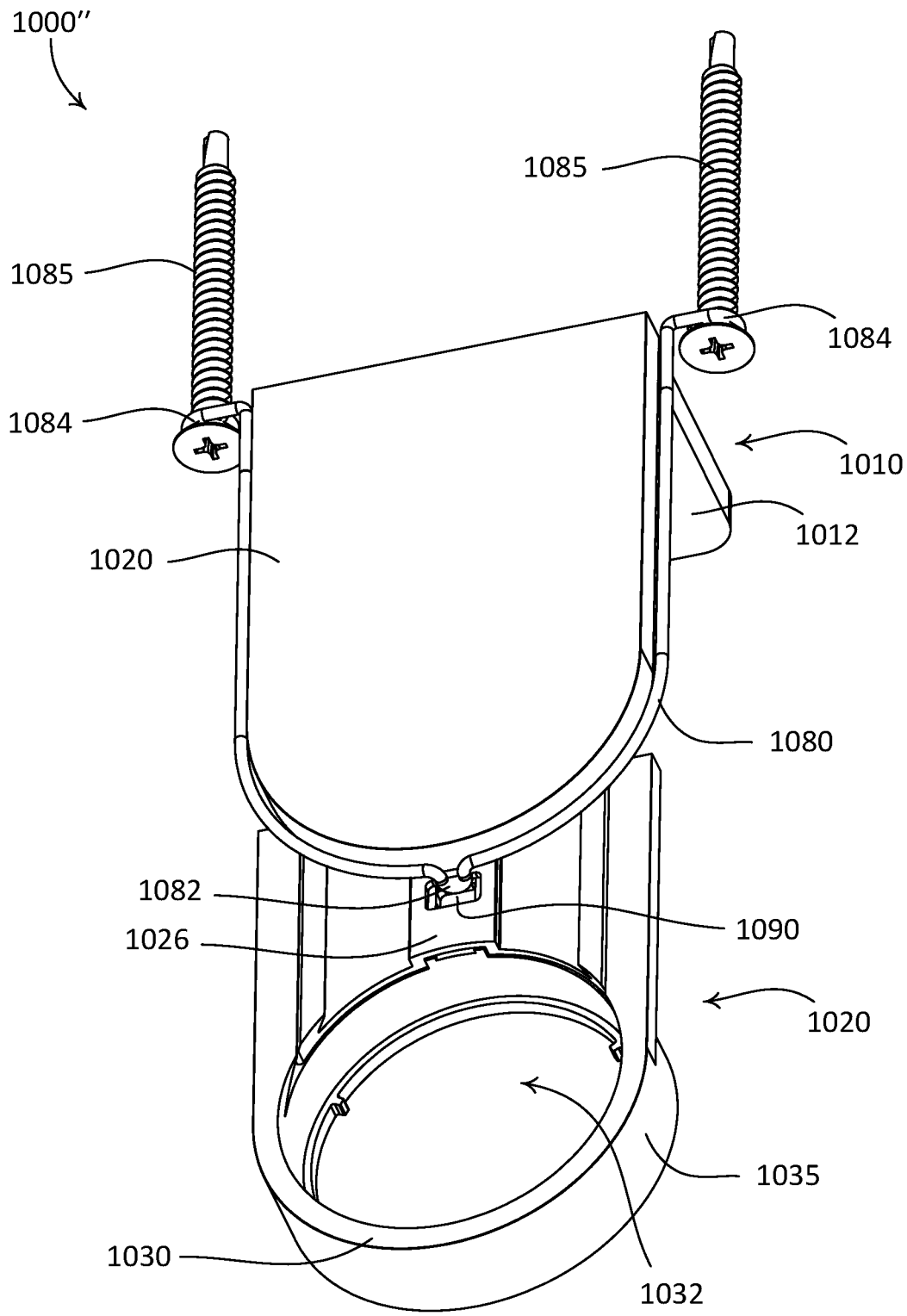
FIG. 26C is a front perspective view of the example mounting bracket shown in FIG. 26B in an extended position.

FIGS. 26B and 26C depict an example mounting bracket 1000" for use with a battery-powered motorized window treatment (e.g., such as the motorized window treatment 100 shown in FIGS. 1A and 1B, the battery-powered motorized window treatment 200 shown in FIGS. 2A and 2B, the battery-powered motorized window treatment 300 shown in FIGS. 3A and 3B, the battery-powered motorized window treatment 400 shown in FIGS. 4A and 4B, the battery-powered motorized window treatment 500 shown in FIG. 5A, the battery-powered motorized window treatment 5500 shown in FIG. 6, and/or the battery-powered motorized window treatment 600 shown in FIGS. 8A-11) in an operating position (e.g., shown in FIG. 26B) and an extended position (e.g., shown in FIG. 26C). The mounting bracket 1000" may be configured to be attached to a structure, e.g., such as a wall or other vertical surface (e.g., as shown in FIGS. 1A-7). The mounting bracket 1000" may be an alternate version of the mounting bracket 1000 shown in FIGS. 17A-19B, and may have many of the same features and elements.

The mounting bracket 1000" shown in FIG. 26A may comprise a strap 1080 that is configured to extend around the attachment member 1030. The strap 1080 may define a tab 1082 that is configured to secure the mounting bracket 1000" in the operating position and the extended position, respectively. The tab 1082 may be configured to abut the outer surface 1035 of the attachment member 1030 to secure the mounting bracket 1000" in the operating position. The strap 1080 may be a thin piece of metal and the tab 1082 may be formed by a small loop of the metal.

The attachment member 1030 may define a notch 1090 proximate to the aperture 1032. The notch 1090 may be located in the inner channel 1026 of the translating portion 1020. The tab 1082 may be configured to be received within the notch 1090 when the roller tube is in the extended position. The strap 1080 may be secured to the structure using fasteners 1085. The strap 1080 may define apertures 1084 at respective distal portions. The apertures 1084 may be configured to be on opposed sides of the base 1012 when the strap 1080 extends around the attachment member 1030. The fasteners 1085 may be configured to extend through the apertures 1084, for example, to secure the strap to the structure. The strap 1080 and the notch 1090 (e.g., rather than the first locking tab 1060 shown in FIGS. 18B, 19A, and 19B) may allow for releasable attachment of the stationary portion 1010 to the translating portion 1020, for example, via the notch 1090 and/or the outer surface 1035 of the attachment member 1030.

While the mounting brackets 130A, 130B, 230A, 230B, 330A, 330B, 430A, 430B, 530A, 530B, 5530A, 5530B, 630, 700, 800, 900, 1000, 1000', 1100, 1200 shown and described herein have circular front surfaces, the mounting brackets 130A, 130B, 230A, 230B, 330A, 330B, 430A, 430B, 530A, 530B, 5530A, 5530B, 630, 700, 800, 900, 1000, 1000', 1100, 1200 may also have differently-shaped front surfaces. For example, mounting brackets 130A, 130B, 230A, 230B, 330A, 330B, 430A, 430B, 530A, 530B, 5530A, 5530B, 630, 700, 800, 900, 1000, 1000', 1100, 1200 may have front surfaces of another shape, such as, for example, a rectangular shape, a square shape, a triangular shape, an oval shape, or any suitable shape. In addition, the side surfaces of the mounting brackets 130A, 130B, 230A, 230B, 330A, 330B, 430A, 430B, 530A, 530B, 5530A, 5530B, 630, 700, 800, 900, 1000, 1000', 1100, 1200 may have different shapes and may be planar or non-planar. Further, the surfaces of the mounting brackets 130A, 130B, 230A, 230B, 330A, 330B, 430A, 430B, 530A, 530B, 5530A, 5530B, 630, 700, 800, 900, 1000, 1000', 1100, 1200 may be characterized by various colors, finishes, designs, patterns, etc.

Although the mounting brackets 700, 800, 900, 1000, 1000', 1100, 1200 are shown in FIGS. 12A-26 and described herein with a stationary portion 710, 810, 910, 1010, 1110, 1210; a translating portion 720, 820, 920, 1020, 1120, 1220; and a sliding portion 740, 840, 940, 1040, 1140, 1240, it should be appreciated that the sliding portion 740, 840, 940, 1040, 1140 1240 may be omitted. For example, the translating portion 720, 820, 920, 1020, 1120, 1220 of the mounting brackets 700, 800, 900, 1000, 1100, 1200 may operably engage with a respective stationary portion 710, 810, 910, 1010, 1110, 1210 to operate the roller tube between an operating position and an extended position.

Figure 27A:
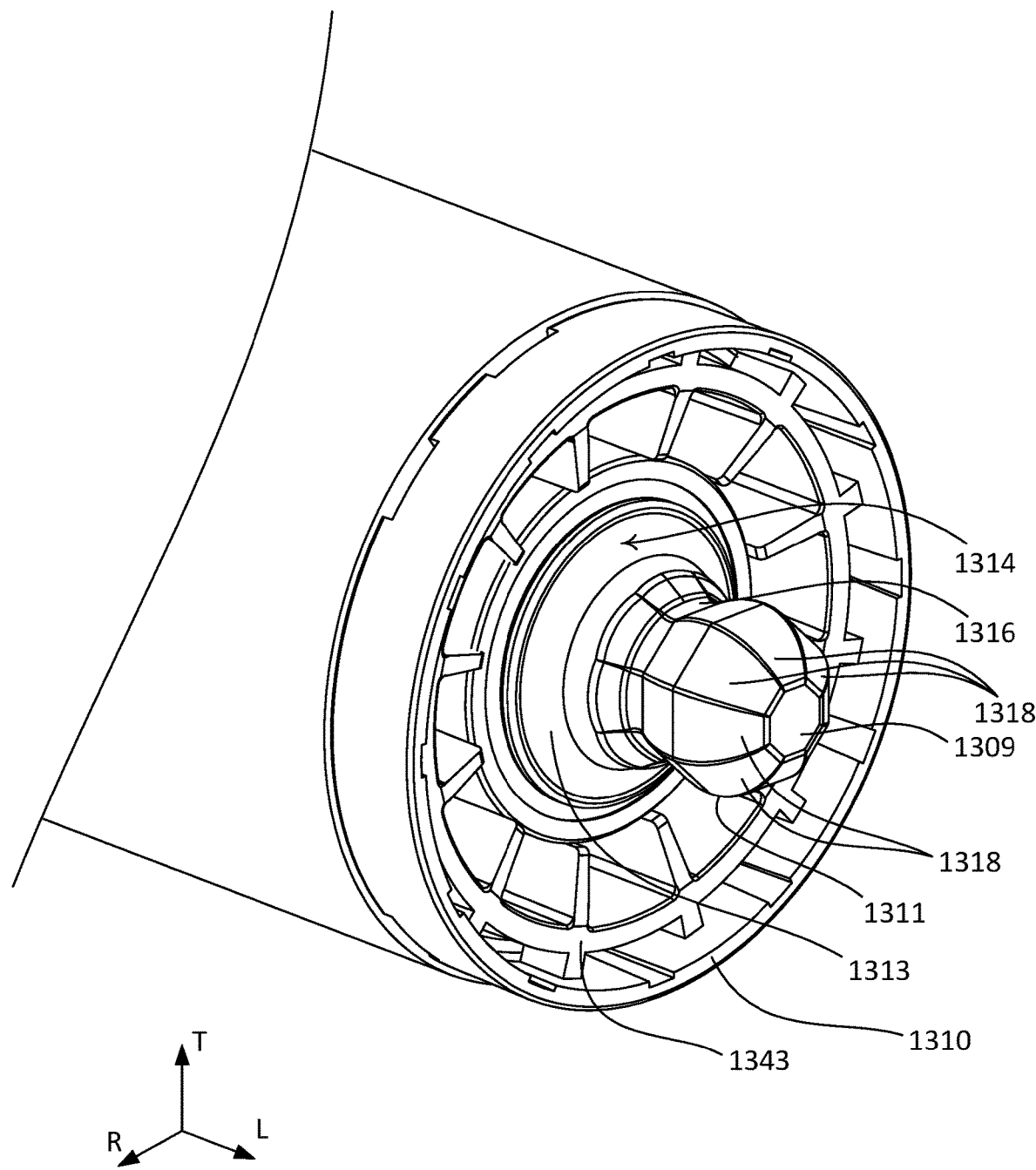
FIG. 27A is a front perspective view of an idler end of an example battery-powered motorized window treatment.
Figure 27B:
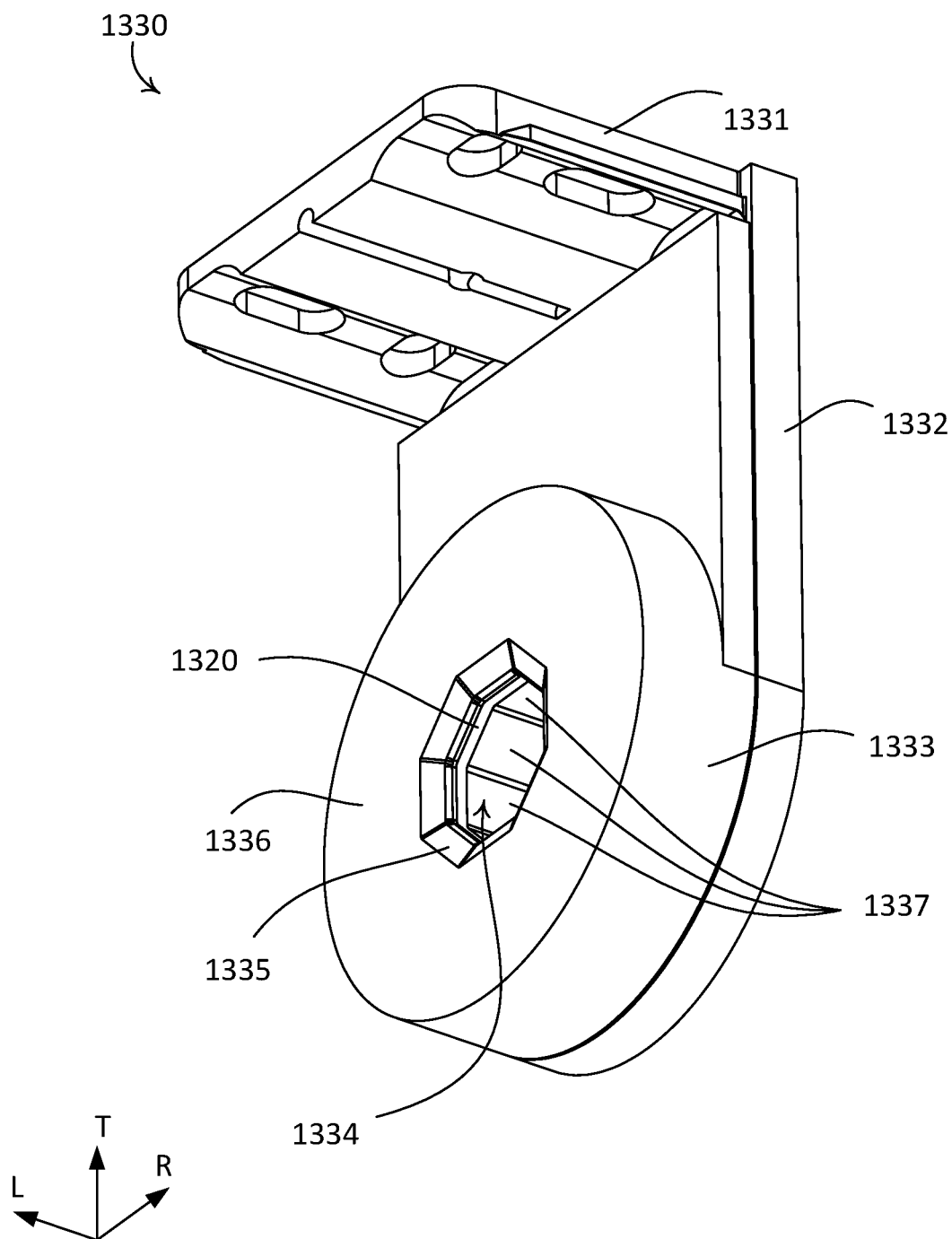
FIG. 27B is a front perspective view of another example mounting bracket for use with the example battery-powered motorized window treatment shown in FIG. 27A.
Figure 27C:
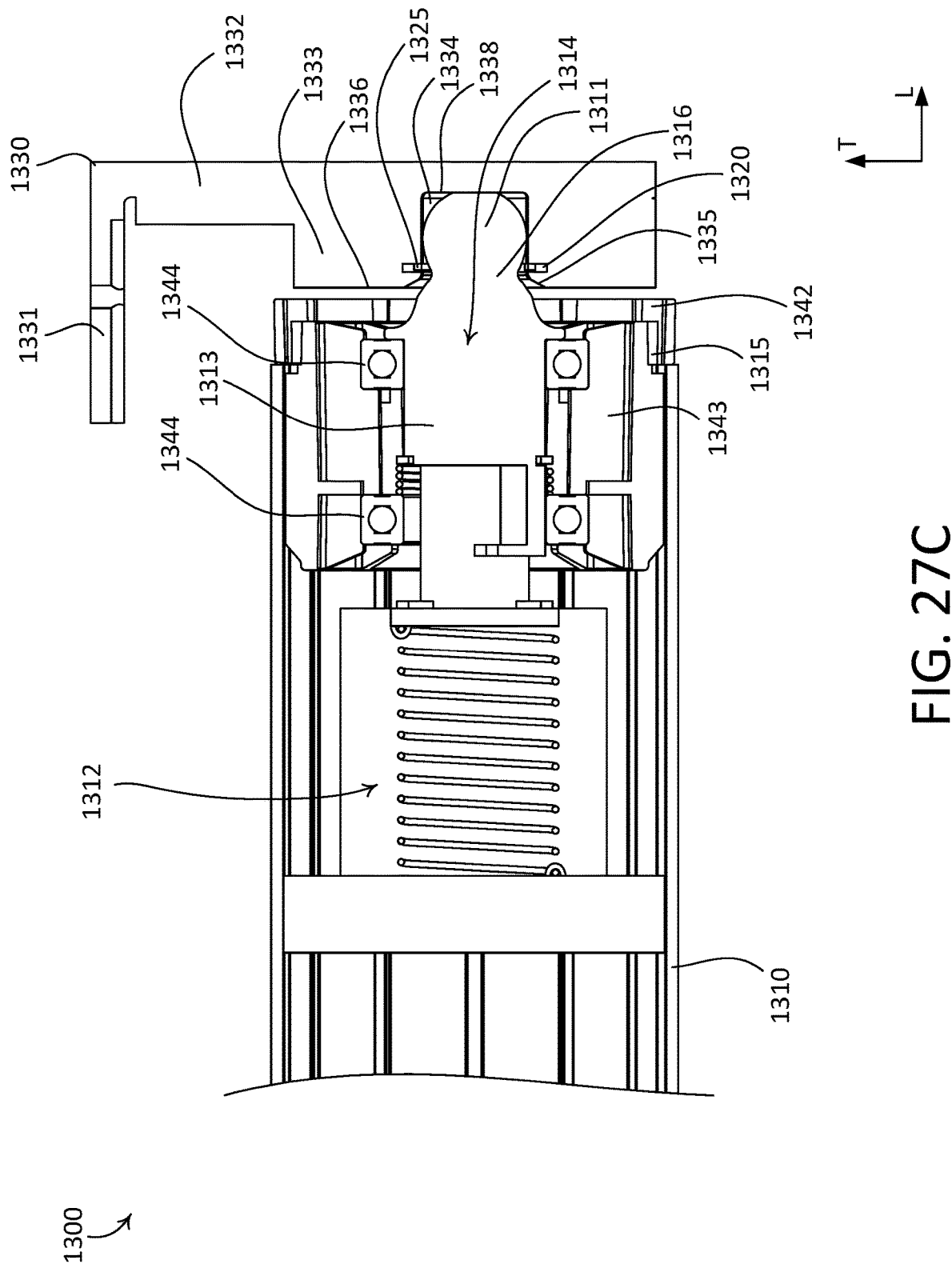
FIG. 27C is a front cross-section view of the idler end of the example battery-powered motorized window treatment shown in FIG. 27A.

FIGS. 27A-27C depict another example idler end of an example motorized window treatment 1300 (e.g., such as the battery-powered motorized window treatment 100 shown in FIGS. 1A and 1B, the battery-powered motorized window treatment 200 shown in FIGS. 2A and 2B, the battery-powered motorized window treatment 300 shown in FIGS. 3A and 3B, the battery-powered motorized window treatment 400 shown in FIGS. 4A and 4B, the battery-powered motorized window treatment 500 shown in FIG. 5A, the battery-powered motorized window treatment 5500 shown in FIG. 6, and/or the battery-powered motorized window treatment 600 shown in FIGS. 8A-11). FIG. 27A is a perspective view of the idler end of a roller tube 1310 of the battery-powered motorized window treatment 1300. FIG. 27B is a perspective view of an example mounting bracket 1330 configured to receive the idler end of the roller tube 1310 shown in FIG. 27A. FIG. 27C is a front cross-section view of the idler end of the example battery-powered motorized window treatment 1300. The mounting bracket 1330 may be configured (e.g., with one or more other mounting brackets) to attach the battery-powered motorized window treatment 1300 to a structure. For example, mounting bracket 1300 may be configured to be attached to a wall or other vertical structure (e.g., as shown in FIGS. 1A-7), and/or may be configured to be attached to a ceiling, a head jamb of a window frame, or other horizontal structure (e.g., as shown in FIGS. 8A, 8B, and 9).

The mounting bracket 1300 may be configured to secure, without requiring a tool, the roller tube 1310 in a first direction parallel to a longitudinal axis (e.g., the longitudinal direction L), in a second direction that is parallel to the structure and perpendicular to the longitudinal axis (e.g., the transverse direction T), and in a third direction perpendicular to the structure and the longitudinal axis (e.g., the radial direction R). The mounting bracket 1330 may define a base 1331 (e.g., a foot), an arm 1332. The arm 1332 may include an attachment member 1333 that is configured to receive the idler end of the roller tube 1310. The arm 1332 (e.g., the attachment member 1333) of the mounting bracket 1330 may define a cavity 1334.

The base 1331 may be configured to attach the mounting bracket 1330 to the structure. The structure may include a window frame (e.g., a head jamb or side jambs of a window frame), a wall, a ceiling, or other structure, such that the battery-powered motorized window treatment 1300 is mounted proximate to an opening (e.g., over the opening or in the opening), such as a window for example. When the mounting bracket 1330 is attached to a vertical structure, such as a wall, the arm 1332 of the mounting bracket 1330 may extend horizontally (e.g., in the radial direction R) from the base 1331. When the mounting bracket 1330 is attached to a horizontal structure, such as a ceiling, the arm 1332 of the mounting bracket 1330 may extend vertically (e.g., in the transverse direction T) from the base 1331. A base cover (e.g., such as the base cover 916 shown in FIG. 16) may be configured to be detachably mounted over the base 1331 of the mounting bracket 1330. The base cover may be configured to cover and/or conceal the base 1331.

The battery-powered motorized window treatment 1300 may include an idler shaft 1314 and an idler coupler 1343. The idler shaft 1314 may be configured to support the idler end of the battery-powered motorized window treatment 1300. The idler shaft 1314 may define an idler base 1311 and an idler arm 1313. The idler shaft 1314 may be received by the roller tube 1310. For example, the idler arm 1313 may extend within the roller tube 1310. For example, the idler arm 1313 may be configured to be received within a cavity 1315 of the roller tube 1310. The cavity 1315 at the idler end of the battery-powered motorized window treatment 1300 may be covered by a cover 1342. The idler shaft 1314 (e.g., the idler arm 1313) may extend through the cover 1342. The idler shaft 1314 (e.g., the idler base 1311) may be received (e.g., captively received) by the cavity 1334 in the mounting bracket 1330.

The idler shaft 1314 may define a tapered portion 1316 between the idler arm 1313 and the idler base 1311. The tapered portion 1316 may have a diameter that is less than a diameter of the idler base 1311 and a diameter of the idler arm 1313. The tapered portion 1316 may be configured to enable the battery-powered motorized window treatment 1300 to be pivoted to the pivoted position. For example, the cavity 1334 may define a chamfered portion 1335. The chamfered portion 1335 may define a chamfered edge proximate to (e.g., at) an inner surface 1336 of the attachment member 1333. The chamfered portion 1335 may be configured to provide clearance (e.g., approximately 10 degrees) for the idler shaft 1314 as the battery-powered motorized window treatment 1300 is operated between the pivoted position and the operating position. For example, the chamfered portion 1335 may be configured to prevent the idler shaft 1314 from contacting the attachment member 1333 of the mounting bracket 1330 when the battery-powered motorized window treatment 1300 is in the pivoted position. The cavity 1330 (e.g., the chamfered portion 1335) may be configured to guide the idler base 1311 into the cavity 1334. It should be appreciated that the chamfered portion 1335 may be alternatively shaped. For example, the chamfered portion 1335 may be beveled, filleted, and/or the like.

The idler base 1311 may define a polygon-shaped (e.g., octagonal-shaped) ball with a plurality of faces 1318. Each of the plurality of faces 1318 may be curved along the longitudinal direction L, for example, to provide angular compliance between the idler shaft 1314 and the mounting bracket 1330. For example, the idler base 1311 may enable angular misalignment with the cavity 1334 in the transverse direction T and/or the radial direction R. The cavity 1334 may define a polygon-shaped (e.g., octagonal-shaped) cross-section with a plurality of walls 1337. Each of the plurality of walls 1337 may define a side of the polygon formed by the cross section of the cavity 1334. Each of the plurality of walls 1337 may correspond to adjacent faces of the idler base 1311. Each of the plurality of faces 1318 may be identical (e.g., have the same dimensions). When the idler base 1311 is fully inserted into the cavity 1334, two of the faces 1318 may be aligned with (e.g., substantially parallel to) and abut the walls 1337 of the cavity 1334. Abutment of two or more of the faces 1318 against respective walls 1337 of the cavity 1334 may prevent rotation of the idler base 1311 as the roller tube 1310 rotates. The idler base 1311 and the cavity 1334 may define a ball joint. The chamfered portion 1335 may define sections that correspond to the plurality of walls 1337. For example, the chamfered portion 1335 may define a plurality of evenly shaped sections that correspond to the plurality of walls 1337. It should be appreciated that although the chamfered portion 1335 is shown separated into sections in FIG. 27A, the chamfered portion 1335 may alternatively be configured as a continuous chamfer about the cavity 1334.

The idler base 1311 may define a pivot surface 1309 located distal from the idler arm 1313. The pivot surface 1309 may be proximate to the inner wall 1336 of the cavity 1334 when the idler end of the roller tube 1310 is supported by the mounting bracket 1330. The pivot surface 1309 may be flat or curved to enable the roller tube 1310 to pivot about its idler end between the operating position and the pivoted position. The pivot surface 1309 may be configured to abut an inner wall 1338 of the cavity 1334, for example, when the roller idler base 1311 is fully inserted into the cavity 1334. The idler base 1311 and the cavity 1330 may be configured to enable a predetermined tolerance (e.g., angular misalignment tolerance) between the roller tube 1310 and the mounting bracket 1330, for example, when the roller tube 1310 is in a pivoted position.

The mounting bracket 1330 may define a slot 1320 that is configured to receive a retaining clip 1325. The slot 1320 may be located within the cavity 1334, for example, between the chamfered portion 1335 and the inner wall 1336 of the cavity 1330. The slot 1320 may extend from the cavity 1330 into the mounting bracket 1330 in a direction along a plane defined by the transverse direction T and the radial direction R (e.g., wherein the longitudinal axis is normal to the plane defined by the transverse direction T and the radial direction R). The retaining clip 1325 may be configured to secure the idler base 1311 within the cavity 1334 (e.g., retain and prevent accidental disengagement of the roller tube 1310 from the mounting bracket 1300). For example, the retaining clip 1325 may couple the idler base 1311 to the mounting bracket 1330. The retaining clip 1325 may be configured to abut the idler base 1311, for example, to prevent unmounting of the idler base 1311 from the mounting bracket 1330. Stated differently, the retaining clip 1325 may be configured to prevent unmounting of the roller tube 1310 from the mounting bracket 1330, for example, in the longitudinal direction, L. For example, the retaining clip 1325 may be placed within the slot 1320 before the idler base 1311 is moved within the cavity 1334. The retaining clip 1325 may be configured to extend radially as the idler base 1311 is pressed into the cavity 1334. The retaining clip 1325 may return to its normal shape when the idler base 1311 is fully installed within the cavity 1334. For example, the retaining clip 1325 may flex to accept the idler base 1311 and provide positive feedback (e.g., to an installer) that the idler base 1311 is fully installed within the cavity 1334.

The idler shaft 1314 may remain stationary as the roller tube 1310 rotates. The battery-powered motorized window treatment 1300 may include idler bearings 1344. The idler bearings 1344 may be configured to support the roller tube 1310 while enabling the roller tube 1310 to rotate about the idler shaft 1314. The idler bearings 1344 may be roller bearings (e.g., such as ball bearings, cylindrical bearings, and/or the like). The idler coupler 1343 may be configured to operatively couple the roller tube 1310 to the idler bearings 1344. For example, the idler coupler 1343 may be configured to engage (e.g., mesh with) the roller tube 1310 such that the idler coupler 1343 rotates with the roller tube 1310. The idler coupler 1343 may be configured to transfer the weight of the roller tube 1310 to the idler shaft 1314. The idler shaft 1314 may be configured to transfer the weight of the roller tube 1310 to the mounting bracket 1331.

The mounting bracket 1330 may be configured as an end bracket (e.g., as shown) that receives a single roller tube. Alternatively, the mounting bracket 1330 may be configured as a center bracket that receives two roller tubes. Although the mounting bracket 1330 is shown as accepting a roller tube from one side of the arm 1332, it should be appreciated that the mounting bracket 1330 may be configured to accept one roller tube at a first side of the arm 1332 and another roller tube at an opposed second side of the arm 1332.

While the mounting bracket 1330 shown and described herein has a circular profile and attachment member 1333, the mounting bracket 1330 may also have a differently-shaped profile and/or attachment member. For example, the mounting bracket 1330 may have a profile and/or attachment member of another shape, such as, for example, a rectangular shape, a square shape, a triangular shape, an oval shape, or any suitable shape. In addition, the side surfaces of the mounting bracket 1330 may have different shapes and may be planar or non-planar. Further, the surfaces of the mounting bracket 1330 may be characterized by various colors, finishes, designs, patterns, etc.

Figure 28A:
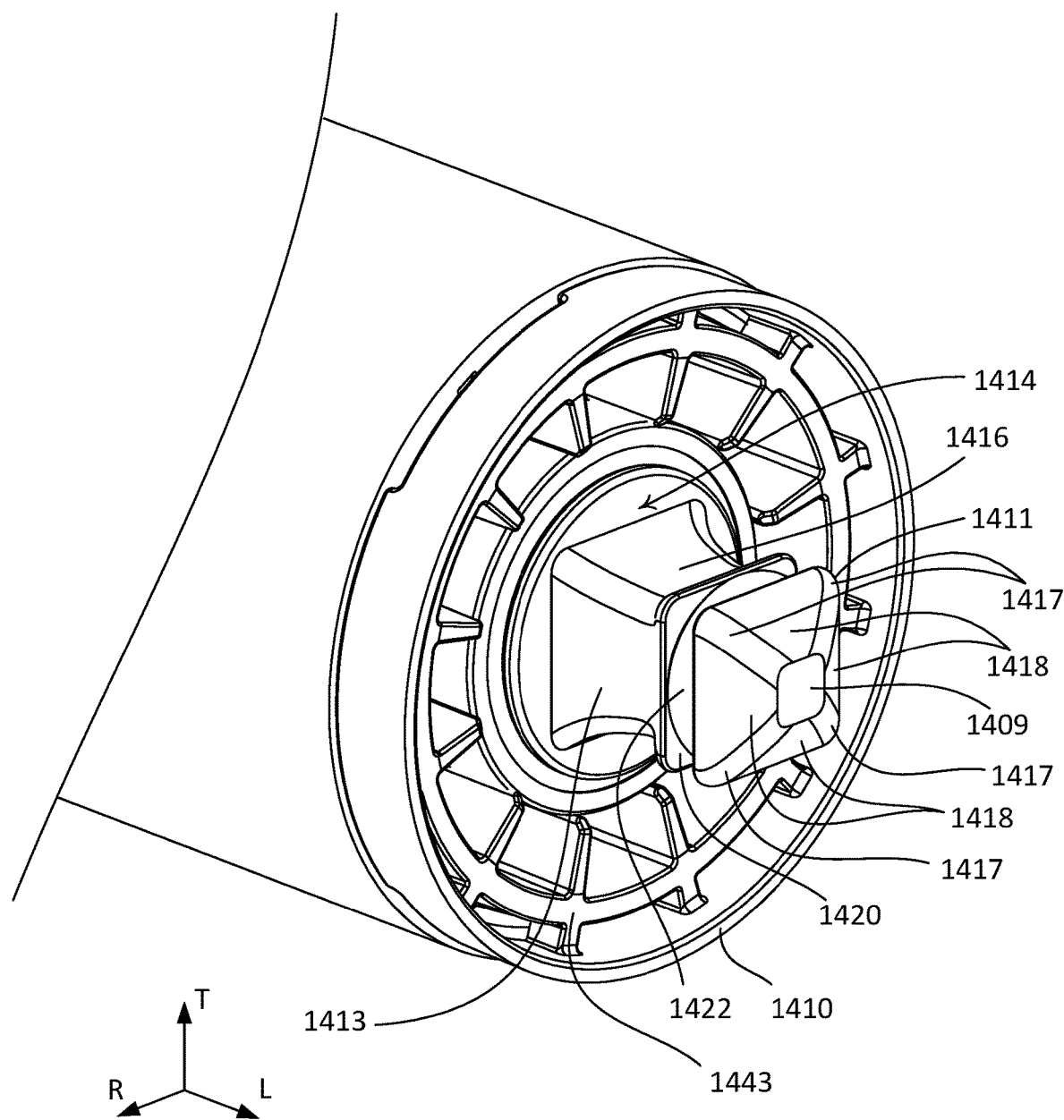
FIG. 28A is a front perspective view of an idler end of an example battery-powered motorized window treatment.
Figure 28B:
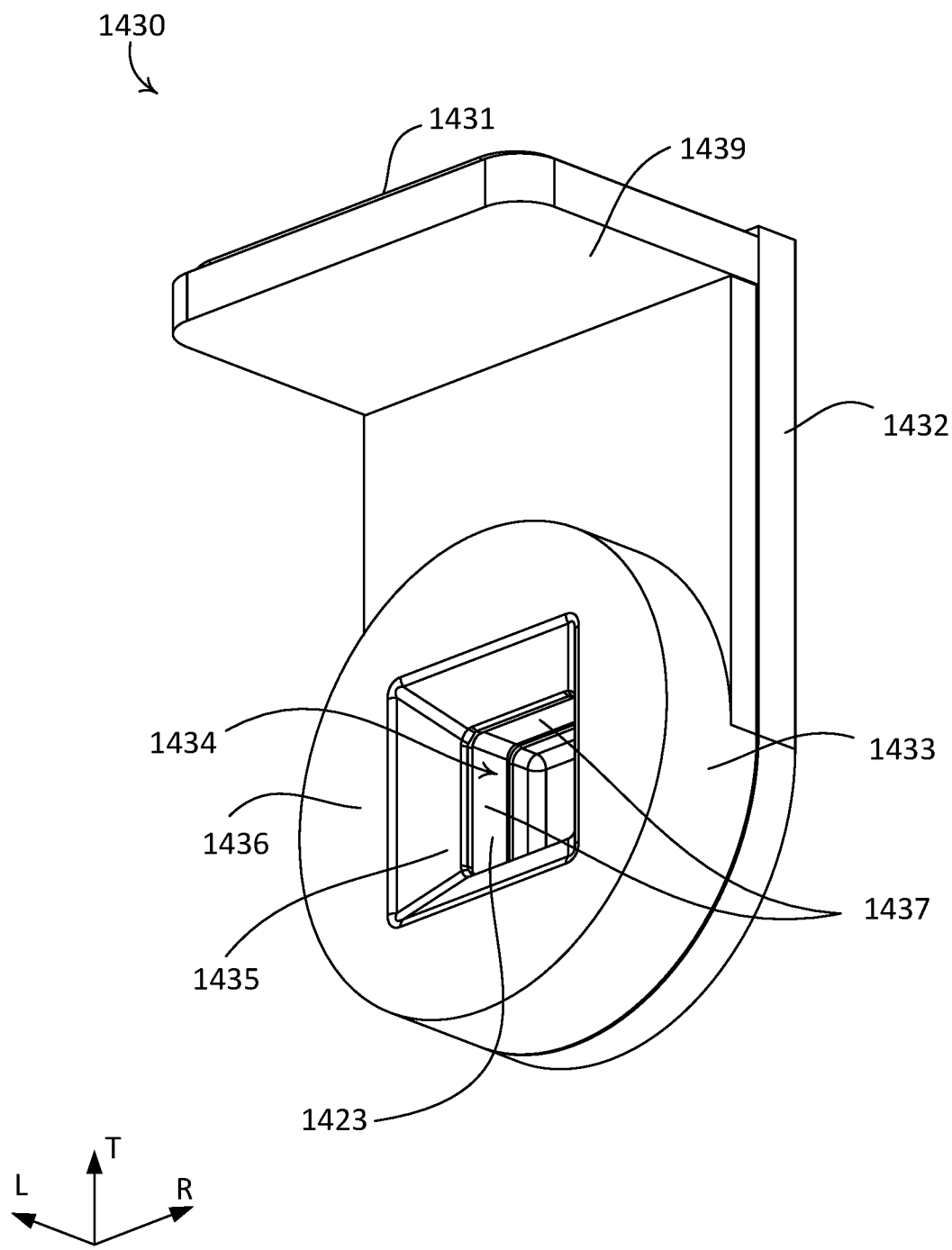
FIG. 28B is a front perspective view of another example mounting bracket for use with the example battery-powered motorized window treatment shown in FIG. 28A.
Figure 28C:
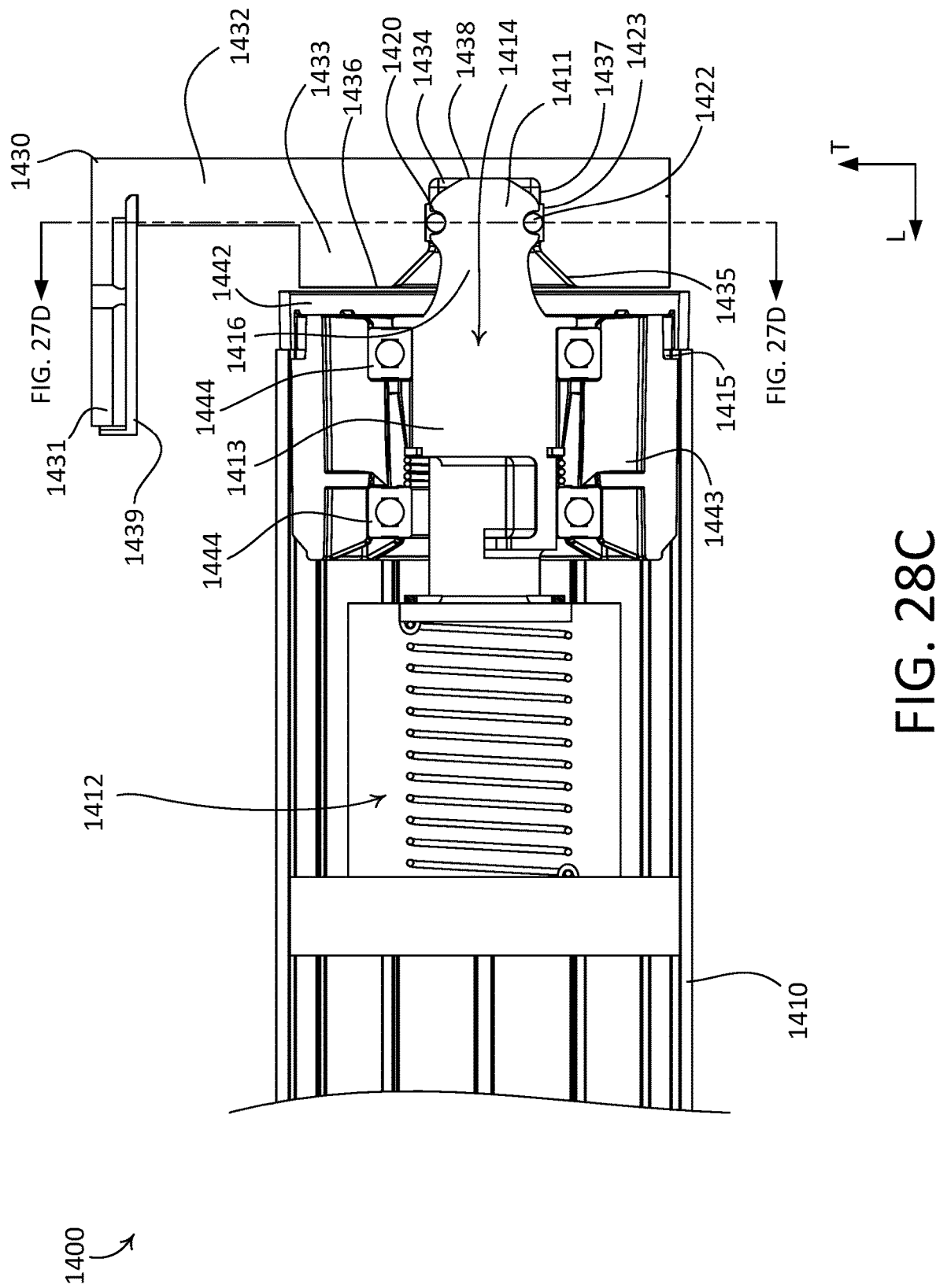
FIG. 28C is a front cross-section view of the idler end of the example battery-powered motorized window treatment shown in FIG. 28A.

It should be appreciated that the retaining clip 1325 may be a retaining ring (e.g., such as the retaining ring 1422 shown in FIGS. 28A and 28C). For example, the retaining clip 1325 may comprise an o-ring and may have a circular-shaped cross-section. The retaining clip 1325 may be placed within the slot 1320 before the idler base 1311 is moved within the cavity 1334. The retaining clip 1325 may be configured to be deformed as the idler base 1311 is pressed into the cavity 1334. The retaining clip 1325 may return to its normal shape when the idler base 1311 is fully installed within the cavity 1334 and may prevent the unmounting of the roller tube 1310 from the mounting bracket 1330.

FIGS. 28A-28D depict another example idler end of an example motorized window treatment 1400 (e.g., such as the battery-powered motorized window treatment 100 shown in FIGS. 1A and 1B, the battery-powered motorized window treatment 200 shown in FIGS. 2A and 2B, the battery-powered motorized window treatment 300 shown in FIGS. 3A and 3B, the battery-powered motorized window treatment 400 shown in FIGS. 4A and 4B, the battery-powered motorized window treatment 500 shown in FIG. 5A, the battery-powered motorized window treatment 5500 shown in FIG. 6, and/or the battery-powered motorized window treatment 600 shown in FIGS. 8A-11). FIG. 28A is a perspective view of the idler end of a roller tube 1410 of the battery-powered motorized window treatment 1400. FIG. 28B is a perspective view of an example mounting bracket 1430 configured to receive the idler end of the roller tube 1410 shown in FIG. 28A. FIG. 28C is a front cross-section view of the idler end of the example battery-powered motorized window treatment 1400. The mounting bracket 1430 may be configured (e.g., with one or more other mounting brackets) to attach the battery-powered motorized window treatment 1400 to a structure. For example, mounting bracket 1400 may be configured to be attached to a wall or other vertical structure (e.g., as shown in FIGS. 1A-7), and/or may be configured to be attached to a ceiling, a head jamb of a window frame, or other horizontal structure (e.g., as shown in FIGS. 8A, 8B, and 9).

The mounting bracket 1400 may be configured to secure, without requiring a tool, a roller tube in a first direction parallel to a longitudinal axis (e.g., the longitudinal direction L), in a second direction that is parallel to the structure and perpendicular to the longitudinal axis (e.g., the transverse direction T), and in a third direction perpendicular to the structure and the longitudinal axis (e.g., the radial direction R). The mounting bracket 1430 may define a base 1431 (e.g., a foot), an arm 1432. The arm 1432 may include an attachment member 1433 that is configured to receive the idler end of the roller tube 1410. The arm 1432 (e.g., the attachment member 1433) of the mounting bracket 1430 may define a cavity 1434.

The base 1431 may be configured to attach the mounting bracket 1430 to the structure. The structure may include a window frame (e.g., a head jamb or side jambs of a window frame), a wall, a ceiling, or other structure, such that the battery-powered motorized window treatment 1400 is mounted proximate to an opening (e.g., over the opening or in the opening), such as a window for example. When the mounting bracket 1430 is attached to a vertical structure, such as a wall, the arm 1432 of the mounting bracket 1430 may extend horizontally (e.g., in the radial direction R) from the base 1431. When the mounting bracket 1430 is attached to a horizontal structure, such as a ceiling, the arm 1432 of the mounting bracket 1430 may extend vertically (e.g., in the transverse direction T) from the base 1431. A base cover 1439 may be configured to be detachably mounted over the base 1431 of the mounting bracket 1430. The base cover may be configured to cover and/or conceal the base 1431.

The battery-powered motorized window treatment 1400 may include an idler shaft 1414 and an idler coupler 1443. The idler shaft 1414 may be configured to support the idler end of the battery-powered motorized window treatment 1400. The idler shaft 1414 may define an idler base 1411 and an idler arm 1413. The idler shaft 1414 may be received by the roller tube 1410. For example, the idler arm 1413 may extend within the roller tube 1410. For example, the idler arm 1413 may be configured to be received within a cavity 1415 of the roller tube 1410. The cavity 1415 at the idler end of the battery-powered motorized window treatment 1400 may be covered by a cover 1442. The idler shaft 1414 (e.g., the idler arm 1413) may extend through the cover 1442. The idler shaft 1414 (e.g., the idler base 1411) may be received (e.g., captively received) by the cavity 1434 in the mounting bracket 1430.

The idler shaft 1414 may define a tapered portion 1416 between the idler arm 1413 and the idler base 1411. The tapered portion 1416 may have a diameter that is less than a diameter of the idler base 1411 and a diameter of the idler arm 1413. The tapered portion 1416 may be configured to enable the battery-powered motorized window treatment 1400 to be pivoted to the pivoted position. For example, the cavity 1434 may define a chamfered portion 1435. The chamfered portion 1435 may define a chamfered edge proximate to (e.g., at) an inner surface 1436 of the attachment member 1433. The chamfered portion 1435 may be configured to provide clearance (e.g., approximately 10 degrees) for the idler shaft 1414 as the battery-powered motorized window treatment 1400 is operated between the pivoted position and the operating position. For example, the chamfered portion 1435 may be configured to prevent the idler shaft 1414 from contacting the attachment member 1433 of the mounting bracket 1430 when the battery-powered motorized window treatment 1400 is in the pivoted position. The cavity 1430 (e.g., the chamfered portion 1435) may be configured to guide the idler base 1411 into the cavity 1434. It should be appreciated that the chamfered portion 1435 may be alternatively shaped. For example, the chamfered portion 1435 may be beveled, filleted, and/or the like.

The idler base 1411 may define a polygon-shaped (e.g., square-shaped) with a plurality of faces 1418 (e.g., four). The idler base 1411 may define radius edges 1417 between each of the plurality of faces 1418. Each of the plurality of faces 1418 may be curved, for example, to provide angular compliance between the idler shaft 1414 and the mounting bracket 1430. For example, the idler base 1411 may enable angular misalignment with the cavity 1434 in the transverse direction T and/or the radial direction R. The cavity 1434 may define a polygon-shaped (e.g., square-shaped) cross-section with a plurality of walls 1437. Each of the plurality of walls 1437 may define a side of the polygon formed by the cross section of the cavity 1434. Each of the plurality of walls 1437 may correspond to adjacent faces of the idler base 1411. Each of the plurality of faces 1418 may be identical (e.g., have the same dimensions). When the idler base 1411 is fully inserted into the cavity 1434, two of the faces 1418 may be aligned with (e.g., substantially parallel to) and abut the walls 1437 of the cavity 1434. The idler base 1411 and the cavity 1434 may define a ball joint. The chamfered portion 1435 may define sections that correspond to the plurality of walls 1437. For example, the chamfered portion 1435 may define a plurality of evenly shaped sections that correspond to the plurality of walls 1437. It should be appreciated that although the chamfered portion 1435 is shown separated into sections in FIG. 28A, the chamfered portion 1435 may alternatively be configured as a continuous chamfer about the cavity 1434.

The idler base 1411 may define a pivot surface 1409 located distal from the idler arm 1413. The pivot surface 1409 may be proximate to the inner wall 1436 of the cavity 1434 when the idler end of the roller tube 1410 is supported by the mounting bracket 1430. The pivot surface 1409 may be configured to abut an inner wall 1438 of the cavity 1434, for example, when the roller idler base 1411 is fully inserted into the cavity 1434. The idler base 1411 and the cavity 1430 may be configured to enable a predetermined tolerance (e.g., angular misalignment tolerance) between the roller tube 1410 and the mounting bracket 1430, for example, when the roller tube 1410 is in a pivoted position.

Figure 28D:
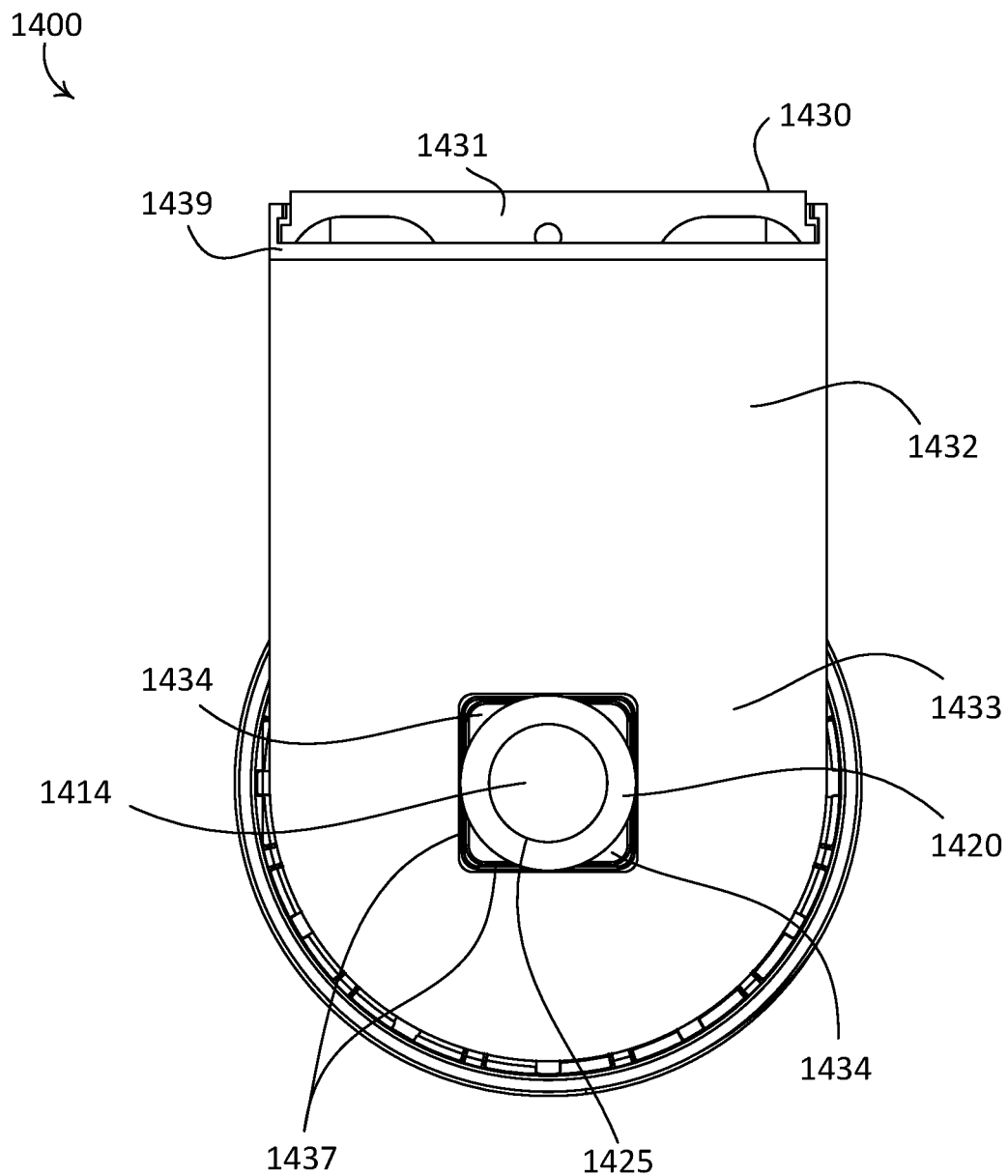
FIG. 28D is a right-side cross-section view of the idler end of the example battery-powered motorized window treatment shown in FIG. 28A.

The idler shaft 1414 may define a groove 1420 that is configured to receive a retaining ring 1422. The groove 1420 may be located within the idler base 1411, for example, between the tapered portion 1416 and the pivot surface 1409. The groove 1420 may extend in a plane defined by the transverse direction T and the radial direction R (e.g., wherein the longitudinal axis is normal to the plane defined by the transverse direction T and the radial direction R). The retaining ring 1422 may be configured to secure the idler base 1411 within the cavity 1434 (e.g., retain and prevent accidental disengagement of the roller tube 1410 from the mounting bracket 1400). For example, the retaining ring 1422 may couple the idler base 1411 to the mounting bracket 1430. The retaining ring 1422 may be configured to abut the idler base 1411, for example, to prevent unmounting of the idler base 1411 from the mounting bracket 1430. Stated differently, the retaining ring 1422 may be configured to prevent unmounting of the roller tube 1410 from the mounting bracket 1430, for example, in the longitudinal direction, L. For example, the retaining ring 1422 may comprise an o-ring. The retaining ring 1422 may have a circular-shaped cross-section as shown in FIG. 28C. It should be appreciated that the retaining ring 1422 may have a differently shaped cross-section. For example, the retaining ring 1422 may have an x-shaped cross-section, a square cross-section, a u-shaped cross-section, etc. In addition, the retaining 1422 may be circular in a plane defined by the transverse direction T and the radial direction R, as shown in FIG. 28D. It should be appreciated that the retaining ring 1422 may have alternate shapes in the plane defined by the transverse direction T and the radial direction R. For example, the retaining ring may define an oval, a square, a polygon, etc. in the plane defined by the transverse direction T and the radial direction R. Moreover, the idler shaft 1414 and/or the cavity 1434 may define alternate cross sections (e.g., in a plane through the idler shaft 1414 and/or the cavity 1434 defined by the transverse direction T and the radial direction R) such that a different amount (e.g., more) of the retaining ring 1422 is deformed when the idler shaft 1414 is inserted into the mounting bracket 1430 when compared to the geometry shown in FIGS. 28A-28D for the idler shaft 1414 and the cavity 1434.

The retaining ring 1422 may be compressible and may be made from rubber (e.g., nitrile, neoprene, ethylene propylene diene monomer (EPDM), viton, etc.), polytetrafluoroethylene (PTFE), Silicone, and/or the like. The retaining ring 1422 may be placed within the groove 1420 before the idler base 1411 is moved within the cavity 1434. The retaining ring 1422 may be configured to be deformed as the idler base 1411 is pressed into the cavity 1434. The cavity 1434 may comprise a recess 1423 that extend around the perimeter of the cavity 1434. The retaining ring 1422 may be configured to be located in the recess 1423 of the cavity 1434 after the idler base 1411 is inserted into the cavity 1434. For example, the recess 1423 may be configured to partially receive the retaining ring 1422 when the idler base 1411 is received within the cavity 1434. The retaining ring 1422 may return to its normal shape when the idler base 1411 is fully installed within the cavity 1434. For example, while deforming to accept the idler base 1411, the retaining ring 1422 may provide positive feedback (e.g., to an installer) that the idler base 1411 is fully installed within the cavity 1434.

The idler shaft 1414 may remain stationary as the roller tube 1410 rotates. The battery-powered motorized window treatment 1400 may include idler bearings 1444. The idler bearings 1444 may be configured to support the roller tube 1410 while enabling the roller tube 1410 to rotate about the idler shaft 1414. The idler bearings 1444 may be roller bearings (e.g., such as ball bearings, cylindrical bearings, and/or the like). The idler coupler 1443 may be configured to operatively couple the roller tube 1410 to the idler bearings 1444. For example, the idler coupler 1443 may be configured to engage (e.g., mesh with) the roller tube 1410 such that the idler coupler 1443 rotates with the roller tube 1410. The idler coupler 1443 may be configured to transfer the weight of the roller tube 1410 to the idler shaft 1414. The idler shaft 1414 may be configured to transfer the weight of the roller tube 1410 to the mounting bracket 1430.

The roller tube 1410 may be rotated to set the pre-winding of a spring 1412 (e.g., such as the spring 617 of the spring assist assembly 616 shown in FIGS. 9A and 9B) of the battery-powered motorized window treatment 1400. The spring 1412 may be configured to be adjusted (e.g., pre-wound) at the installation site (e.g., when the roller tube 1410 is mounted to the mounting bracket(s) 1430). Pre-winding the spring 1412 may enable the spring 1412 to provide a constant torque on the roller tube 1410 during operation of the motor drive unit. Pre-winding the spring 1412 at the installation site may eliminate the need to pre-wind the spring 1412 during manufacturing (e.g., at the factory). Pre-winding the spring 1412 during manufacturing may result in pre-winding in the wrong direction, too many turns, and/or not enough turns for the application. Pre-winding the spring assist assembly 1412 during manufacturing may require a locking mechanism to hold the roller tube 1410 such that the pre-wound spring 1412 does not unwind. Pre-winding the spring 1412 at the installation site may allow for more precise pre-winding settings, eliminate factory pre-winding errors, and eliminate the need for a locking mechanism to hold the roller tube 1410 in place prior to installation.

The mounting bracket 1430 may be configured as an end bracket (e.g., as shown) that receives a single roller tube. Alternatively, the mounting bracket 1430 may be configured as a center bracket that receives two roller tubes. Although the mounting bracket 1430 is shown as accepting a roller tube from one side of the arm 1432, it should be appreciated that the mounting bracket 1430 may be configured to accept one roller tube at a first side of the arm 1432 and another roller tube at an opposed second side of the arm 1432.

While the mounting bracket 1430 shown and described herein has a circular profile and attachment member 1433, the mounting bracket 1430 may also have a differently-shaped profile and/or attachment member. For example, the mounting bracket 1430 may have a profile and/or attachment member of another shape, such as, for example, a rectangular shape, a square shape, a triangular shape, an oval shape, or any suitable shape. In addition, the side surfaces of the mounting bracket 1430 may have different shapes and may be planar or non-planar. Further, the surfaces of the mounting bracket 1430 may be characterized by various colors, finishes, designs, patterns, etc.

It should be appreciated that the retaining ring 1422 may be a retaining clip (e.g., such as the retaining clip 1325 shown in FIGS. 27A and 27C). For example, the retaining ring 1422 may be placed within the recess 1423 before the idler base 1411 is moved within the cavity 1434. The retaining ring 1422 may be configured to extend radially as the idler base 1411 is pressed into the cavity 1434. The retaining ring 1422 may return to its normal shape when the idler base 1411 is fully installed within the cavity 1434. Alternatively, the retaining ring 1422 may be extended radially and/or may be compressed between the idler base 1411 and the cavity 1434 when the idler base 1411 is fully installed within the cavity 1434. The retaining ring 1422 may be received within the groove 1420 when the idler base 1411 is fully installed within the cavity 1434. For example, the retaining ring 1422 may flex to accept the idler base 1411 and provide positive feedback (e.g., to an installer) that the idler base 1411 is fully installed within the cavity 1434.

FIG. 28 is a block diagram of an example motor drive unit 1500 (e.g., the motor drive unit 5590 shown in FIG. 6 and/or the motor drive unit 690 of the motorized window treatment 600 shown in FIGS. 8A, 8B, and 9) of a battery-powered motorized window treatment (e.g., such as the motorized window treatment 100 shown in FIGS. 1A, 1B, and 7, the battery-powered motorized window treatment 200 shown in FIGS. 2A and 2B, the battery-powered motorized window treatment 300 shown in FIGS. 3A and 3B, the battery-powered motorized window treatment 400 shown in FIGS. 6A and 6B, the battery-powered motorized window treatment 500 shown in FIG. 5A, the battery-powered motorized window treatment 5500 shown in FIG. 6, the battery-powered motorized window treatment 600 shown in FIGS. 8A-11, and/or the battery-powered motorized window treatment 1200 shown in FIGS. 17A and 17B). The motor drive unit 1500 may comprise a motor 1510 (e.g., a direct-current (DC) motor) that may be coupled for raising and lowering a covering material. For example, the motor 1510 may be coupled to a roller tube (e.g., roller tube 610 shown in FIGS. 8A and 9) of the motorized window treatment for rotating the roller tube for raising and lowering a flexible material (e.g., a shade fabric). The motor drive unit 1500 may comprise a load control circuit, such as a motor drive circuit 1520 (e.g., an H-bridge drive circuit) that may generate a pulse-width modulated (PWM) voltage $V_{PWM}$ for driving the motor 1510 (e.g., to move the covering material between a fully-open and fully-closed position). In addition, the control circuit 1530 may be configured to generate a direction signal for controlling the direction of rotation of the motor 1510.

The motor drive unit 1500 may comprise a control circuit 1530 for controlling the operation of the motor 1510. The control circuit 1530 may comprise, for example, a microprocessor, a programmable logic device (PLD), a microcontroller, an application specific integrated circuit (ASIC), a field-programmable gate array (FPGA), or any suitable processing device or control circuit. The control circuit 1530 may be configured to generate a drive signal $V_{DRV}$ for controlling the motor drive circuit 1520 to control the rotational speed of the motor 1510 (e.g. the motor drive circuit 1520 receives the drive signal $V_{DRV}$ and controls, for example, an H-bridge circuit with appropriate PWM signals in response to the drive signal). In examples, the drive signal $V_{DRV}$ may comprise a pulse-width modulated signal, and the rotational speed of the motor 1510 may be dependent upon a duty cycle of the pulse-width modulated signal. In examples, the control circuit 1530 may directly control the motor 1510 (e.g. in a configuration with no separate motor drive circuit 1520). For example, the control circuit may generate two PWM signals for controlling the duty cycle and the polarity (e.g. controlling the speed and direction) of the motor 1510. In addition, the control circuit 1530 may be configured to generate a direction signal $V_{DIR}$ for controlling the motor drive circuit 1520 to control the direction of rotation of the motor 1510. The control circuit 1530 may be configured to control the motor 1510 to adjust a present position $P_{PRES}$ of the covering material of the motorized window treatment between a fully-open position $P_{OPEN}$ and a fully-closed position $P_{CLOSED}$.

The motor drive unit 1500 may include a rotational sensing circuit 1540, e.g., a magnetic sensing circuit, such as a Hall effect sensor (HES) circuit, which may be configured to generate two signals $V_{S1}$, $V_{S2}$ (e.g., Hall effect sensor signals) that may indicate the rotational position and direction of rotation of the motor 1510. The rotational sensing circuit 1540 (e.g., HES circuit) may comprise two internal sensing circuits for generating the respective signals $V_{S1}$, $V_{S2}$ (e.g., HES signals) in response to a magnet that may be attached to a drive shaft of the motor 1510. The magnet may be a circular magnet having alternating north and south pole regions, for example. For example, the magnet may have two opposing north poles and two opposing south poles, such that each sensing circuit of the rotational sensing circuit 1540 is passed by two north poles and two south poles during a full rotation of the drive shaft of the motor 1510. Each sensing circuit of the rotational sensing circuit 1540 may drive the respective signal $V_{S1}$, $V_{S2}$ to a high state when the sensing circuit is near a north pole of the magnet and to a low state when the sensing circuit is near a south pole. The control circuit 1530 may be configured to determine that the motor 1510 is rotating in response to the signals $V_{S1}$, $V_{S2}$ generated by the rotational sensing circuit 1540. In addition, the control circuit 1530 may be configured to determine the rotational position and direction of rotation of the motor 1510 in response to the signals $V_{S1}$, $V_{S2}$.

The motor drive unit 1500 may include a communication circuit 1542 (e.g., such as the control interface printed circuit board 654 shown in FIGS. 8A and 8B) that may allow the control circuit 1530 to transmit and receive communication signals, e.g., wired communication signals and/or wireless communication signals, such as radio-frequency (RF) signals. For example, the motor drive unit 1500 may be configured to communicate messages (e.g., digital messages) with external control devices (e.g., other motor drive units) via the communication circuit 1542 and an antenna 1545 via wireless signals, such as RF signals. The communication circuit 1542 and/or the antenna 1545 may be communicatively coupled (e.g., electrically connected) to the control circuit 1530. The communication circuit 1542 may be disposed within a cap (e.g., such as the cap 150 shown in FIGS. 1B and 7, the cap 250 shown in FIGS. 2A and 2B, the cap 350 shown in FIGS. 3A and 3B, the cap 450 shown in FIGS. 4A and 4B, the cap 550 shown in FIG. 5A, and/or the cap 650 shown in FIGS. 8A and 8B) of the motor drive unit 1500. Additionally or alternatively, the communication circuit 1542 may be internal to a housing of the motor drive unit 1500. The motor drive unit 1500 may also, or alternatively, be coupled to an external RF communication circuit (e.g., located outside of the motor drive unit) for transmitting and/or receiving the RF signals.

The motor drive unit 1500 may communicate with one or more input devices, e.g., such as a remote control device, an occupancy sensor, a daylight sensor, and/or a shadow sensor. The remote control device, the occupancy sensor, the daylight sensor, and/or the shadow sensor may be wireless control devices (e.g., RF transmitters) configured to transmit messages to the motor drive unit 1500 via the RF signals. For example, the remote control device may be configured to transmit digital messages via the RF signals in response to an actuation of one or more buttons of the remote control device. The occupancy sensor may be configured to transmit messages via the RF signals in response to detection of occupancy and/or vacancy conditions in the space in which the motorized window treatment is installed. The daylight sensor may be configured to transmit digital messages via RF signals in response to a measured amount of light inside of the space in which the motorized window treatment is installed. The shadow sensor may be configured to transmit messages via the RF signals in response to detection of a glare condition outside the space in which the motorized window treatment is installed.

The motorized window treatment may be configured to control the covering material according to a timeclock schedule. The timeclock schedule may be stored in the memory. The timeclock schedule may be defined by a user (e.g., a system administrated through a programming mode). The timeclock schedule may include a number of timeclock events. The timeclock events may have an event time and a corresponding command or preset. The motorized window treatment may be configured to keep track of the present time and/or day. The motorized window treatment may transmit the appropriate command or preset at the respective event time of each timeclock event.

The motor drive unit 1500 may further comprise a user interface 1544 having one or more actuators (e.g., mechanical switches) that allow a user to provide inputs to the control circuit 1530 during setup and configuration of the motorized window treatment (e.g., in response to actuations of one or more buttons (e.g., the control button 152 shown in FIG. 1B). The control circuit 1530 may be configured to control the motor 1510 to control the movement of the covering material in response to a shade movement command received from the communication signals received via the communication circuit 1542 or the user inputs from the buttons of the user interface 1544. The control circuit 1530 may be configured to enable (e.g., via the control button 152 and/or the user interface 1544) a user to pair the motorized window treatment with a remote control device and/or other external devices to allow for wireless communication between the remote control device and/or other external devices and the communication circuit 1542 (e.g., an RF transceiver). The user interface 1544 (e.g., the control button 152) may be configured to provide a status indication to a user. For example, user interface 1544 (e.g. the control button 152) may be configured to flash and/or change colors to provide the status indication to the user. The status indication may indicate when the motorized window treatment is in a programming mode. The user interface 1544 may also comprise a visual display, e.g., one or more light-emitting diodes (LEDs), which may be illuminated by the control circuit 1530 to provide feedback to the user of the motorized window treatment system.

The motor drive unit 1500 may also comprise a position detect circuit 1546 for detecting when a roller tube of the motorized window treatment is not in the operating position. The position detect circuit 1546 may be located in a motor drive unit housing end (e.g., the first end 112 and/or the cap 150 shown in FIG. 1B) which may be attached to a mounting bracket (e.g., mounting brackets 130A, 130B, 230A, 330A, 430A, 530A, 5530A, 630, 700, 800, 900, 1000, 1100, 1200). For example, the position detect circuit 1546 may comprise a magnetic sensing circuit (e.g., a Hall-effect sensor circuit) configured to detect when the mounting bracket is in an extended position and the position detect circuit 1546 is not in close proximity to a magnet located inside of an arm (e.g., arms 632, 714, 814, 914, 1014, 1114, and/or front portion 1214) of the mounting bracket. The position detect circuit 1546 may be configured to generate a position detect signal $V_{POS}$, which may be received by the control circuit 1530. The control circuit 1530 may be configured to disable (e.g., automatically disable) the operation of the motor 1510 of the motor drive unit 1500 in response to the position detect signal $V_{POS}$, such that the covering material cannot be raised or lowered when the roller tube is not in an operating position (e.g., in the extended position). The control circuit 1530 may be configured to enable the operation of the motor 1510 in response to the position detect signal $V_{POS}$ when the roller tube is in the operating position.

The motor drive unit 1500 may comprise a memory (not shown) configured to store the present position $P_{PRES}$ of the covering material and/or the limits (e.g., the fully-open position $P_{OPEN}$ and the fully-closed position $P_{CLOSED}$), association information for associations with other devices and/or instructions for controlling the motorized window treatment. The memory may be implemented as an external integrated circuit (IC) or as an internal circuit of the control circuit 1530.

The motor drive unit 1500 may comprise a compartment 1564 (e.g., which may be an example of the battery compartment 211 of the window treatment 200 shown in FIGS. 2A and 2B) that is configured to receive a DC power source. In some examples, the compartment 1564 may be internal to the motor drive unit 1500. In other examples, the compartment 1564 may be external to the motor drive unit 1500. In the example shown in FIGS. 2A and 2B, the DC power source is one or more batteries 1560. In addition, alternate DC power sources, such as a solar cell (e.g., a photovoltaic cell), an ultrasonic energy source, and/or a radio-frequency (RF) energy source, may be coupled in parallel with the one or more batteries 1560, or in some examples be used as an alternative to the batteries 1560. The alternate DC power source may be used to perform the same and/or similar functions as the one or more batteries 1560. In this example, the compartment 1564 may be configured to receive one or more batteries 1560 (e.g. four "D" batteries), such as the batteries 260, 360, 460, 560, 5560 of FIGS. 2A, 2B, 3A, 3B, 4A, 4B, 5A, 6. The batteries 1560 may provide a battery voltage $V_{BATT}$ to the motor drive unit 1500.

The control circuit 1530 may be configured to determine when one or more of the batteries 1560 are not installed in the compartment 1564 when in the operating position. For example, the control circuit 1530 may be configured to determine that one or more of the batteries 1560 are missing when the magnitude of the battery voltage $V_{BATT}$ drops to approximately zero volts (e.g., there is an open circuit between the battery contacts). The control circuit 1530 may be configured to determine the magnitude of the battery voltage $V_{BATT}$ in response to a scaled battery voltage $V_{BATT-S}$ received via a scaling circuit 1566 (e.g., a resistive divider circuit). The scaling circuit 1566 may receive the battery voltage $V_{BATT}$ and may generate the scaled battery voltage $V_{BATT-S}$. The control circuit 1530 may be configured to disable (e.g., automatically disable) the operation of the motor 1510 of the motor drive unit 1500 in response to the scaled battery voltage $V_{BATT-S}$, such that the covering material cannot be raised or lowered when one or more of the batteries 1560 are not installed in the battery compartment 1564, which may prevent depletion of the intermediate storage element 1554. The control circuit 1530 may be configured to enable the operation of the motor 1510 in response to the scaled battery voltage $V_{BATT-S}$ when all of the batteries 1560 are installed.

The motor drive unit 1500 may comprise a filter circuit 1570, a current limiting circuit, such as a power converter circuit 1552, and an energy storage element 1554 (e.g., an intermediate energy storage element such as the intermediate storage device 694 shown in FIG. 8A). In some examples, the motor drive unit 1500 may include a second power converter, such as a boost converter circuit 1558. Also, in some examples, the second power converter may be omitted from the motor drive circuit 1500. The energy storage element 1554 may comprise any combination of one or more super capacitors, one or more rechargeable batteries, and/or other suitable energy storage devices.

The filter circuit 1570 may receive the battery voltage $V_{BATT}$. The power converter circuit 1552 may draw a battery current $I_{BATT}$ from the batteries 1560 through the filter circuit 1570. The filter circuit 1570 may filter high and/or low frequency components of the battery current $I_{BATT}$. In some examples, the filter circuit 1570 may be a low-pass filter. Also, in some examples, the filter circuit 1570 may be omitted from the motor drive circuit 1500.

The power converter circuit 1552 may be configured to limit the current drawn from the batteries 1560 (e.g. allowing a small constant current to flow from the batteries 1560). The power converter circuit 1552 may receive the battery voltage $V_{BATT}$ (e.g. $V_{IN}$) via the filter circuit 1570. In some examples, the power converter circuit 1552 may comprise a step-down power converter, such as a buck converter. The power converter circuit 1552 may be configured to charge the energy storage element 1554 from the battery voltage $V_{BATT}$ to produce a storage voltage $V_S$ across the energy storage element 1554 (e.g., approximately 3.5 volts). The motor drive circuit 1520 may draw energy from the energy storage element 1554 (e.g., via the boost converter circuit 1558) to drive the motor 1510. As such, the power converter circuit 1552 may be configured to limit the current drawn from the batteries 1560, for example, by producing a storage voltage $V_S$ and driving the motor 1510 using the storage voltage $V_S$ stored across the energy storage element 1554. In most cases, for instance, the motor drive circuit 1520 may drive the motor 1510 by drawing current from the energy storage element 1554 and not drawing any current directly from the batteries 1560. Further, it should be appreciated that, in some examples, the power converter circuit 1552 may be omitted for another current limiting circuit, such as in instances where the battery voltage $V_{BATT}$ is the same as the storage voltage $V_S$ and power conversion (e.g., a step-up or step-down) is not needed to drive the motor 1510.

The motor drive unit 1500 may be configured to control when and how the energy storage element 1554 charges from the batteries 1560. The control circuit 1530 may control when and how the energy storage element 1554 charges from the batteries 1560 based on the storage voltage $V_S$ of the energy storage element 1554, such as when the storage voltage $V_S$ of the energy storage element 1554 falls below a low-side threshold value (e.g., approximately 2.8 volts). For example, the control circuit 1530 may be configured to receive a scaled storage voltage $V_{SS}$ via a scaling circuit 1556 (e.g., a resistive divider circuit). The scaling circuit 1556 may receive the storage voltage $V_S$ and may generate the scaled storage voltage $V_{SS}$. The control circuit 1530 may determine the magnitude of the storage voltage $V_S$ of the energy storage element 1554 based on the magnitude of the scaled storage voltage $V_{SS}$. When the control circuit 1530 determines that the magnitude of the storage voltage $V_S$ of the energy storage element 1554 falls below the low-side threshold value, the control circuit 1530 may control a charging enable signal $V_{EN}$ (e.g., drive the charging enable control signal $V_{EN}$ high) to enable the power converter circuit 1552. When the power converter circuit 1552 is enabled, the power converter circuit 1552 may be configured to charge the energy storage element 1554 (e.g. from the batteries 1560). When the power converter circuit 1552 is disabled, the power converter circuit 1552 may be configured to cease charging the energy storage element 1554 (e.g. from the batteries 1560).

The motor drive unit 1500 may utilize the energy storage element 1554 to draw a small constant current from the batteries 1560 over a long period of time to extend the lifetime (e.g., and increase the total energy output) of the batteries 1560. For example, the motor drive unit 1500 (e.g., the power converter circuit 1552 and/or the motor drive circuit 1520) may limit the current drawn by the power converter circuit 1552. The motor drive unit 1500 may draw current from the batteries 1560 that is less than the limit, but not more.

When enabled, the power converter circuit 1552 may be configured to conduct an average current $I_{AVE}$ (e.g., having a magnitude of approximately 15 milliamps) from the batteries 1560. The magnitude of the average current $I_{AVE}$ may be much smaller than a magnitude of a drive current required by the motor drive circuit 1520 to rotate the motor 1510. When the motor drive circuit 1520 is driving the motor 1510, the magnitude of the storage voltage $V_S$ of the energy storage element 1554 may decrease with respect to time. When the motor drive circuit 1520 is not driving the motor 1510 and the power converter circuit 1552 is charging the energy storage element 1554, the magnitude of the storage voltage $V_S$ may increase (e.g., slowly increase). When the storage voltage $V_S$ of the energy storage element 1554 falls below a low-side threshold value (e.g. approximately 2.8V), the control circuit 1530 may enable the power converter circuit 1552 to begin charging the energy storage element 1554. The storage voltage $V_S$ may fall below the low-side threshold value after powering movements of the covering material, powering low-voltage components, and/or due to leakage currents over time. When the storage voltage $V_S$ of the energy storage element 1554 rises above a high-side threshold value (e.g., approximately 3.5 volts), the control circuit 1530 may cease driving the charging enable signal $V_{EN}$ high to disable the power converter circuit 1552 and stop the charging of the energy storage element 1554 from the batteries 1560.

The motor drive unit 1500 may further comprise the boost converter circuit 1558 that receives the storage voltage $V_S$ and generates a motor voltage $V_{MOTOR}$ (e.g., approximately 5 volts) for powering the motor 1510. The motor voltage $V_{MOTOR}$ may be larger than the storage voltage $V_S$. In some examples, a switch (e.g., a single pole double throw switch) may connect the batteries 1560 and the energy storage element 1554 to the boost converter 1558 (e.g., if the required motor voltage level exceeds the present battery voltage $V_{BAT}$). When the control circuit 1530 controls the motor drive circuit 1520 to rotate the motor 1510, the boost converter circuit 1558 may conduct current from the energy storage element 1554 to generate the motor voltage $V_{MOTOR}$. As noted above, in some examples, the motor drive unit 1500 may not include the boost converter circuit 1558, for example, based on the voltage requirements of the motor 1510.

The motor drive unit 1500 may also comprise a controllable switching circuit 1562 coupled between the batteries 1560 and the motor drive circuit 1520. The control circuit 1530 may generate a switch control signal $V_{SW}$ for rendering the controllable switching circuit 1562 conductive and non-conductive. The control circuit 1530 may be configured to render the controllable switching circuit 1562 conductive to bypass the filter circuit 1570, the power converter circuit 1552, the energy storage element 1554, and/or the boost converter circuit 1558 to allow the motor drive circuit 1520 to draw current directly from the batteries (e.g., when the energy storage element 1554 is depleted). For example, the control circuit 1530 may render the controllable switching circuit 1562 conductive when the control circuit 1530 determines that the magnitude of the storage voltage $V_S$ of the energy storage element 1554 (e.g., based on the magnitude of the scaled storage voltage $V_{SS}$) is depleted below a threshold and the control circuit 1530 has received an input or command to operate the motor 1510 and, for example, does not have enough energy to complete a movement or an amount of movement of the covering material). For example, the control circuit may determine if the energy storage element 1554 has enough energy to complete a movement or an amount of movement of the covering material by comparing a present storage level of the energy storage element 1554 (e.g., the storage voltage $V_S$) to a threshold. The threshold may indicate a storage level sufficient to complete a full movement of the covering material from the fully-closed position to the fully-open position (e.g., a fixed threshold). The threshold may be constant or may vary, for example, depending on the amount of movement of the covering material required by the received command, such that the threshold (e.g., a variable threshold) may indicate a storage level sufficient to complete the movement required by the received command.

If the energy storage element 1554 is not sufficiently charged (e.g., does not have enough energy to move the covering material), the control circuit 1530 may close the controllable switching circuit 1562 at to allow the electrical load (e.g., the motor) to draw current directly from the batteries 1560. Closing the controllable switching circuit 1562 may bypass the energy storage element 1554, such that the stored energy of the energy storage element 1554 is not used for driving the motor 1510 to move the covering material.

The control circuit 1530 may be configured to determine when one or more of the batteries 1560 are not installed in the compartment 1564 when in the operating position. For example, the control circuit 1530 may be configured to determine that one or more of the batteries 1560 are missing when the magnitude of the battery voltage $V_{BATT}$ drops to approximately zero volts (e.g., there is an open circuit between the battery contacts). The control circuit 1530 may be configured to determine the magnitude of the battery voltage $V_{BATT}$ in response to a scaled battery voltage $V_{BATT\text{-}S}$ received via a scaling circuit 1566 (e.g., a resistive divider circuit). The scaling circuit 1566 may receive the battery voltage $V_{BATT}$ and may generate the scaled battery voltage $V_{BATT\text{-}S}$. The control circuit 1530 may be configured to disable (e.g., automatically disable) the operation of the motor 1510 of the motor drive unit 1500 in response to the scaled battery voltage $V_{BATT\text{-}S}$, such that the covering material cannot be raised or lowered when one or more of the batteries 1560 are not installed in the battery compartment 1564, which may prevent depletion of the intermediate storage element 1554. The control circuit 1530 may be configured to enable the operation of the motor 1510 in response to the scaled battery voltage $V_{BATT\text{-}S}$ when all of the batteries 1560 are installed.

The motor drive unit 1500 may comprise a power supply 1580 (e.g., a low-voltage power supply). The power supply 1580 may receive the battery voltage $V_{BATT}$. The power supply 1580 may be configured to produce a low-voltage supply voltage $V_{CC}$ (e.g., approximately 3.3 volts) for powering low-voltage circuitry of the motor drive unit 1500, such as the user interface 1544, the communication circuit 1542, and the control circuit 1530. Further, in some examples, the power supply 1580 may be omitted from the motor drive unit 1500 (e.g. if the low-voltage circuitry of the motor drive unit 1500 is able to be powered directly from the storage voltage $V_S$). Additionally or alternatively, the motor drive unit 1500 may comprise a power supply (not shown) that may receive the storage voltage $V_S$ and generate the low voltage $V_{CC}$ (e.g., approximately 3.3 V) for powering the control circuit 1530 and other low-voltage circuitry of the motor drive unit 1500, e.g., the user interface 1544, the communication circuit 1542, and the control circuit 1530.

The user interface 1544, the communication circuit 1542, the antenna 1545, and the position detect circuit 1546 may be part of a cap circuit 1590, which may be mounted to a first printed circuit board (e.g., the control interface printed circuit board 654 shown in FIG. 8B) located in an end portion of the motor drive unit 1500 (e.g., such as the motor drive unit end portion 150 shown in FIGS. 1B and 7 and/or the cap 250 shown in FIGS. 2A and 2B). The other circuitry of the motor drive unit 1500 may be mounted to a second printed circuit board (e.g., the motor drive printed circuit board 692). Although the communication circuit 1542 is shown in FIG. 29 as part of the cap circuit 1590, it should be appreciated that the communication circuit 1542 may not be part of the cap circuit 1590 and may be mounted to the second printed circuit board, while the antenna 1545 may be part of the cap circuit 1590 and located on the first printed circuit board.

Figure 29:
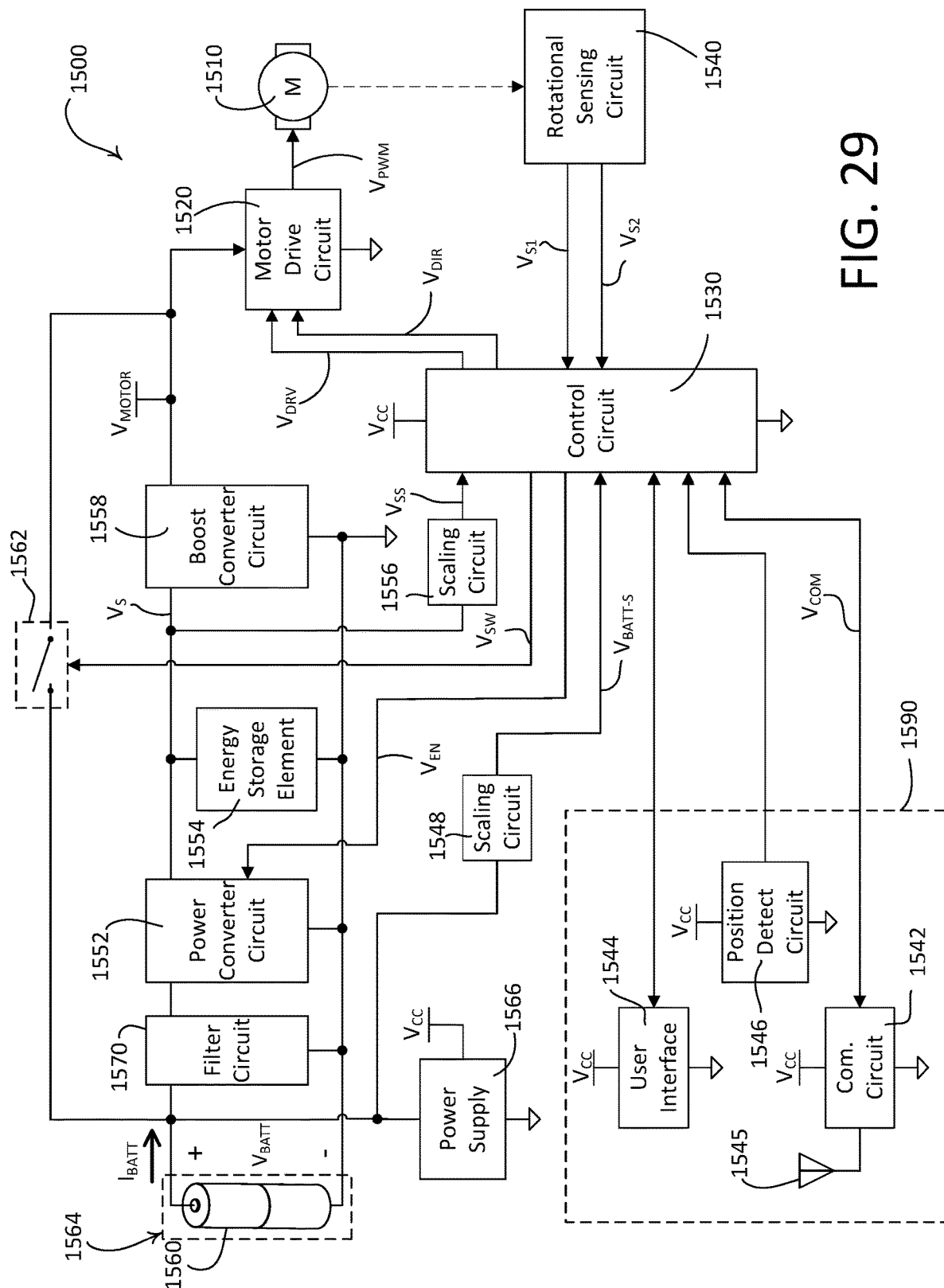
FIG. 29 is a block diagram of an example motor drive unit of a battery-powered motorized window treatment.
Figure 30:
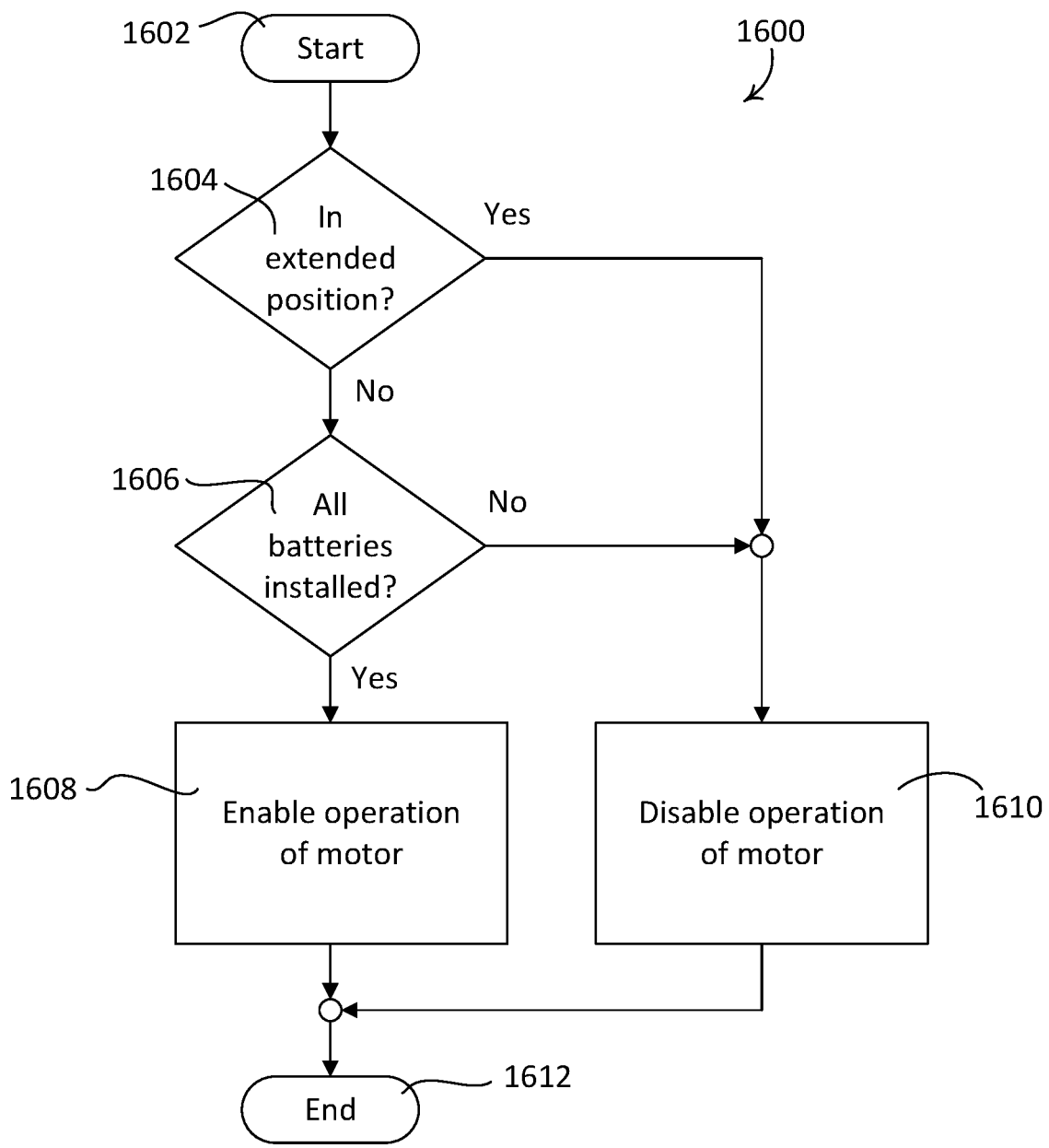
FIG. 30 is a flowchart depicting an example method for controlling a motor drive unit of a motorized window treatment.

FIG. 30 is a flowchart depicting an example method 1600 for controlling a motor drive unit of a motorized window treatment (e.g., the motor drive unit 151 of the motorized window treatment 100 shown in FIG. 1B, the motor drive unit 5590 of the motorized window treatment 5500 shown in FIG. 6, the motor drive unit 690 of the motorized window treatment 600 shown in FIGS. 8A and 8B, and/or the motor drive unit 1500 shown in FIG. 29). The motorized window treatment may have a window treatment assembly (e.g., the roller tube assembly 111 that may be changed from an operating position (e.g., in which a covering material of the motorized window treatment may be moved) to an extended position (e.g., in which one or more batteries of the motor drive unit may be accessed). The method 1600 may be implemented by one or more devices. The method 1600 may be executed by a control circuit of the motor drive unit (e.g., the control circuit 1530 shown in FIG. 29). For example, the method 1600 may be executed by the control circuit of the motor drive unit to enable and/or disable operation of a motor of the motor drive unit. The method 1600 may be executed at 1602, for example, periodically (e.g., every one second).

At 1604, the control circuit may determine if the window treatment assembly is in the extended position (e.g., and not in the operating position). For example, the motor drive unit may comprise a position detect circuit (e.g., the position detect circuit 1546 shown in FIG. 29) for detecting when the window treatment assembly is not in the operating position. The position detect circuit may be located in a motor drive unit housing end (e.g., the first end 112 and/or the cap 150 shown in FIG. 1B) which may be attached to a mounting bracket (e.g., mounting brackets 130A, 130B, 230A, 330A, 430A, 530A, 5530A, 630, 700, 800, 900, 1000, 1100, 1200). For example, the position detect circuit may comprise a magnetic sensing circuit (e.g., a Hall-effect sensor circuit) configured to detect when the mounting bracket is in an extended position. The position detect circuit may determine when it is not in close proximity to a magnet located inside of an arm (e.g., arms 632, 714, 814, 914, 1014, 1114, and/or front portion 1214) of the mounting bracket. The position detect circuit may be configured to generate a position detect signal (e.g., the position detect signal $V_{POS}$), which may be received by the control circuit. The control circuit may determine if the window treatment assembly is in the extended position (e.g., not in the operating position) in response to the position detect signal at 1604. If the window treatment assembly is in the extended position at 1604, the control circuit may disable the operation of the motor of the motor drive unit at 1610, such that the covering material cannot be raised or lowered when the window treatment assembly is not in the operating position (e.g., in the extended position). The method 1600 may end at 1612.

If the window treatment assembly is in the operating position at 1604, the control circuit may determine if one or more of the batteries are not installed in a battery compartment of the motor drive unit at 1606. For example, the control circuit may be configured to determine that one or more of the batteries are not installed when the magnitude of a battery voltage received from the batteries (e.g., the battery voltage $V_{BATT}$) is approximately zero volts. The control circuit may be configured to determine the magnitude of the battery voltage in response to a scaled battery voltage (e.g., the scaled battery voltage $V_{BATT-S}$ that may be received via the scaling circuit 1566). The control circuit may determine that one or more of the batteries are not installed in response to a scaled battery voltage at 1606. If the control circuit determines that one or more of the batteries are not installed at 1606, the control circuit may disable the operation of the motor of the motor drive unit at 1610, such that the covering material cannot be raised or lowered when one or more of the batteries are not installed in the battery compartment, for example, to prevent depletion of an intermediate storage element of the motor drive unit (e.g., the intermediate storage element 1554). The method 1600 may end at 1612.

If the roller tube assembly is determined at 1604 to be in the operating position and all of the batteries are determined at 1606 to be installed, the control circuit may enable the operation of the motor at 160, such that the covering material may be raised and lowered. The method 1600 may end at 1612. Alternatively, block 1606 may be omitted from the method 1600, such that the control circuit may enable the operation of the motor at 1608 when the roller tube assembly is in the operation position at 1604.

A battery-powered motorized window treatment (e.g., such as the motorized window treatment 100 shown in FIGS. 1A, 1B, and 7, the battery-powered motorized window treatment 200 shown in FIGS. 2A and 2B, the battery-powered motorized window treatment 300 shown in FIGS. 3A and 3B, the battery-powered motorized window treatment 400 shown in FIGS. 4A and 4B, the battery-powered motorized window treatment 500 shown in FIG. 5A, the battery-powered motorized window treatment 5500 shown in FIG. 6, the battery-powered motorized window treatment 600 shown in FIGS. 8A-11, and/or the battery-powered motorized window treatment 1200 shown in FIGS. 17A and 17B) may include a spring (e.g., such as the spring assist assembly 616 shown in FIG. 9) that is configured to be adjusted (e.g., pre-wound) at the installation site (e.g., when the roller tube is mounted to the mounting brackets). Pre-winding the spring at the installation site may eliminate the need to pre-wind the spring during manufacturing (e.g., 1 at the factory). Pre-winding the spring during manufacturing may result in pre-winding in the wrong direction for the application. Pre-winding the spring during manufacturing may require a locking mechanism to hold the roller tube until installation such that the pre-wound spring assist assembly does not unwind. Pre-winding the spring assist assembly at the installation site may allow for more precise pre-winding settings, eliminate factory pre-winding errors, and eliminate the need for a locking mechanism to hold the roller tube in place prior to installation.

Figure 31:
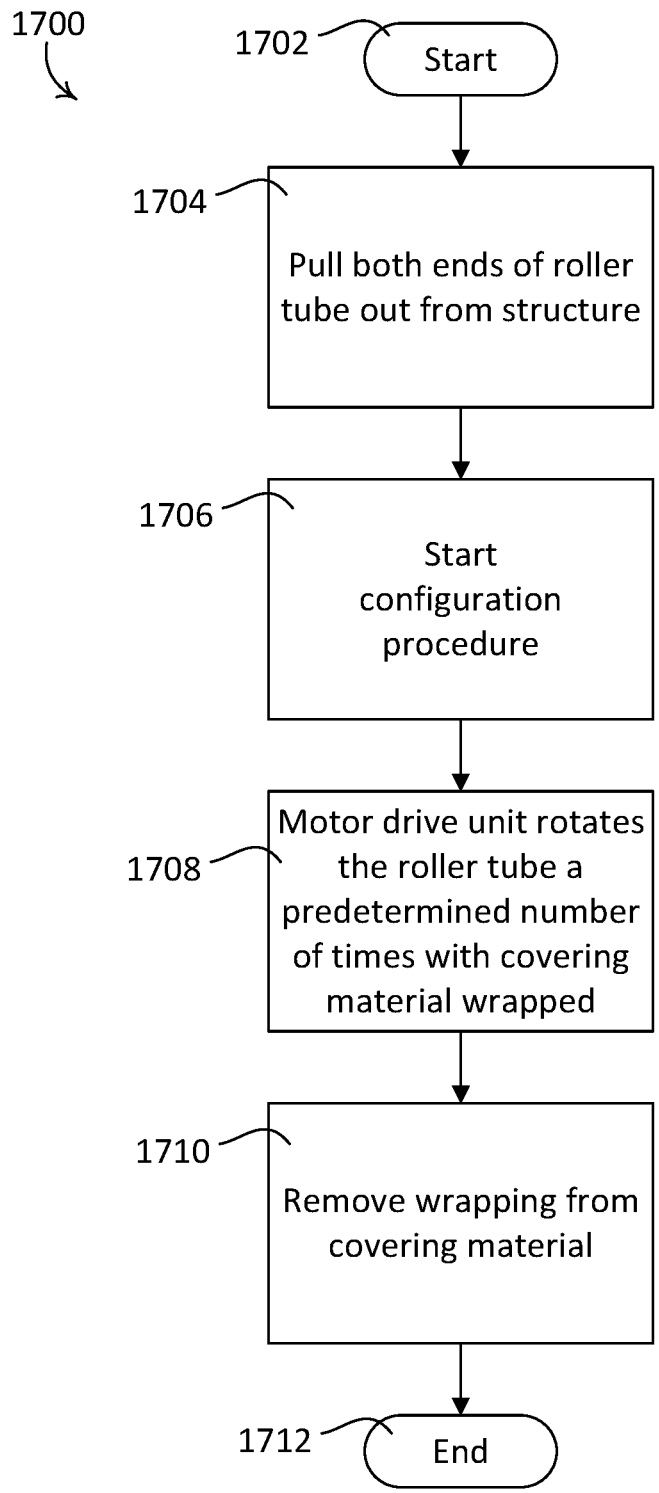
FIG. 31 is a flowchart depicting an example method for pre-winding a battery-powered motorized window treatment at an installation site.

FIG. 31 is a flowchart depicting an example method 1700 for adjusting a winding of a spring (e.g., such as the spring assist assembly 616 shown in FIG. 9) of a battery-powered motorized window treatment (e.g., such as the motorized window treatment 100 shown in FIGS. 1A, 1B, and 7, the battery-powered motorized window treatment 200 shown in FIGS. 2A and 2B, the battery-powered motorized window treatment 300 shown in FIGS. 3A and 3B, the battery-powered motorized window treatment 400 shown in FIGS. 4A and 4B, the battery-powered motorized window treatment 500 shown in FIG. 5A, the battery-powered motorized window treatment 5500 shown in FIG. 6, the battery-powered motorized window treatment 600 shown in FIGS. 8A-11, and/or the battery-powered motorized window treatment 1200 shown in FIGS. 17A and 17B). For example, the spring of the battery-powered motorized window treatment may be adjusted during an initial installation (e.g., pre-winding) and/or at a later time. The battery-powered motorized window treatment may remain installed (e.g., attached to the mounting brackets) while the spring is adjusted. The method 1700 may be executed as part of a configuration procedure (e.g., commissioning procedure). The method 1700 may be implemented by one or more devices. The method 1700 may be executed by a control circuit (e.g., control circuit 1530 shown in FIG. 21) of a motor drive unit (e.g., the motor drive unit 151 of the motorized window treatment 100 shown in FIG. 1B, the motor drive unit 5590 of the motorized window treatment 5500 shown in FIG. 6, the motor drive unit 690 of the motorized window treatment 600 shown in FIGS. 8A and 8B, and/or the motor drive unit 1500 shown in FIG. 29). For example, the method 1700 may be executed by the control circuit of the motor drive unit to reduce the load on the motor drive unit. For example, the method 1700 may be executed at 1702 in response to the battery-powered motorized window treatment being installed. For example, the method 1700 may be executed at 1702 in response to a button press and/or receipt of a wireless message (e.g., comprising control instructions).

At 1704, the roller tube of the battery-powered motorized window treatment may be pulled away from a structure (e.g., a wall, a window, etc.). The mounting brackets may slide out to enable the roller tube to be pulled away from the structure to an extended position, for example, as shown in FIG. 7. Pulling the roller tube to the extended position may enable enough clearance for the hembar to rotate with the roller tube without contacting the structure. The covering material and/or the weighted hembar may be secured to prevent the covering material from unrolling. For example, the weighted hembar may be secured using tape, elastic, Velcro straps, etc. A newly manufactured roller tube may come wrapped, for example, with plastic to prevent unwinding during shipping. The installer would leave the wrapping covering the covering material and the weighted hembar when mounting the roller tube to the mounting brackets.

At 1706, a configuration procedure may be initiated. For example, a user may press and/or hold an actuator to initiate the configuration procedure. The actuator may be located on the motor drive unit or another component (e.g., such as the control button 152 on the cap 150 shown in FIG. 1B). A control circuit of the battery-powered motorized window treatment (e.g., such as control circuit 1030 shown in FIG. 19) may receive a command from a user interface circuit (e.g., such as the user interface circuit 1044 shown in FIG. 19) in response to pressing and/or holding the actuator.

Additionally or alternatively, the battery-powered motorized window treatment may receive a command from a mobile device or a system controller, for example via a communication circuit (e.g., such as the communication circuit 1542 shown in FIG. 29). The battery-powered motorized window treatment may enter a configuration mode upon receipt of the command.

At 1708, the motor drive unit may pre-turn (e.g., rotate) the roller tube a predetermined number of rotations (e.g., fractional rotations) with the covering material and weighted hembar secured such that the covering material is not lowered or raised. For example, the roller tube may rotate the roller tube in the direction of raising the covering material such that the spring is pre-wound to assist in raising the covering material. Alternatively, the roller tube may rotate the roller tube in the direction of lowering the covering material such that the spring is pre-wound to assist in lowering the covering material. The predetermined number of rotations may be determined based on the longitudinal length of the roller tube, the height of the window, and/or the type of covering material. The predetermined number of rotations may be stored in a memory of the motor drive unit. Alternatively, the user may input (e.g., via the actuator) the number of rotations. Additionally or alternatively, the mobile device or the system controller may transmit (e.g., wirelessly transmit) one or more messages including control instructions to the motor drive unit that include the predetermined number of rotations. The pre-determined number of rotations may be configured to minimize the torque required to raise the covering material. The predetermined number of rotations may be re-configured at the installation site. For example, the installer may add or delete rotations to optimize performance of the motor drive unit.

At 1710, the wrapping may be removed from the covering material and/or the weighted hembar such that the covering material can be lowered and raised when the roller tube rotates. For example, the covering material and/or the weighted hembar may be unsecured such that the covering material can be lowered and raised when the roller tube rotates. The method 1700 may end at 1712 when the spring has been pre-wound and the covering material is free to be lowered and raised. The actuator may be pressed to exit the configuration mode.

What is claimed is:

1. A motorized window treatment comprising:
    a roller tube configured to be mounted to mounting brackets;
    a covering material attached to the roller tube;
    a hembar that is coupled to a lower end of the covering material;
    a motor drive unit configured to rotate the roller tube to raise or lower the covering material; and
    a spring assist assembly coupled to the roller tube, the spring assist assembly configured to assist the motor drive unit in raising or lowering the covering material, wherein the motor drive unit is further configured to:
        determine that a configuration procedure has been initiated; and
        during the configuration procedure, rotate the roller tube a predetermined number of rotations with the covering material and the hembar secured to prevent the covering material from being raised or lowered, wherein the motor drive unit is configured to rotate the roller tube to pre-wind a spring of the spring assist assembly that is coupled to the roller tube.

2. The motorized window treatment of claim 1, wherein the covering material is secured by wrapping the hembar to the covering material.

3. The motorized window treatment of claim 2, wherein the covering material is unsecured after pre-winding of the spring of the spring assist assembly.

4. The motorized window treatment of claim 1, wherein the motor drive unit further comprises a motor coupled to the roller tube for rotating the roller tube and a control circuit configured to control the motor to rotate the roller tube the predetermined number of rotations during the configuration procedure.

5. The motorized window treatment of claim 4, wherein the motor drive unit further comprises a user interface comprising one or more actuators configured to receive user inputs.

6. The motorized window treatment of claim 5, wherein the control circuit is configured to determine that the configuration procedure has been initiated in response to receiving a command from the user interface.

7. The motorized window treatment of claim 5, wherein the control circuit is configured to determine that the configuration procedure has been initiated in response to detecting a press of an actuator of the one or more actuators on the user interface.

8. The motorized window treatment of claim 4, wherein the motor drive unit further comprises a communication circuit, and the control circuit is configured to determine that the configuration procedure has been initiated in response to receiving, via the communication circuit, a command from a control device external to the motorized window treatment.

9. The motorized window treatment of claim 1, wherein the motor drive unit is configured to rotate the roller tube in the direction of raising the covering material such that the spring of the spring assist assembly is pre-wound to assist in raising the covering material.

10. The motorized window treatment of claim 1, wherein the motor drive unit is configured to rotate the roller tube in the direction of lowering the covering material such that the spring of the spring assist assembly is pre-wound to assist in lowering the covering material.

11. The motorized window treatment of claim 1, wherein the predetermined number of rotations is configured to minimize a torque required to raise the covering material.

12. The motorized window treatment of claim 1, wherein the predetermined number of rotations is determined based on one or more of a longitudinal length of the roller tube, a height of a window, or a type of covering material.

* * * * *